(12) United States Patent
Mizusawa

(10) Patent No.: US 10,517,008 B2
(45) Date of Patent: Dec. 24, 2019

(54) APPARATUS

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 15/508,280

(22) PCT Filed: Aug. 24, 2015

(86) PCT No.: PCT/JP2015/073746
§ 371 (c)(1),
(2) Date: Mar. 2, 2017

(87) PCT Pub. No.: WO2016/042979
PCT Pub. Date: Mar. 24, 2016

(65) Prior Publication Data
US 2017/0257789 A1    Sep. 7, 2017

(30) Foreign Application Priority Data

Sep. 18, 2014  (JP) .................................. 2014-189855

(51) Int. Cl.
*H04W 72/00*  (2009.01)
*H04W 24/10*  (2009.01)
(Continued)

(52) U.S. Cl.
CPC .......... *H04W 24/10* (2013.01); *H04L 5/0048* (2013.01); *H04L 12/189* (2013.01); *H04W 4/06* (2013.01);
(Continued)

(58) Field of Classification Search
CPC ............... H04W 24/10; H04W 72/005; H04W 72/0453; H04W 72/0446; H04W 4/06
See application file for complete search history.

(56) References Cited

U.S. PATENT DOCUMENTS

2010/0080163 A1    4/2010  Krishnamoorthi et al.
2011/0256833 A1*  10/2011  Racz ..................... H04W 24/08
455/63.1
(Continued)

FOREIGN PATENT DOCUMENTS

CN         103988558 A    8/2014
EP           2772112 A1    9/2014
(Continued)

OTHER PUBLICATIONS

"LTE; Evolved Universal Terrestrial Radio Access (E-UTRA); Radio Resource Control (RRC); Protocol specification" 3GPP TS 36331 version 11.5.0, Release 11, ETSI TS 136 331 V11.5.0, Sep. 9, 2013, 350 pages.

(Continued)

*Primary Examiner* — Chi Ho A Lee
(74) *Attorney, Agent, or Firm* — Chip Law Group

(57) ABSTRACT

To make it possible to increase opportunities for terminal apparatuses to receive multicast signals. There is provided an apparatus, including: a first control unit configured to select a first frequency band which is a frequency band for a cellular system and a second frequency band which is not the frequency band for the cellular system when a terminal apparatus is in an idle mode; and a second control unit configured to control the terminal apparatus such that, when the terminal apparatus is in the idle mode, the terminal apparatus receives a paging message transmitted in the first frequency band and receives a multicast signal transmitted in the second frequency band.

11 Claims, 31 Drawing Sheets

(51) Int. Cl.
*H04W 4/06* (2009.01)
*H04W 16/14* (2009.01)
*H04W 68/00* (2009.01)
*H04W 72/04* (2009.01)
*H04L 5/00* (2006.01)
*H04L 12/18* (2006.01)

(52) U.S. Cl.
CPC ........... *H04W 16/14* (2013.01); *H04W 68/00* (2013.01); *H04W 72/005* (2013.01); *H04W 72/04* (2013.01); *H04W 72/0446* (2013.01); *H04W 72/0453* (2013.01)

(56) References Cited

U.S. PATENT DOCUMENTS

| | | | | |
|---|---|---|---|---|
| 2012/0093060 A1* | 4/2012 | Huschke | ............... | H04W 48/12 370/312 |
| 2012/0236776 A1* | 9/2012 | Zhang | ................... | H04W 48/12 370/312 |
| 2013/0040691 A1* | 2/2013 | Ode | ....................... | H04B 7/022 455/524 |
| 2013/0044670 A1 | 2/2013 | Jang et al. | | |
| 2013/0107721 A1 | 5/2013 | Wang et al. | | |
| 2014/0098734 A1* | 4/2014 | Kalhan | ................... | H04W 4/06 370/312 |
| 2014/0198734 A1* | 7/2014 | Yamada | ................. | H04W 76/00 370/329 |
| 2014/0213219 A1* | 7/2014 | Mohebbi | ............... | H04W 92/02 455/411 |
| 2014/0247766 A1* | 9/2014 | Zhang | ................. | H04W 72/005 370/312 |
| 2014/0301210 A1* | 10/2014 | Kim | ....................... | H04W 24/10 370/241 |
| 2015/0080006 A1* | 3/2015 | Ohta | ................... | H04W 76/046 455/452.1 |
| 2015/0180676 A1* | 6/2015 | Bao | ..................... | H04L 12/1886 370/230 |
| 2015/0351011 A1* | 12/2015 | Shukla | .................. | H04W 48/16 455/434 |
| 2015/0351061 A1* | 12/2015 | Kim | ..................... | H04W 56/00 370/252 |
| 2015/0373552 A1* | 12/2015 | Jha | ......................... | H04W 16/14 370/331 |
| 2016/0021664 A1* | 1/2016 | Chou | ................ | H04W 52/0229 370/329 |
| 2016/0044634 A1* | 2/2016 | Seo | ........................ | H04W 76/14 370/312 |
| 2016/0219495 A1* | 7/2016 | Martin | .................. | H04W 48/16 |
| 2016/0249243 A1* | 8/2016 | Kim | ....................... | H04W 24/10 |
| 2017/0181003 A1* | 6/2017 | Chen | .................... | H04W 16/14 |
| 2017/0208501 A1* | 7/2017 | Lee | ........................ | H04W 28/08 |

FOREIGN PATENT DOCUMENTS

| | | |
|---|---|---|
| JP | 2014-534731 A | 12/2014 |
| JP | 5813886 B2 | 11/2015 |
| KR | 10-2014-0087026 A | 7/2014 |
| WO | 2010/122892 A1 | 10/2010 |
| WO | 2012/134182 A2 | 10/2012 |
| WO | 2013/062914 A1 | 5/2013 |

OTHER PUBLICATIONS

"A User Case for Download Delivery Enhancements for MBMS (EMM-DDE)", TDoc S4-120030, 3GPP TSG-SA4#67, Jan. 30-Feb. 3, 2012, Edinburgh, UK, 02 pages.
"Drivers, Benefits and Challenges for LTE in Unlicensed Spectrum", RP-131701, 3GPP TSG-RAN Meeting #62 Busan, Korea, Dec. 3-6, 2013, 04 pages.
Partial Supplementary European Search Report of EP Application No. 15842485.3, dated Mar. 1, 2018, 15 pages of PSESR.
Extended European Search Report of EP Patent Application No. 15842485.3, dated Jun. 6, 2018, 12 pages.
"Evolved Universal Terrestrial Radio Access (E-UTRA)" Radio Resource Control (RRC), Protocol specification 3GPP TS 36331 version 11.5.0 Release 11, ETSI TS 136 331, Sep. 2013, 350 pages.
"A User Case for Download Delivery Enhancements for MBMS (EMM-DDE)", InterDigital Communications, 3GPP TSG-SA4#67, Edinburgh, UK, TDoc S4-120030, Jan. 30-Feb. 3, 2012, 02 pages.
"Drivers, Benefits and Challenges for LTE in Unlicensed Spectrum", AT&T, 3GPP TSG-RAN Meeting #62, RP-131701, Busan, Korea, Dec. 3-6, 2013, 04 pages.
Office Action for EP Patent Application No. 15842485.3, dated Mar. 4, 2019, 08 pages of Office Action.

* cited by examiner

FIG. 4
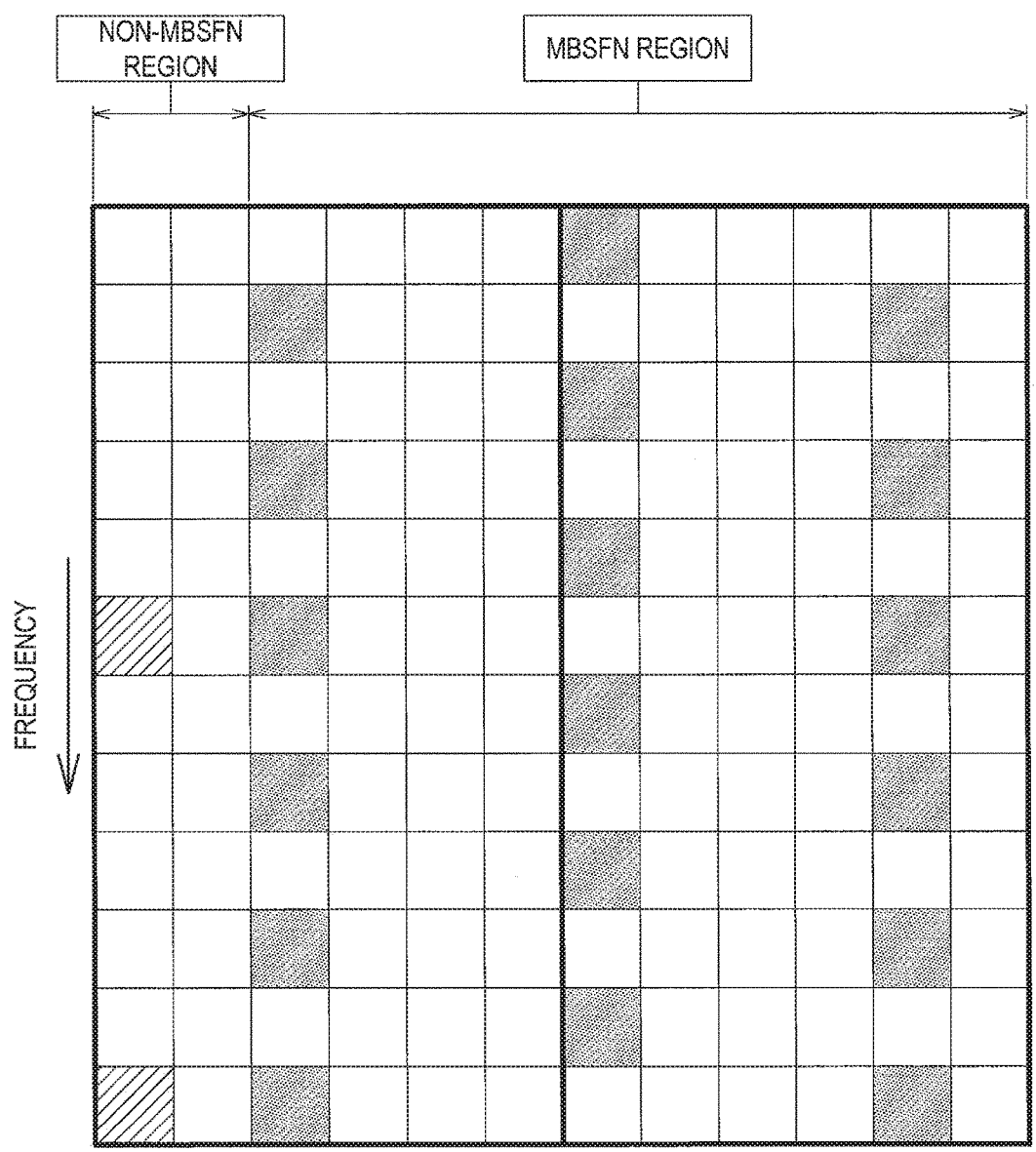
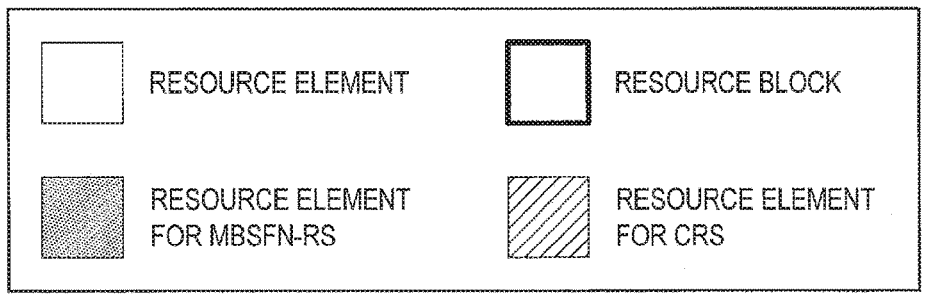

FIG. 5
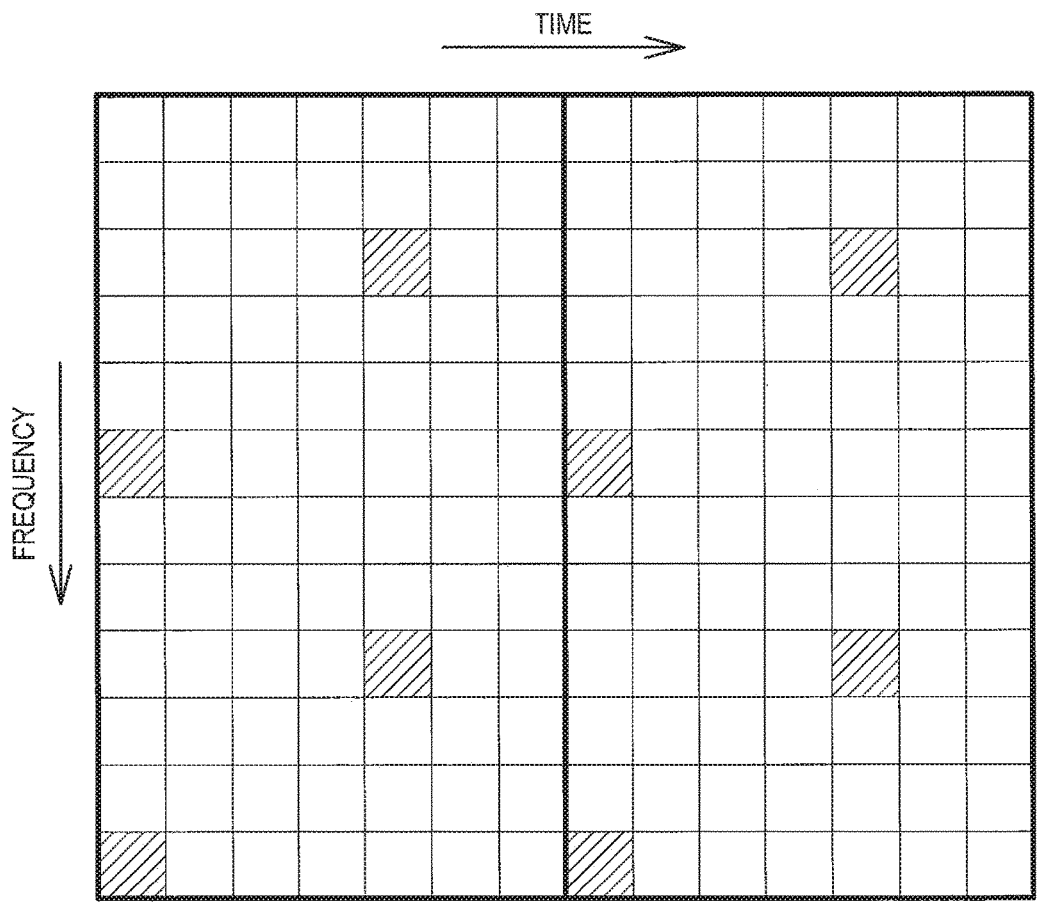
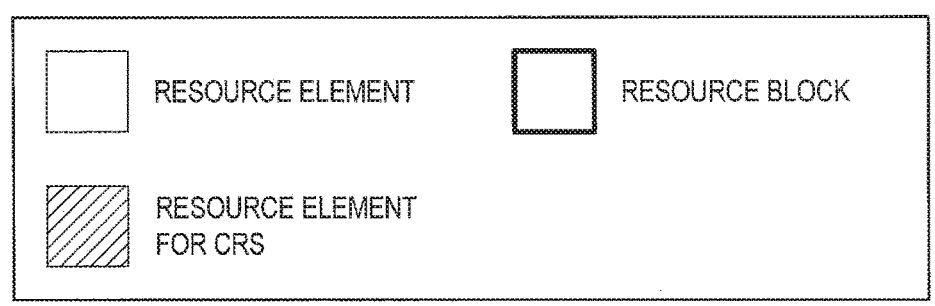

FIG. 8
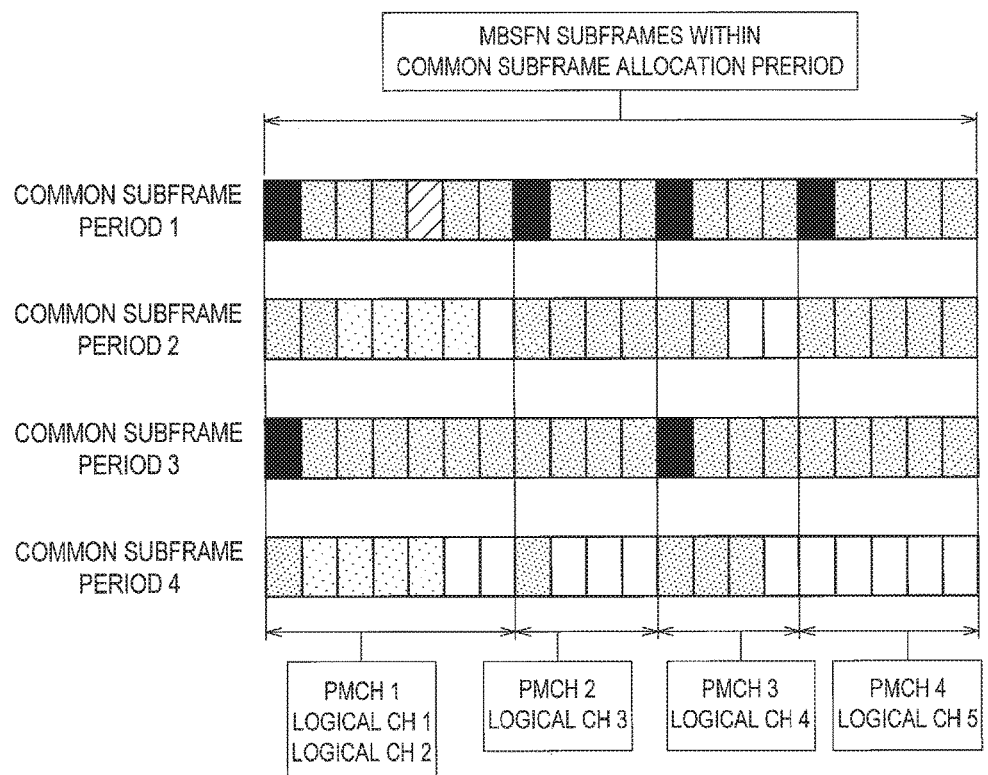
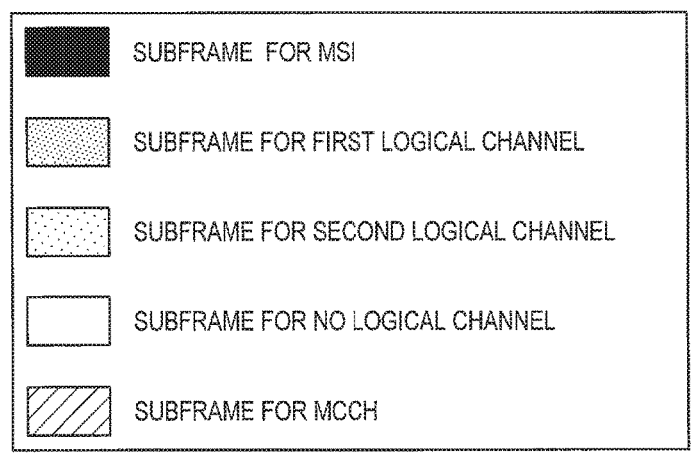

APPARATUS

CROSS REFERENCE TO RELATED APPLICATIONS

This application is a U.S. National Phase of International Patent Application No. PCT/JP2015/073746 filed on Aug. 24, 2015, which claims priority benefit of Japanese Patent Application No. JP 2014-189855 filed in the Japan Patent Office on Sep. 18, 2014. Each of the above-referenced applications is hereby incorporated herein by reference in its entirety.

BACKGROUND ART

In cellular networks, multicast broadcast multimedia services (MBMS) has been put to practical use as a scheme of delivering the same content as broadcast content to a plurality of users. In particular, in Long Term Evolution (LTE), an MBMS over single frequency network (MBSFN) in which base stations of a plurality of cells are mutually synchronized to deliver the same content has been standardized. Through an MBSFN, received signals from a plurality of base stations are combined so that reception quality can be improved. Moreover, in order to cope with recent increases in traffic, a more efficient operation of MBSFN is being anticipated. The technology has been proposed.

For example, Non-Patent Literature 1 discloses a technology standardized for MBMS and MBSFN.

CITATION LIST

Non-Patent Literature

Non-Patent Literature 1: 3GPP TS 36.331 V11. 5.0 (2013-09) LTE; Evolved Universal Terrestrial Radio Access (E-UTRA); Radio Resource Control (RRC); Protocol Specification

DISCLOSURE OF INVENTION

Technical Problem

However, in a current situation, opportunities for terminal apparatuses to receive multicast signals (for example, MBSFN signals transmitted through an MBSFN subframe) are limited. For example, a terminal apparatus usually receives only multicast signals transmitted in a frequency band for a corresponding cellular system.

In this regard, it is desirable to provide a mechanism which is capable of increasing opportunities for terminal apparatuses to receive multicast signals.

Solution to Problem

According to the present disclosure, there is provided an apparatus, including: a first control unit configured to select a first frequency band which is a frequency band for a cellular system and a second frequency band which is not the frequency band for the cellular system when a terminal apparatus is in an idle mode; and a second control unit configured to control the terminal apparatus such that, when the terminal apparatus is in the idle mode, the terminal apparatus receives a paging message transmitted in the first frequency band and receives a multicast signal transmitted in the second frequency band.

According to the present disclosure, there is provided an apparatus, including: a first control unit configured to select a second frequency band which is not a frequency band for a cellular system when a terminal apparatus is in a connected mode in the cellular system; and a second control unit configured to control the terminal apparatus such that when the terminal apparatus is in the connected mode in the cellular system, the terminal apparatus transmits or receives a signal in a first frequency band which is the frequency band for the cellular system and receives a multicast signal transmitted from a base station of another cellular system different from the cellular system in the second frequency band.

According to the present disclosure, there is provided an apparatus, including: a measuring unit configured to perform measurement for an MBSFN reference signal; and a first control unit configured to perform cell selection or cell reselection, or a measurement report based on a result of the measurement.

According to the present disclosure, there is provided an apparatus, including: an acquiring unit configured to acquire information indicating measurement to be performed by a terminal apparatus; and a control unit configured to notify the terminal apparatus of the measurement. The measurement includes measurement for an MBSFN reference signal.

According to the present disclosure, there is provided an apparatus, including: an acquisition unit configured to acquire information indicating one or more frequency bands which are not frequency bands for a cellular system; and a control unit configured to notify the terminal apparatus of the one or more frequency bands when the terminal apparatus transitions from a connected mode to an idle mode in the cellular system.

Advantageous Effects of Invention

As described above, according to the present disclosure, it is possible to increase opportunities for terminal apparatuses to receive multicast signals. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 4 is an explanatory diagram for describing an example of a signal transmitted in an MBSFN subframe.

FIG. 5 is an explanatory diagram illustrating an example of a CRS transmitted in the normal subframes.

FIG. 8 is an explanatory diagram illustrating examples of a PMCH and an MTCH mapped to the PMCH.

MODE(S) FOR CARRYING OUT THE INVENTION

Figure 1:
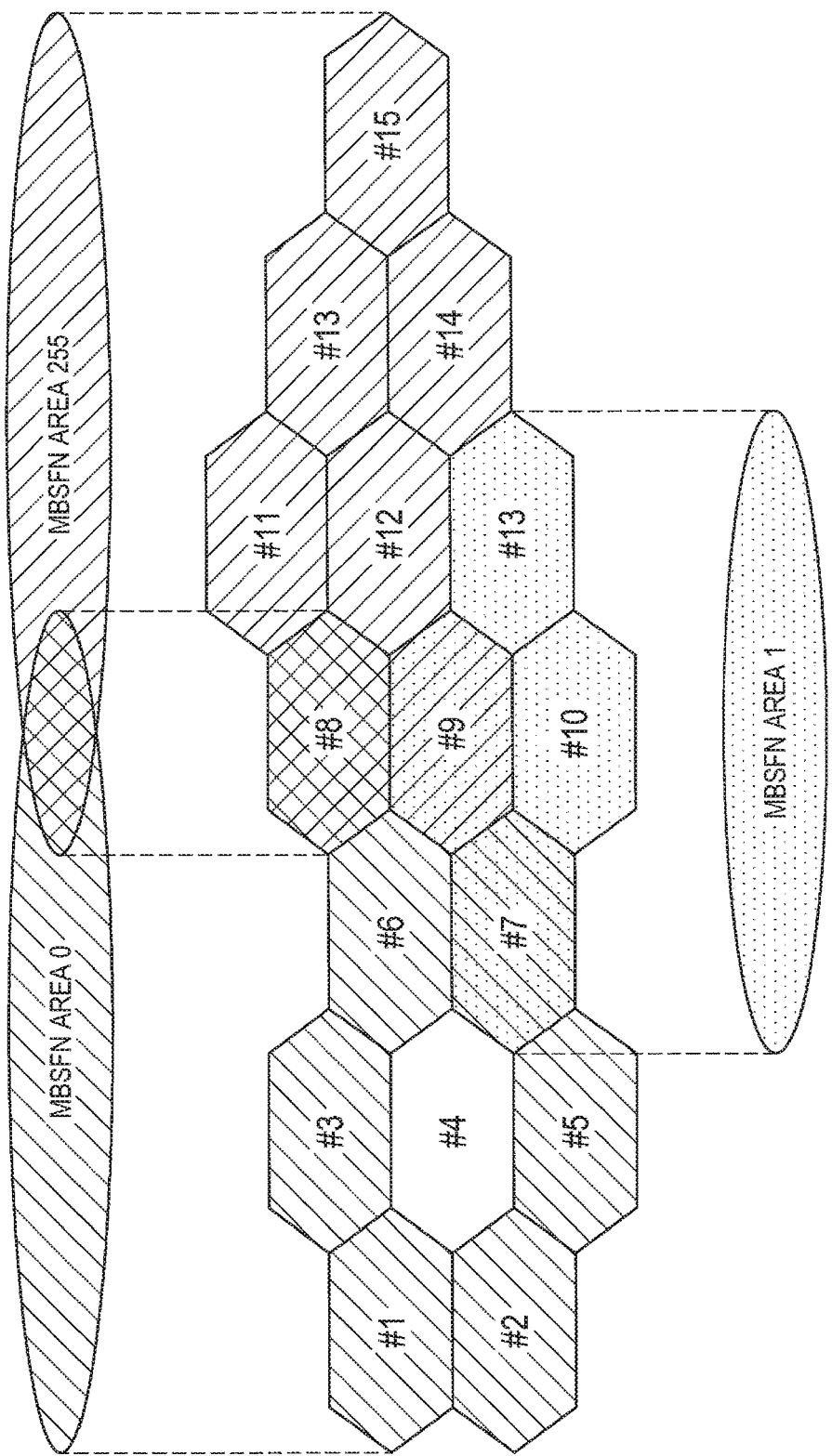
FIG. 1 is an explanatory diagram illustrating an example of an MBSFN area.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Introduction
1.1. Technology related to MBSFN
1.2. Operation of terminal apparatus
2. Schematic configuration of system
3. Configurations of apparatuses
3.1. Configuration of terminal apparatus
3.2. Configuration of base station
4. First Embodiment
4.1. Overview
4.2. Technical features
4.3. Flow of process
5. Second Embodiment
5.1. Overview
5.2. Technical features
5.3. Flow of process
6. Third Embodiment
6.1. Overview
6.2. Technical features
6.3. Flow of process
7. Application examples
7.1. Application example regarding base station
7.2. Application example regarding terminal apparatus
8. Conclusion

1. INTRODUCTION

A technology related to MBSFN and an operation of a user equipment (UE) of LTE will be described with reference to FIGS. 1 to 9.

<1.1. Technology Related to MBSFN>

First, a technology related to the MBSFN will be described with reference to FIGS. 1 to 9.

(1) MBSFN Area

In an MBSFN, a plurality of base stations are mutually synchronized to deliver the same content. That is, in an MBSFN, a plurality of base stations transmit the same data with the same radio resources. Cells (that is, a plurality of cells) of the plurality of base stations are referred to as MBSFN areas. Each cell can belong to a maximum of 8 MBSFN areas. Hereinafter, a specific example of an MBSFN area will be described with reference to FIG. 1.

FIG. 1 is an explanatory diagram illustrating an example of an MBSFN area. Referring to FIG. 1, cells #1 to #15 are illustrated. In this example, an MBSFN area 0 includes cells #1 to #3 and #5 to #8, an MBSFN area 1 includes cells #7, #9, #10, and #13, and an MBSFN area 255 includes cells #8, #9, and #11 to #15. Cell #7 belongs to both of the MBSFN area 0 and the MBSFN area 1. Cell #8 belongs to both of the MBSFN area 0 and the MBSFN area 255. Cell #9 belongs to both of the MBSFN area 1 and the MBSFN area 255. Cell #4 belongs to neither the MBSFN area 1 nor the MBSFN area.

(2) Channels Related to MBMS

Logical channels, transport channels, and physical channels are decided for the MBMS. Hereinafter, this point will be described with reference to FIG. 2.

Figure 2:
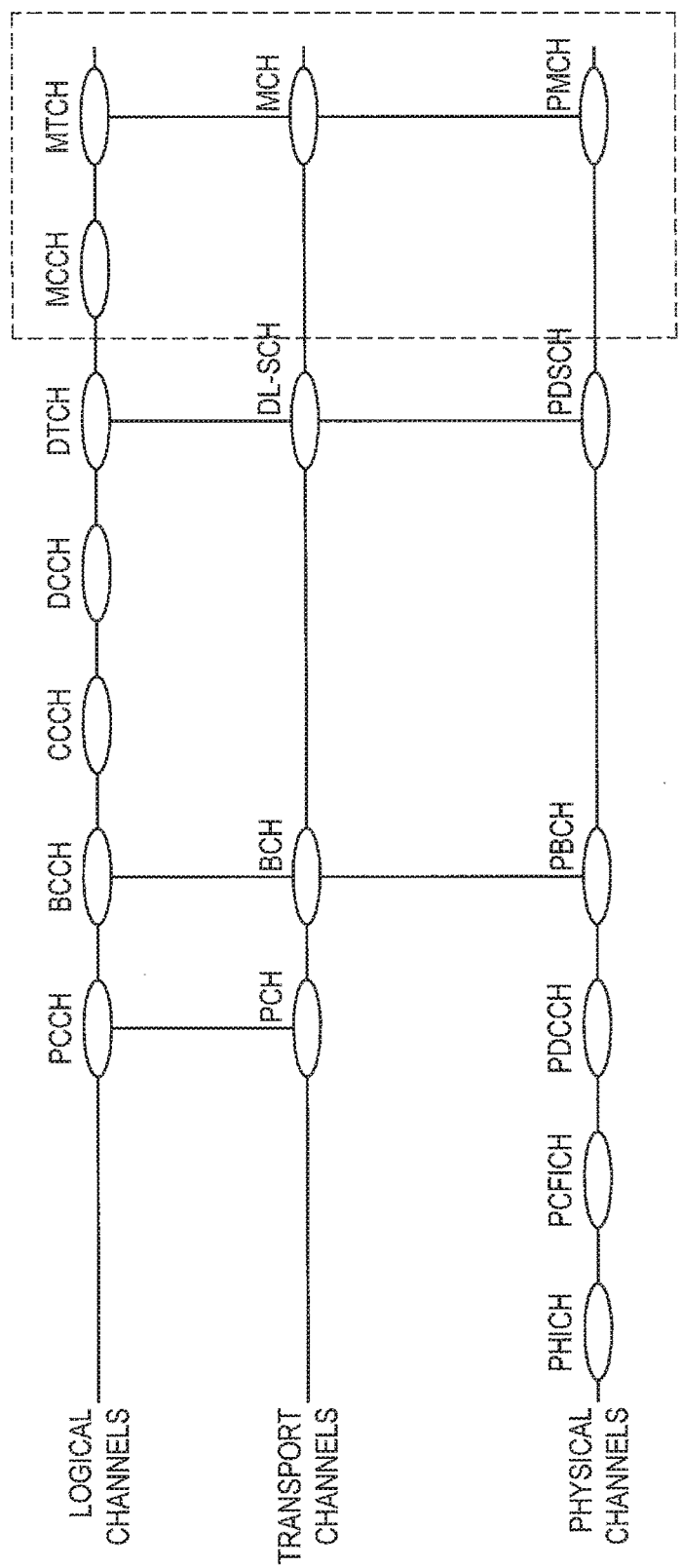
FIG. 2 is an explanatory diagram illustrating channels for an MBMS.

FIG. 2 is an explanatory diagram illustrating channels for an MBMS. Referring to FIG. yz2, logical channels, transport channels, and physical channels decided in LTE are illustrated. In particular, a multicast control channel (MCCH) and a multicast traffic channel (MTCH) are decided as the logical channels for the MBMS. The MCCH is a channel for transmitting control information such as an MBSFN area configuration message and an MBM counting request messega (MBMS). The MTCH is a channel for transmitting data of the MBMS. A physical multicast channel (PMCH) is decided as the physical channel for the MBMS. Both of the control information mapped to the MCCH and data mapped to the MTCH are mapped to the PMCH via a multicast channel (MCH) which is a transport channel.

(3) MBSFN Subframes

The MBSFN is transmitted with MBSFN subframes. The MBSFN subframe is indicated by a radio frame allocation period, a radio frame allocation offset, and a subframe allocation. Hereinafter, specific examples of the MBSFN subframes will be described with reference to FIG. 3.

Figure 3:
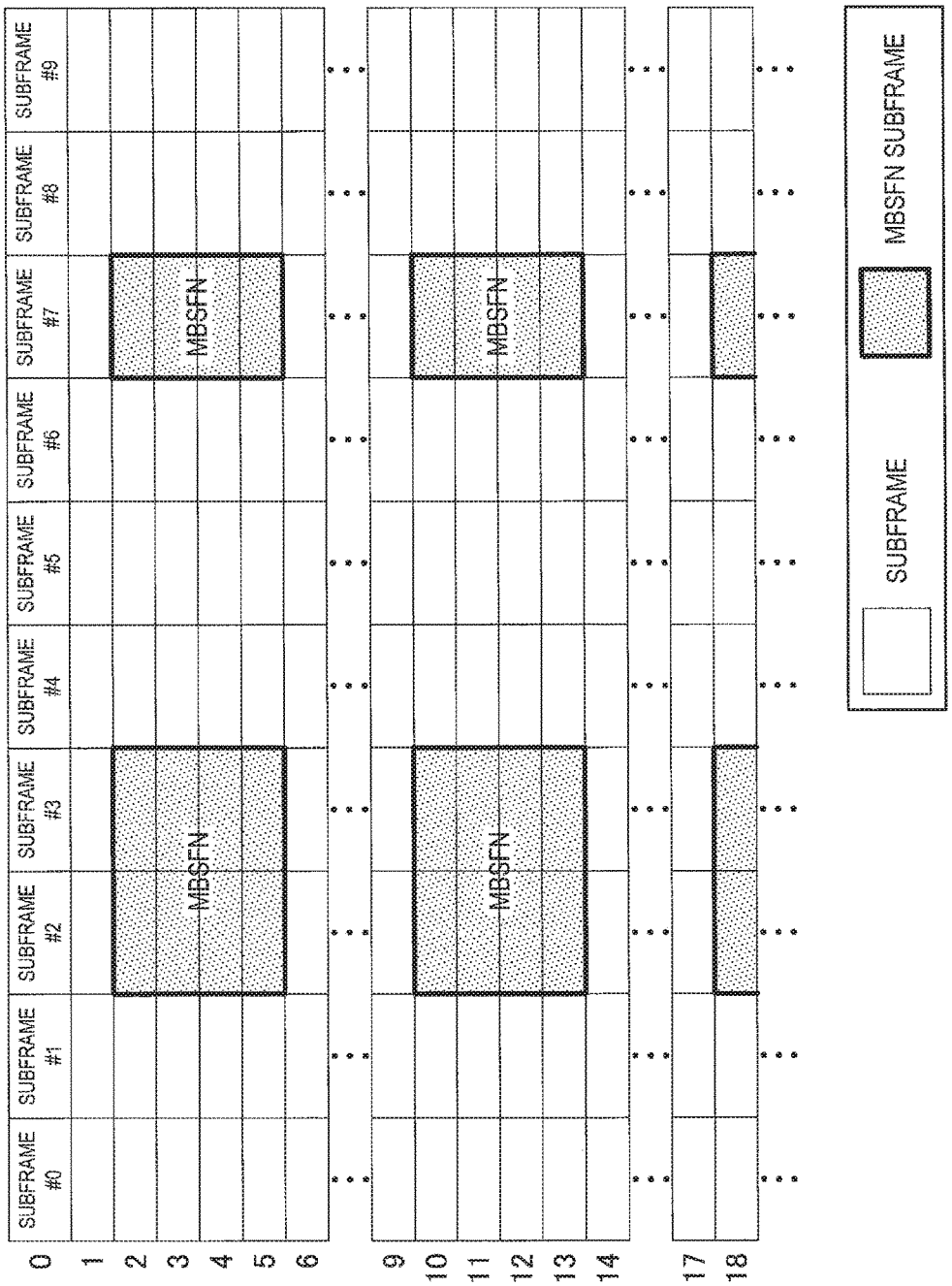
FIG. 3 is an explanatory diagram illustrating examples of MBSFN subframes.

FIG. 3 is an explanatory diagram illustrating examples of the MBSFN subframes. Referring to FIG. 3, subframes included in a radio frame of each system frame number (SFN) are illustrated. In this example, the radio frame allocation period is 8 and the radio frame allocation offset is 2. The subframe allocation is a 4 frame pattern (24 bits). Therefore, a radio frame of the SFN satisfying "SFN mod 8=2" (that is, the SFN of 2, 10, 18, or the like) and 3 radio frames continuously subsequent to the radio frame are radio frames for the MBSFN. In this example, frequency division duplexing (FDD) is adopted and the subframe allocation is "011010 011010 011010 011010." When the FDD is adopted, bits of the subframe allocation indicate subframes #1, #2, #3, #6, #7, and #8. Therefore, of the radio frames, subframes #2, #3, and #7 are MBSFN subframes.

Subframes with which system information and paging information are transmitted are not used as the MBSFN subframes. Thus, when the FDD is adopted, subframes #0, #4, #5, and #9 are not used as the MBSFN subframes. When time division duplexing (TDD) is adopted, subframes #0, #1, #2, #5, and #6 are not used as the MBSFN subframes.

For example, a terminal apparatus is notified of the MBSFN subframes with system information block (SIB) 2. Accordingly, the terminal apparatus can know an MBSFN area. The terminal apparatus is notified of the MBSFN subframes of each MBSFN area also with control information mapped to the MCCH (MBSFN area configuration message), as will be described below.

(4) Reference Signal

The MBSFN subframe includes an MBSFN region and a non-MBSFN region. Since the PMCH is arranged in the MBSFN region, and control information mapped to the MCCH and data mapped to the MTCH are transmitted specifically in the MBSFN region.

Reference Signal (RS)

The base stations of the cells belonging to an MBSFN area transmit the same signal particularly in the MBSFN regions of the MBSFN subframes. Therefore, such a base station does not transmit a cell-specific reference signal (CRS) in the MBSFN region. Instead, such a base station transmits an MBSFN reference signal (MBSFN-RS) which is a reference signal for the MBSFN. The MBSFN-RS is transmitted with the same radio resources (that is, the same resource elements) in all the cells belonging to an MBSFN area. This point will be described below with reference to FIG. 4 using a specific example.

FIG. 4 is an explanatory diagram illustrating an example of signals transmitted in the MBSFN subframes. Referring to FIG. 4, two resource blocks (RB) arranged in a time direction in the MBSFN subframes are illustrated. In this example, the MBSFN subframes include 12 OFDM symbols in the time direction. The MBSFN subframe includes a non-MBSFN region extending over the first two OFDM symbols among the 12 OFDM symbols and an MBSFN region continuing after the non-MBSFN region. In the non-MBSFN region, the CRS can be transmitted. On the other hand, in the MBSFN region, a common MBSFN-RS between cells belonging to the MBSFN area is transmitted. In the MBSFN region, the control information mapped to the MCCH and/or the data mapped to the MTCH are transmitted.

The CRS is transmitted in subframes other than the MBSFN subframes. The CRS is used for cell selection, channel estimation, and synchronous detection, and the like. A specific example of the CRS will be described below with reference to FIG. 5.

FIG. 5 is an explanatory diagram illustrating an example of the CRS transmitted in the normal subframes. Referring to FIG. 5, two resource blocks (RBs) arranged in the time direction in the normal subframes are illustrated. The normal subframes include 14 OFDM symbols in the time direction. The CRS is transmitted with a predetermined resource element (RE) in each RB. The predetermined RE is set for each cell.

(5) MCCH, MTCH, and PMCH (a) Relation Between MBSFN Area and MCCH

One MCCH corresponds to one MBSFN area. That is, the MCCH is present in each MBSFN area to which the cell belongs.

(b) SIB 13

An SIB 13 indicates a subframe or the like in which the MCCH is disposed and the terminal apparatus is notified of the SIB 13. More specifically, the SIB 13 includes an MCCH repetition period, an MCCH offset, and subframe allocation information. Hereinafter, specific examples of the subframes in which the MCCH is disposed will be described with reference to FIG. 6.

Figure 6:
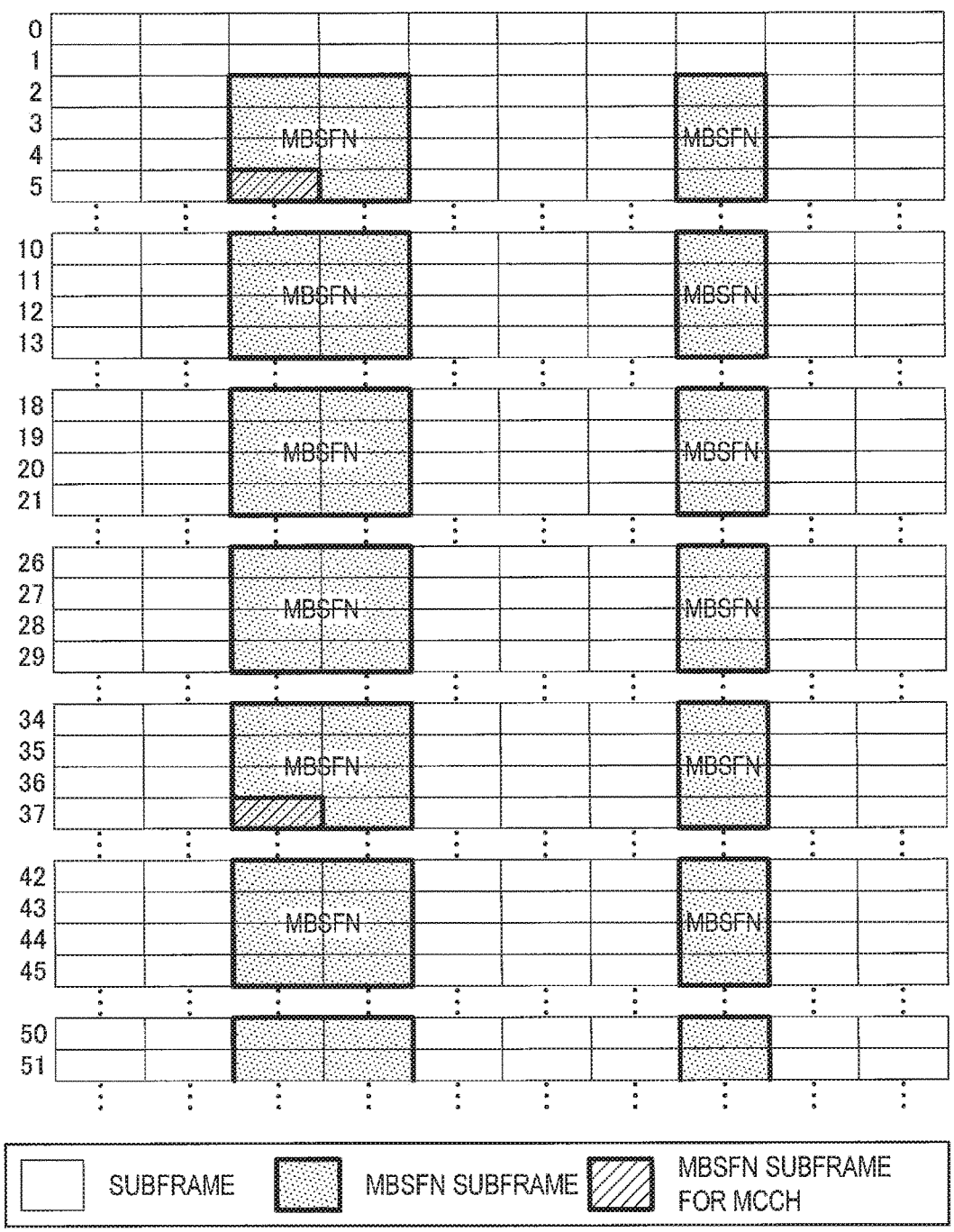
FIG. 6 is an explanatory diagram illustrating examples of subframes in which an MCCH is disposed.

FIG. 6 is an explanatory diagram illustrating examples of the subframes in which an MCCH is disposed. Referring to FIG. 6, the subframes included in a radio frame of each system frame number (SFN) are illustrated. The MBSFN subframes of this example are the same as the MBSFN subframes illustrated in FIG. 3. In this example, the MCCH repetition period is 32 and the MCCH offset is 5. Therefore, a radio frame of the SFN satisfying "SFN mod 32=5" (that is, the SFN of 5, 37, or the like) is a radio frame in which the MCCH is disposed. In this example, the subframe allocation information is "010000." When the FDD is adopted, bits of the subframe allocation indicate subframes #1, #2, #3, #6, #7, and #8. Therefore, of the radio frames, subframe #2 is a subframe in which the MCCH is disposed. In this way, the MCCH is periodically disposed in the MBSFN subframe.

The MCCH and the MTCH are multiplexed in a media access control (MAC) layer, but the terminal apparatus can demodulate the MCCH and the MTCH by multiplexing information of an MAC header.

(c) MBSFN Area Configuration Message

The MBSFN area configuration message is mapped to the MCCH.

(c-1) Common Subframe Allocation (CSA)

First, the MBSFN area configuration message includes a common subframe allocation (CSA) pattern list and a CSA period. The information indicates the MBSFN subframes of the MBSFN area. The CSA pattern list includes a radio frame allocation period, a radio frame allocation offset, and a subframe allocation. Hereinafter, specific examples of the MBSFN subframes indicated by the information will be described with reference to FIG. 7.

Figure 7:
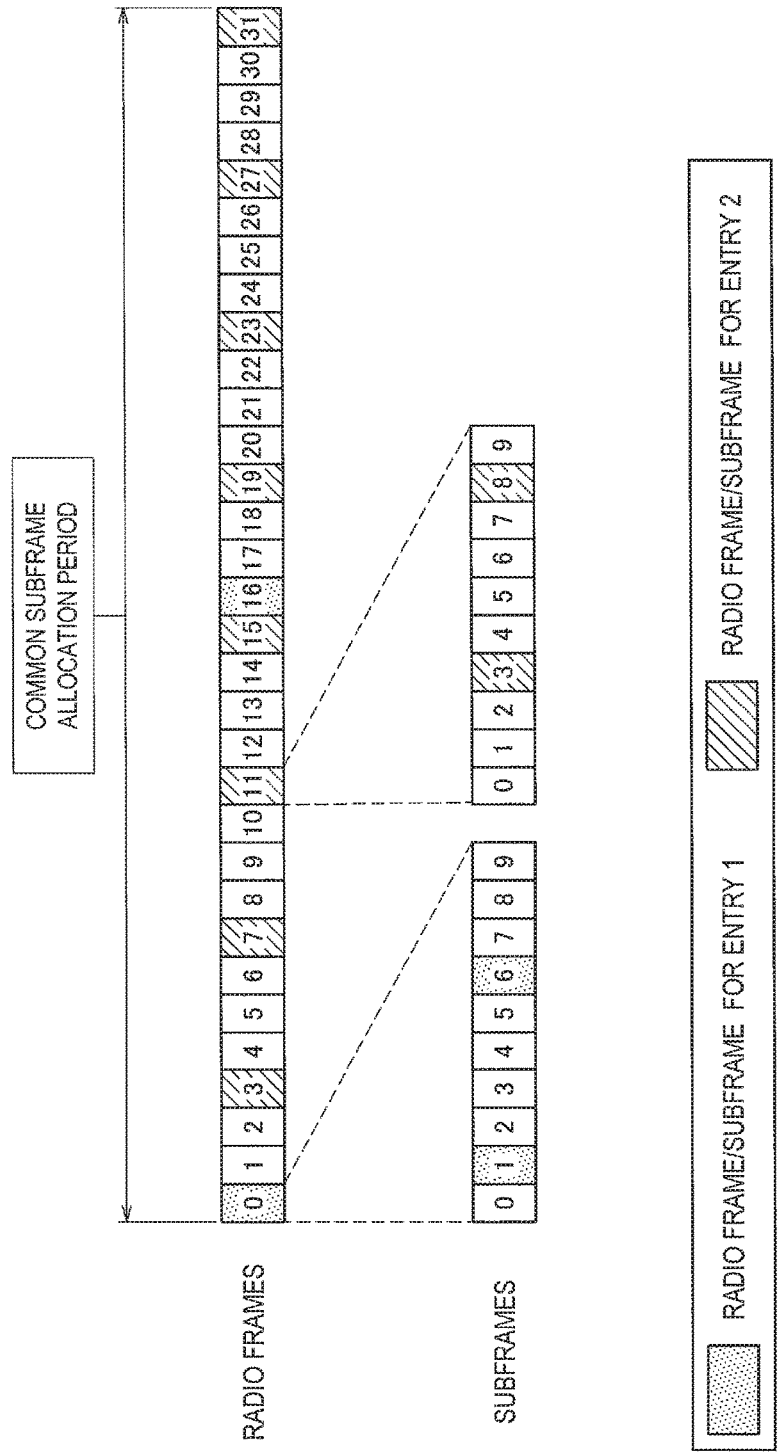
FIG. 7 is an explanatory diagram illustrating examples of MBSFN subframes.

FIG. 7 is an explanatory diagram illustrating examples of the MBSFN subframes. Referring to FIG. 7, radio frames extending over the CSA period are illustrated. In this example, the CSA period is 32 radio frames. In this example, the CSA pattern list includes entries 1 and 2. In the entry 1, the radio frame allocation period is 16, the radio frame allocation offset is 0, and the subframe allocation is "100100" of 1 frame pattern (6 bits). Thus, the MBSFN subframes of the entry 1 are subframes #1 and #6 in 2 radio frames in which the SFN is 0 and 16. In the entry 2, the radio frame allocation period is 4, the radio frame allocation offset is 3, and the subframe allocation is "001001" of 1 frame pattern (6 bits). Thus, the MBSFN subframes of the entry 2 are subframes #3 and #8 in 8 radio frames in which the SFN is 3, 7, 11, 15, 19, 23, 27, and 31. Thus, in this example, a total of 20 subframes in the CSA period are illustrated as the MBSFN subframes.

(c-2) PMCH Information

Further, the MBSFN area configuration message includes a PMCH information list. The PMCH information list indicates the MBSFN subframes in which each PMCH is disposed and one or more MTCHs mapped to each PMCH. In the first subframe in the PMCH, MCH scheduling information (MSI) which is scheduling information of the MTCH mapped to the PMCH is transmitted. The PMCH information list also indicates a transmission period of the MSI. The period is referred to as an MCH scheduling period (MSP). Hereinafter, examples of the PMCH and the MTCH mapped to the PMCH will be described with reference to FIG. 8.

FIG. 8 is an explanatory diagram illustrating examples of the PMCH and an MTCH mapped to the PMCH. Referring to FIG. 8, four sets of 20 MBSFN subframes described with reference to FIG. 7 are illustrated. That is, 80 MBSFN subframes over four CSA periods (that is, CSA periods 1 to 4) are illustrated. In this example, of the 20 MBSFN subframes in the CSA periods (32 radio frames), the first to seventh subframes are allocated to a PMCH 1. The eighth to eleventh subframes are allocated to a PMCH 2, the twelfth to fifteenth subframes are allocated to a PMCH 3, and the sixteenth to twentieth subframes are allocated to a PMCH 4. Logical channels 1 and 2 (that is, MTCHs 1 and 2) are mapped to the PMCH 1. A logical channel 3 (that is, an MTCH 3) is mapped to the PMCH 2, a logical channel 4 (that is, an MTCH 4) is mapped to the PMCH 3, and a logical channel 5 (that is, an MTCH 5) is mapped to the PMCH 4. When attention is paid to the PMCH 1, the MSP of the PMCH 1 is 64 radio frames and the MSI is transmitted with the PMCH 1 every two CSA periods. During the CSA periods 1 and 2, the logical channel 1 (that is, the MTCH 1) is disposed in the first to ninth subframes among the MBSFN subframes allocated to the PMCH 1. The logical channel 2 (that is, the MTCH 2) is disposed in the tenth to thirteenth subframes. No logical channel (MTCH) is disposed in the fourteenth subframe. During the CSA periods 3 and 4, the logical channel 1 is disposed in the first to eighth subframes among the MBSFN subframes allocated to the PMCH 1. The logical channel 2 is disposed in the ninth to the twelfth subframes. No logical channel (MTCH) is disposed in the thirteenth and fourteenth subframe. As illustrated in FIG. 8, the MCCH is also disposed in the MBSFN subframe.

(6) System Configuration of MBSFN

Figure 9:
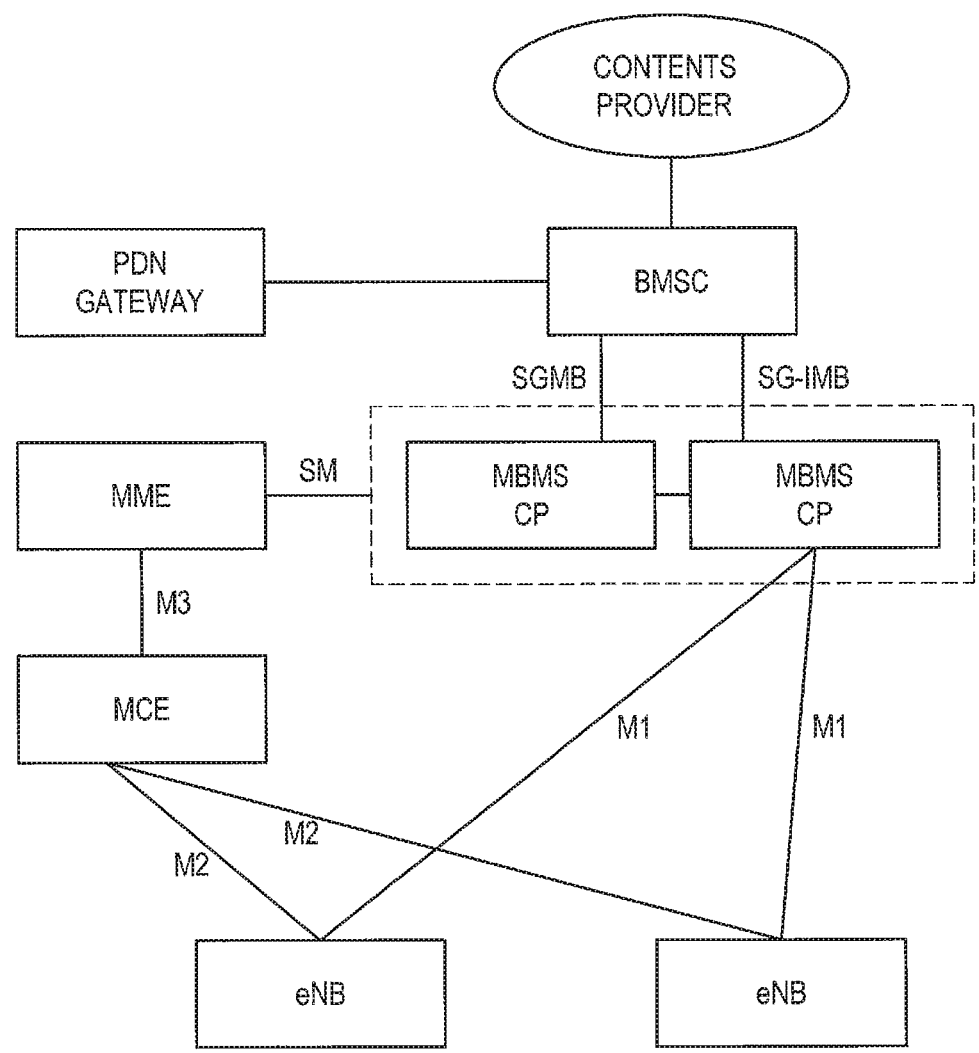
FIG. 9 is an explanatory diagram illustrating an example of the configuration of an LTE network supporting the MBSFN.

An example of the configuration of an LTE network supporting the MBSFN will be described with reference to FIG. 9. FIG. 9 is an explanatory diagram illustrating an example of the configuration of an LTE network supporting the MBSFN. Referring to FIG. 9, the LTE network includes a multi-cell/multicast coordinate entity (MCE), a broadcast/multicast service center (BM-SC), an MBMS gateway (GW), and a mobility management entity (MME). Such nodes are logical nodes. The MCE causes an evolved Node B (eNB) of a cell belonging to the MBSNF area to transmit the same data with the same radio resources. Specifically, for example, the MCE performs scheduling related to the MBSNF in the MBSNF area. The BM-SC performs data flow control in a core network, authentication, charging, and the like of a contents provider. The MBMS-GW performs transmission of multicast IP packets from the BM-SC to the eNB and a process on a session control signal via the MME. The MME performs a process on a non-access stratum (NAS).

The example in which one MCE corresponds to a plurality of eNBs has been described, but the MCE is not limited to the related example. For example, each eNB may include the MCE.

<1.2. Operation of UE in Each Mode>

Next, the operation of the UE in each mode will be described.

(1) Operation in RRC Idle Mode

A UE in a radio resource control (RRC) idle mode performs cell selection, cell reselection, reception of system information, monitoring of a paging message in discontinuous reception (DRX) and a system information change, and recording of logs of measurement results, a location, and a time, and the like.

(a) Paging

For example, in the DRX, the UE is in a sleep mode most of the time, and wakes for a short period of time to monitor control information which is transmitted on a physical downlink control channel (PDCCH). When the UE discovers control information including a cyclic redundancy check (CRC) bit scrambled by a paging radio network temporary identifier (P-RNTI) allocated for paging, the UE acquires a paging message which is transmitted on a paging channel (PCH) and a physical downlink shared channel (PDSCH). Then, the UE checks whether there is an identifier of the UE in the paging message. If there is no identifier in the paging message, the UE enters the sleep mode again.

(b) Cell Selection

The UE performs cell selection when power is turned on (a switch is turned on), when it returns to a coverage area, and when it transitions from an RRC connected mode to the RRC idle mode. A component carrier (CC) serving as a cell selection target may be selected based on a frequency list stored in the UE or may be selected with no frequency list. In addition, the eNB reports system information indicating a priority of a CC for each radio access scheme. For example, when conditions that a cell belong to a predetermined public land mobile network (PLMN), access to the cell not be prohibited, and cell selection criteria be satisfied are satisfied, the cell is selected.

The cell selection criteria are specified as S criteria in Third Generation Partnership Project (3GPP) TS 36.304. The UE specifies a PLMN from received system information (an SIB1) and selects a PLMN according to a predetermined PLMN selection priority. Then, the UE selects an appropriate cell belonging to the selected PLMN according to the S criteria. The UE selects an appropriate cell based on a result of measurement by the UE.

Further, one cell on one frequency band is selected through the cell selection. In other words, the UE selects a frequency band through the cell selection as well.

(2) Operation in Connected Mode

The UE in the RRC connected mode performs transmission and reception of data, feedback of channel state information (CSI), measurement and measurement report, and monitoring of a paging message and a system information change. Further, handover and addition of a secondary component carrier (SCC) are controlled by the eNB.

The UE transmits and receives data in the component carrier (CC). The PDCCH (physical) is used for resource allocation for transmission and reception.

For example, when a small cell in which a downlink signal is transmitted in a frequency band (for example, a wireless Local Area Network (LAN) channel) included in an unlicensed band is detected, the UE receives system information of the small cell and specifies the PLMN of the small cell. If the PLMN of the small cell is the same as a PLMN of a serving cell (that is, when the small cell and the serving cell are cells of the same operator), the UE performs measurement for the frequency band included in the unlicensed band (for example, measurement of reference signal received power (RSRP) of CRS) and reports a measurement result to an eNB of the serving cell. For example, when the measurement result satisfies a predetermined condition, the eNB of the serving cell adds the frequency band of the unlicensed band as the SCC of the UE.

The UE performs frame synchronization using a synchronization signal transmitted in the frequency band of the unlicensed band, acquires information indicating an MBSFN subframe, information indicating a configuration of an MCCH, and the like from the system information, and acquires information indicating a configuration of a PMCH and the like from an MBSFN area configuration message transmitted on the MCCH. Then, the UE receives MBSFN data transmitted on the PMCH.

2. SCHEMATIC CONFIGURATION OF SYSTEM

Figure 10:
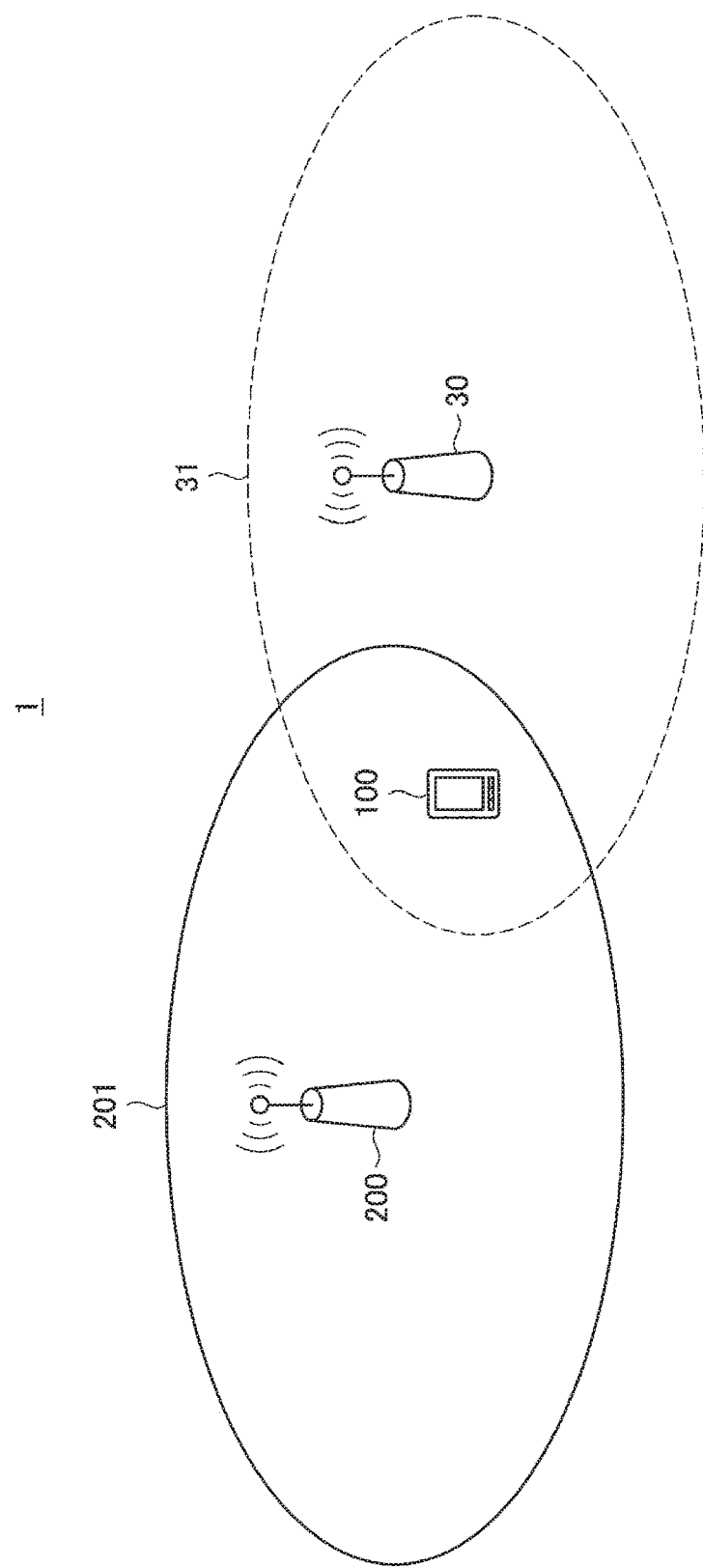
FIG. 10 is an explanatory diagram illustrating an example of a schematic configuration of a system according to an embodiment of the present disclosure.

Next, a schematic configuration of a system according to an embodiment of the present disclosure will be described with reference to FIGS. 10 and 11. FIG. 10 is an explanatory diagram illustrating an example of a schematic configuration of a system 1 according to an embodiment of the present disclosure. Referring to FIG. 10, the system 1 includes a terminal apparatus 100, a base station 200, and a base station 30.

(1) Base Station 200

The base station 200 is a base station of a first cellular system.

For example, the base station 200 performs radio communication with a terminal apparatus (for example, a terminal apparatus located in a cell 201). More specifically, for example, the base station 200 transmits a downlink signal to the terminal apparatus and receives an uplink signal from the terminal apparatus.

For example, the first cellular system is a system of a first operator. For example, the first cellular system (or a network of the first cellular system) is a PLMN.

(2) Base Station 30

The base station 30 is a base station of a second cellular system different from the first cellular system.

For example, the base station 30 performs radio communication with a terminal apparatus (for example, a terminal apparatus located in the cell 31). More specifically, for example, the base station 30 transmits a downlink signal to the terminal apparatus and receives an uplink signal from the terminal apparatus.

For example, the second cellular system is a system of a second operator different from the first operator. For example, the second cellular system (or a network of the second cellular system) is a PLMN.

(3) Terminal Apparatus 100

The terminal apparatus 100 is a terminal apparatus which is capable of performing radio communication in the first cellular system.

For example, the terminal apparatus 100 performs radio communication with the base station 200 of the first cellular system. For example, the terminal apparatus 100 receives a downlink signal transmitted from the base station 200 and transmits an uplink signal to the base station 200.

(4) Frequency Band (a) Frequency Band for Cellular Systems

For example, the base station 200 performs radio communication using a frequency band (for example, a CC) for the first cellular system. In other words, the base station 200 performs transmission and reception of a signal in the frequency band for the first cellular system. For example, the frequency band for the first cellular system is a component carrier. The frequency band for the first cellular system is a frequency band included in a licensed band.

For example, the base station 30 performs radio communication using a frequency band (for example, a CC) for the second cellular system. In other words, the base station 30 performs transmission and reception of a signal in the frequency band for the second cellular system. For example, the frequency band for the second cellular system is a component carrier. The frequency band for the second cellular system is a frequency band included in the licensed band.

(b) Use of Shared Band

The base station 200 and/or the base station 30 may perform radio communication using a frequency band (hereinafter referred to as "shared band") shared by a plurality of radio communication systems. In other words, the base station 200 and/or the base station 30 may transmit or receive signals in the shared band. The shared band is used as a CC by the base station 200 and/or the base station 30. The shared band is a frequency band included in the unlicensed band.

As an example, the unlicensed band is a 5 GHz band. In this case, for example, the shared band is a channel of a wireless LAN. In other words, the shared band is a frequency band which is shared among a cellular system, a wireless LAN, and the like. Alternatively, the unlicensed band may be any other band such as a 3.5 GHz band or a 60 GHz band.

In the case of FDD, the shared band can be used as a downlink-dedicated frequency band in the cellular system.

(c) Example of Frequency Band

Figure 11:
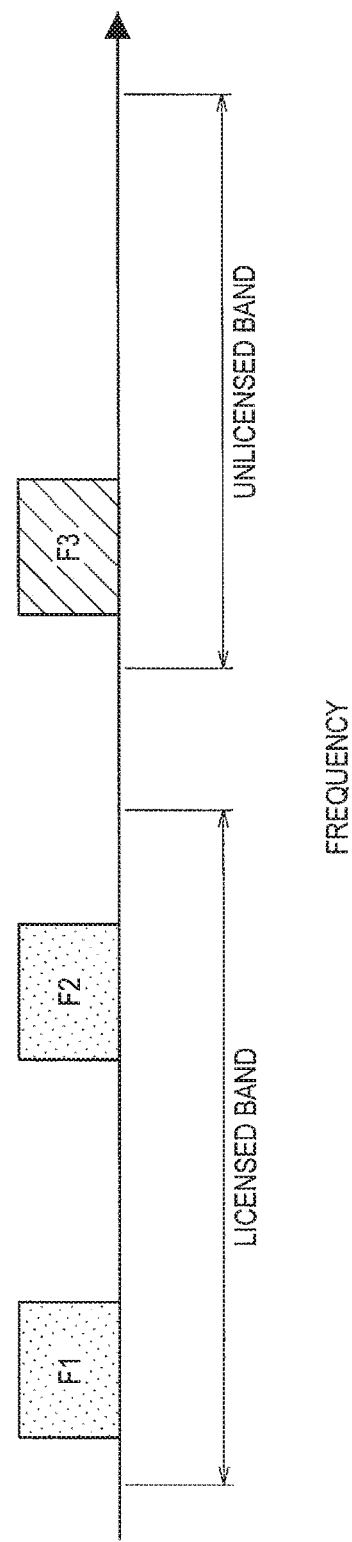
FIG. 11 is an explanatory diagram for describing an example of a frequency band and a shared band for a cellular system.

FIG. 11 is an explanatory diagram for describing an example of the frequency band and the shared band for the cellular system. Referring to FIG. 11, three frequency bands F1 to F3 are illustrated. The frequency band F1 and the frequency band F2 are frequency bands included in the licensed band, and the frequency band F3 is a frequency band included in the unlicensed band. The frequency band F1 is a frequency band for the first cellular system and used by the base station 200. The frequency band F2 is a frequency band for the second cellular system and used by the base station 30. The frequency band F3 can be used by the base station 200 and/or the base station 30. The frequency band F3 is, for example, a channel of a wireless LAN.

3. CONFIGURATIONS OF APPARATUSES

Figure 12:
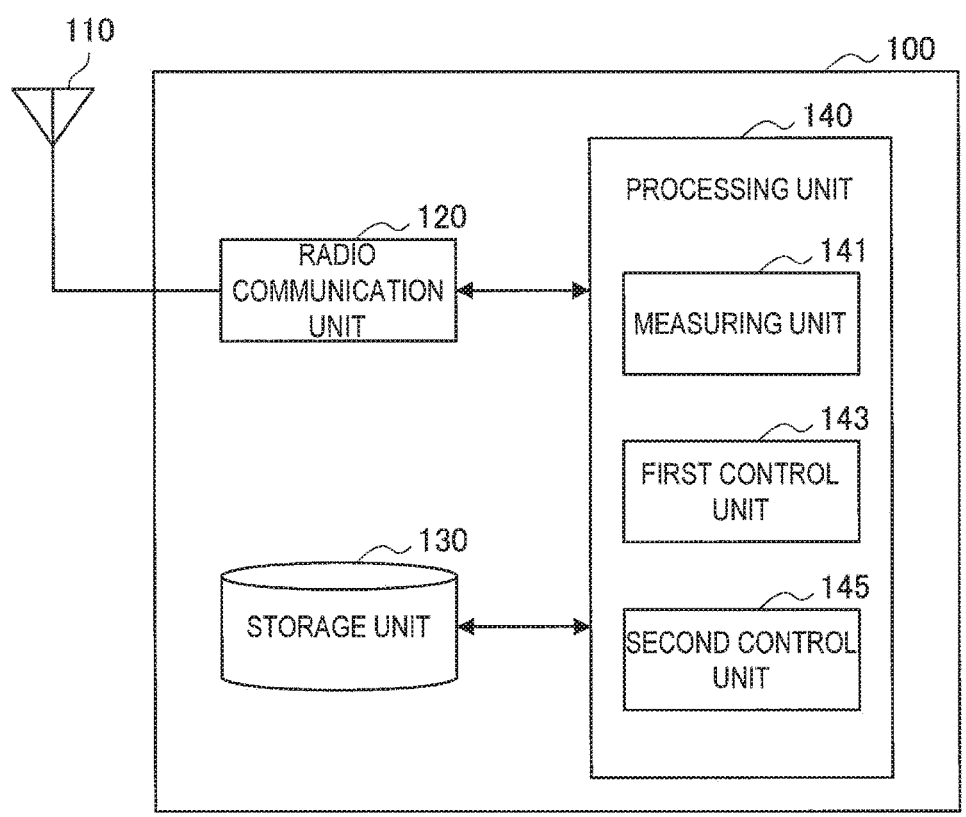
FIG. 12 is a block diagram illustrating an example of a configuration of a terminal apparatus according to the embodiment.
Figure 13:
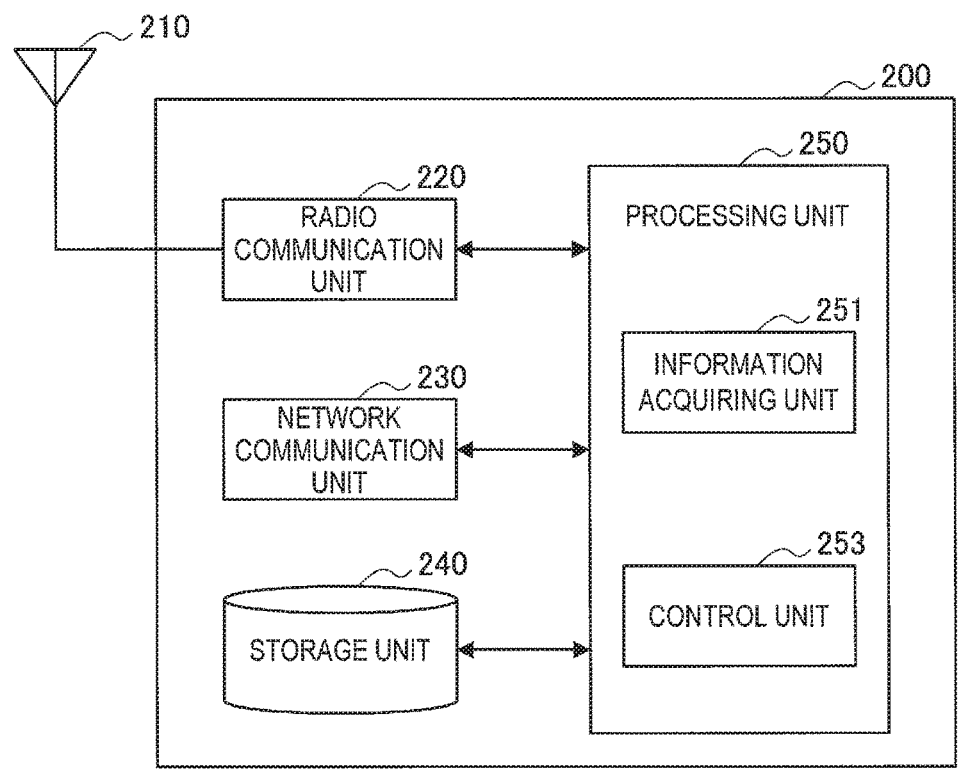
FIG. 13 is a block diagram illustrating an example of a configuration of a terminal apparatus according to the embodiment.

Next, an example of configurations of the terminal apparatus 100 and the base station 200 according to an embodiment of the present disclosure will be described with reference to FIGS. 12 and 13.

<3.1. Configuration of Terminal Apparatus>

First, an example of a configuration of the terminal apparatus 100 according to an embodiment of the present disclosure will be described with reference to FIG. 12. FIG. 12 is a block diagram illustrating an example of a configuration of the terminal apparatus 100 according to an embodiment of the present disclosure. Referring to FIG. 12, the terminal apparatus 100 includes an antenna unit 110, a radio communication unit 120, a storage unit 130, and a processing unit 140.

(1) Antenna Unit 110

The antenna unit 110 radiates a signal output by the radio communication unit 120 to a space as radio waves. The antenna unit 110 converts the radio waves in space into a signal, and outputs the signal to the radio communication unit 120.

(2) Radio Communication Unit 120

The radio communication unit 120 performs transmission and reception of a signal. For example, the radio communication unit 120 receives a downlink signal from the base station and transmits an uplink signal to the base station.

(3) Storage Unit 130

The storage unit 130 temporarily or permanently stores programs and data for an operation of the terminal apparatus 100.

(4) Processing Unit 140

The processing unit 140 provides various functions of the terminal apparatus 100. The processing unit 140 includes a measuring unit 141, a first control unit 143 and a second control unit 145. The processing unit 140 may further include any component other than these components. In other words, the processing unit 140 can also perform an operation other than operations of these components.

An operation of each of the measuring unit 141, the first control unit 143, and the second control unit 145 will be specifically described in one or more corresponding embodiments.

<3.2. Configurations of Base Station>

First, an example of a configuration of the base station 200 according to an embodiment of the present disclosure will be described with reference to FIG. 13. FIG. 13 is a block diagram showing an example of a configuration of the base station 200 according to an embodiment of the present disclosure. Referring to FIG. 13, the base station 200 includes an antenna unit 210, a radio communication unit 220, a network communication unit 230, a storage unit 240 and a processing unit 250.

(1) Antenna Unit 210

The antenna unit 210 radiates a signal output by the radio communication unit 220 as radio waves to a space. The antenna unit 210 converts space radio waves into a signal and outputs the signal to the radio communication unit 220.

(2) Radio Communication Unit 220

The radio communication unit 220 performs transmission and reception of a signal. For example, the radio communication unit 220 transmits a downlink signal to the terminal device, and receives an uplink signal from the terminal device.

(3) Network Communication Unit 230

The network communication unit 230 performs transmission and reception of information. For example, the network communication unit 230 transmits information to another node and receives information from another node. For example, another node includes another base station and another core network node.

(4) Storage Unit 240

The storage unit 240 temporarily or permanently stores programs and data for operation of the base station 200.

(5) Processing Unit 250

The processing unit 250 provides various functions of the base station 200. The processing unit 250 includes an information acquiring unit 251 and a control unit 253. The processing unit 250 may further include any component other than these components. In other words, the processing unit 250 may also perform an operation other than operations of these components.

An operation of each of the information acquiring unit 251 and the control unit 253 will be specifically described in one or more corresponding embodiments.

4. FIRST EMBODIMENT

Next, a first embodiment of the present disclosure will be described with reference to FIGS. 14 to 19.

<4.1. Overview>

(1) Technical Problem

In a current situation, opportunities for terminal apparatuses to receive multicast signals (for example, MBSFN signals transmitted through an MBSFN subframe) are limited. For example, the terminal apparatuses usually receive only multicast signals transmitted in a frequency band for a corresponding cellular system.

Specifically, when the terminal apparatus is in the idle mode, the terminal apparatus receives only multicast signals transmitted in the frequency band selected through the cell selection/cell reselection. In other words, when the terminal apparatus is in the idle mode, the terminal apparatus does not receive multicast signals transmitted in the frequency band which is not selected through the cell selection/cell reselection.

As an example, the shared band (that is, the frequency band shared by a plurality of radio communication systems) is not selected through the cell selection/cell reselection. The first reason for this is, for example, because the shared band is used as the downlink-dedicated frequency band (for example, the downlink dedicated CC) in the cellular system, and the terminal apparatus is unable to respond to a paging message even when the paging message transmitted in the shared band is received. A second reason is, for example, because the shared band is not suitable for continuous reception of the paging message because the period in which the shared band can be used in the cellular system is limited. Therefore, when the terminal apparatus is in the idle mode, the terminal apparatus does not receive the multicast signals transmitted in the shared band.

As another example, frequency bands for other cellular systems (for example, frequency bands of other operators) are not selected through the cell selection/cell reselection. Thus, when the terminal apparatus is in the idle mode, the terminal apparatus does not receive multicast signals transmitted in the frequency bands for other cellular systems.

Therefore, it is desirable to provide a mechanism which is capable of increasing opportunities for terminal apparatuses to receive multicast signals. In particular, it is desirable to provide a mechanism which is capable of increasing opportunities for a terminal apparatus in the idle mode to receive multicast signals.

(2) Technical Solution

In the first embodiment, when the terminal apparatus 100 is in the idle mode, the terminal apparatus 100 receives a paging message transmitted in a first frequency band which is a frequency band for a first cellular system and receives a multicast signal transmitted in a second frequency band other than the frequency band for the first cellular system.

Thus, for example, it is possible to increase opportunities for the terminal apparatus 100 in the idle mode to receive the multicast signal.

<4.2. Technical Features>

Next, technical features according to the first embodiment will be described with reference to FIGS. 14 to 17.

In the first embodiment, as described above, when the terminal apparatus 100 is in the idle mode, the terminal apparatus 100 receives the paging message transmitted in the first frequency band which is the frequency band for the first cellular system and receives the multicast signal transmitted in the second frequency band other than the frequency band for the first cellular system.

The first control unit 143 selects the first frequency band and the second frequency band when the terminal apparatus 100 is in the idle mode. When the terminal apparatus 100 is in the idle mode, the second control unit 145 controls the terminal apparatus 100 such that the terminal apparatus 100 receives the paging message transmitted in the first frequency band and receives the multicast signal transmitted in the second frequency band.

For example, the idle mode is an RRC idle mode.

(1) First Frequency Band (a) Example of First Frequency Band

As described above, the first frequency band is the frequency band for the first cellular system. For example, the first frequency band is a component carrier (CC) and included in the licensed band.

Referring back to FIG. 11, for example, the first frequency band is the frequency band F1. As described above, the frequency band F1 is included in the licensed band and is the frequency band for the first cellular system.

In the case of FDD, for example, the first frequency band includes an uplink band and a downlink band. In FIG. 11, for the sake of simplifying the description, the frequency band F1 is illustrated as one frequency band, but in the case of FDD, for example, the frequency band F1 includes an uplink band and a downlink band regardless of the illustration of FIG. 11.

(b) Selection of First Frequency Band

As described above, the first control unit 143 selects the first frequency band (the frequency band for the first cellular system) when the terminal apparatus 100 is in the idle mode. For example, the first control unit 143 selects the first frequency band through cell selection or cell reselection (and PLMN selection).

(b-1) Cell Selection

For example, the first control unit 143 specifies a PLMN based on received system information (SIB1) and selects a PLMN according to a predetermined PLMN selection priority. Then, the first control unit 143 selects an appropriate cell belonging to the selected PLMN according to the S criteria. The first control unit 143 selects an appropriate cell based on a result of measurement by the terminal apparatus 100. The appropriate cell to be selected is a cell on one frequency band, and the first control unit 143 selects one frequency band through the cell selection.

Specifically, for example, the first control unit 143 selects the first cellular system as the PLMN and selects the cell 201 of the first frequency band (for example, the frequency band F1) as a cell belonging to the first cellular system. In other words, the first control unit 143 selects the first frequency band (for example, the frequency band F1) through the cell selection.

S Criteria

In TS 36.304 of 3GPP, the following S criteria are specified.

$$S_{rxlev} > 0 \text{ AND } S_{qual} > 0 \qquad [\text{Math. 1}]$$

$S_{rxlev}$ is a cell selection reception level value (a cell selection RX level value) (dB) and expressed as follows.

$$S_{rxlev} = Q_{rxlevmeas} - (Q_{rxlevmin} + Q_{rxlevminoffset}) - P\text{compensation} \qquad [\text{Math. 2}]$$

$Q_{rxlevmeas}$ is a measured cell reception level value (a measured cell RX level value), that is, RSRP. $Q_{rxlevmin}$ is a minimum required reception level in a cell (a minimum required RX level in a cell). $Q_{rxlevminoffset}$ is an offset with respect to $Q_{rxlevmin}$. $Q_{rxlevmeas}$ and $Q_{rxlevmin}$ are values indicated by the system information (SIB1). Pcompensation is a parameter for preventing the terminal apparatus having insufficient transmission power from camping on a cell.

$S_{rxqual}$ is a cell selection quality value (dB) and expressed as follows.

$$S_{qual} = Q_{qualmeas} - (Q_{qualmin} + Q_{qualminoffset}) \qquad [\text{Math. 3}]$$

$Q_{qualmeas}$ is a measured cell quality value, that is, RSRQ. $Q_{qualmin}$ is a minimum required quality level in a cell. $Q_{qualminoffset}$ is an offset with respect to $Q_{qualmin}$. $Q_{qualmin}$ and $Q_{qualminoffset}$ are values indicated by the system information (SIB1).

(b-2) Cell Reselection

The first control unit 143 selects a cell on one frequency band (for example, the first frequency band) even in the cell reselection. In other words, the first control unit 143 selects one frequency band (for example, the first frequency band) through the cell reselection.

In the cell reselection, the first control unit 143 selects a cell (and a frequency band) according to a priority between frequency bands (for example, a priority among carrier frequencies notified through SIBs 4 and 5).

(c) Reception of Paging Message

As described above, when the terminal apparatus 100 is in the idle mode, the second control unit 145 controls the terminal apparatus 100 such that the terminal apparatus 100 receives the paging message transmitted in the first frequency band.

(c-1) First Example of Control

For example, the second control unit 145 monitors the control information transmitted on a PDCCH of a paging subframe corresponding to the terminal apparatus 100. When the control information including the CRC bit scrambled by the P-RNTI allocated for paging is discovered, the second control unit 145 acquires the paging message transmitted on the PCH and the PDSCH. For example, when the terminal apparatus 100 is controlled as described above, the terminal apparatus 100 receives the paging message transmitted in the first frequency band.

(c-2) Second Example of Control

For example, the terminal apparatus 100 receives the paging message at the DXR. In this case, the second control unit 145 may control the terminal apparatus 100 through DRX control of the terminal apparatus 100. As a result, the terminal apparatus 100 may receive the paging message transmitted in the first frequency band. The DRX control may be performed such that the terminal apparatus 100 in the sleep state is activated before the paging subframe corresponding to the terminal apparatus 100, and the terminal apparatus 100 enters the sleep state after the paging subframe.

The control by the second control unit 145 is not limited to this example and may be other control.

(d) Others

For example, when the terminal apparatus 100 is in the idle mode, the terminal apparatus 100 performs reception of the system information transmitted in the first frequency band, monitoring of changes in the system information, recording of a result of measurement for the first frequency band, logs of a location and a time, and the like. The second control unit 145 may control the terminal apparatus 100 such that the terminal apparatus 100 performs any of these operations.

For example, one or more base stations 200 of the first cellular system may transmit the multicast signal in the first frequency band (for example, an MBSFN signal transmitted in an MBSFN subframe). In this case, the terminal apparatus 100 in the idle mode may receive the multicast signal transmitted from one or more base stations 200 in the first frequency band. The second control unit 145 may control the terminal apparatus 100 such that the terminal apparatus 100 receives the multicast signal in the first frequency band.

(2) Second Frequency Band (a) Example of the Second Frequency Band (a-1) Shared Band As a first example, the second frequency band is a shared band (that is, a frequency band shared by a plurality of radio communication systems). In other words, the second frequency band is a frequency band included in the unlicensed band.

As an example, the unlicensed band is the 5 GHz band. In this case, for example, the second frequency band (that is, the shared band) is a channel of the wireless LAN. In other words, the second frequency band is a frequency band shared among the first cellular system, the wireless LAN, and the like. Alternatively, the unlicensed band may be any other band such as the 3.5 GHz band or the 60 GHz band.

Referring back to FIG. 11, for example, the second frequency band is the frequency band F3. As described above, the frequency band F3 is included in the unlicensed band.

In the case of FDD, the second frequency band (that is, the shared band) can be used as the downlink-dedicated frequency band in the cellular system.

(a-2) Frequency Band for Another Cellular System

As a second example, the second frequency band is a frequency band for another cellular system different from the first cellular system. As an example, another cellular system is the second cellular system. For example, the second frequency band is a component carrier (CC) and included in the licensed band.

Referring back to FIG. 11, for example, the second frequency band is the frequency band F2. As described above, the frequency band F2 is included in the licensed band and is a frequency band for the second cellular system different from the first cellular system.

(b) Selection of Second Frequency Band

As described above, the first control unit 143 selects the second frequency band when the terminal apparatus 100 is in the idle mode.

(b-1) Trigger

For example, when the terminal apparatus 100 gives priority to reception of the multicast signal, the first control unit selects the second frequency band. As an example, when an application supporting multicasting is activated in the terminal apparatus 100, the first control unit selects the second frequency band.

(b-2) Selection Techniques

As described above, for example, the first control unit 143 selects the first frequency band through normal cell selection or the cell reselection. For example, the first control unit 143 selects the second frequency band through other cell selection or cell reselection (and PLMN selection).

For example, the first control unit 143 selects the second frequency band using a criterion different from that for selection of the first frequency band. In other words, a technique of selecting the frequency band for the first cellular system (for example, the first frequency band) (hereinafter referred to as a "first selection technique") is different from a technique of selecting another frequency band which is not the frequency band for the first cellular system (for example, the shared band or a frequency band for another cellular system) (hereinafter referred to as a "second selection technique").

Criteria for Cellular Systems

For example, the different criteria include a criterion for selecting the cellular system.

First Selection Technique

As described above, in the first selection technique, for example, the first control unit 143 specifies a PLMN based on the received system information (SIB1) and selects a PLMN (for example, the first cellular system) according to a predetermined PLMN selection priority. Then, the first control unit 143 selects an appropriate cell belonging to the selected PLMN. The appropriate cell to be selected is a cell on one frequency band (for example, the first frequency band), and the first control unit 143 selects one frequency band through the cell selection.

Second Selection Technique (Case of Shared Band)

As described above, as a first example, the second frequency band is a shared band. In this case, in the second selection technique (that is, a technique of selecting the shared band), for example, the first control unit 143 selects an appropriate cell of one shared band (for example, the second frequency band) regardless of a PLMN to which a cell belongs. The first control unit 143 selects one shared band through this cell selection.

Alternatively, in the second selection technique (that is, the technique of selecting the shared band), the first control unit 143 may specify the PLMN based on the received system information (SIB1) and select the PLMN according to another PLMN selection priority. As an example, not only a PLMN which is the first cellular system but also a PLMN which is another cellular system (for example, the second cellular system) may be included as a selectable PLMN. Then, the first control unit 143 may select an appropriate cell of one shared band (for example, the second frequency band) belonging to the selected PLMN. The first control unit 143 may select one shared band through this cell selection.

Alternatively, a PLMN ID specific to the shared band may be allocated, and the system information (SIB1) indicating the PLMN ID may be transmitted in the cell of the shared band. In this case, in the second selection technique (that is, the technique of selecting the shared band), the first control unit 143 may select an appropriate cell of one shared band (for example, the second frequency band) in which the system information (SIB1) indicating the PLMN ID specific to the shared band is transmitted. The first control unit 143 may select one shared band through this cell selection.

Second Selection Technique (Case of Frequency Band for Another Cellular System)

As described above, as a second example, the second frequency band is a frequency band for another cellular system different from the first cellular system (for example, the frequency band for the second cellular system). In this case, in the second selection technique (that is, a method of selecting a frequency band for another cellular system different from the first cellular system), the first control unit 143 specifies a PLMN based on the received system information (SIB1) and selects a PLMN (for example, the second cellular system) according to another PLMN selection priority. As an example, the PLMN which is the first cellular system is not included as the selectable PLMN, and other PLMNs are included as the selectable PLMN. Then, the first control unit 143 selects an appropriate cell of one frequency band belonging to the selected PLMN (for example, the frequency band for the second cellular system). The first control unit 143 selects one frequency band through this cell selection.

As described above, the different criteria include the criterion for selecting the cellular system. Thus, for example, the frequency band which is not the frequency band for the first cellular system (for example, the shared band or the frequency band for another cellular system) is selected.

When the second frequency band is the shared band, the different criteria may not include the criteria for selecting the cellular system. In other words, the first control unit 143 may select the PLMN similarly in both of the first selection technique (that is, the technique of selecting the frequency band for the first cellular system) and the second selection technique (that is, the technique of selecting the shared band). As a result, the shared band used by the first cellular system may be selected, and the shared band used by another cellular system (for example, the second cellular system) may not be selected.

Criterion for Measured Reception Power/Reception Quality

For example, the different criteria include a criterion for measured reception power or reception quality.

First Selection Technique

As described above, in the first selection technique, for example, the first control unit 143 selects an appropriate cell belonging to the selected PLMN based on the measurement result by the terminal apparatus 100 according to the S criteria.

Second Selection Technique

Similarly, in the second selection technique, for example, the first control unit 143 selects an appropriate cell based on the measurement result by the terminal apparatus 100 according to the S criteria. However, the first selection technique and the second selection technique differ in values of parameters of the S criteria. Specifically, for example, these techniques differ in $Q_{rxlevmin}$ and/or $Q_{qualmin}$. As an example, $Q_{rxlevmin}$ is smaller in the second selection technique than in the first selection technique.

Thus, for example, it is easy to select the second frequency band (for example, the shared band, or the frequency band for another cellular system). As a result, for example, a possibility of the terminal apparatus 100 receiving the multicast signal increases.

Criterion for Frequency Band

For example, the different criteria include a criterion for the frequency band.

First Selection Technique

As described above, in the first selection technique, the first control unit 143 performs the cell reselection according to a priority among frequency bands.

Second Selection Technique

On the other hand, in the second selection technique, for example, the first control unit 143 performs the cell reselection according to another priority among frequency bands. For example, the frequency band in which the multicast signal is transmitted is included as the selectable frequency band, and the frequency band in which the multicast signal is not transmitted is not included as the selectable frequency band.

Thus, for example, the frequency band in which the multicast signal is transmitted is selected. As a result, for example, the terminal apparatus 100 receives the multicast signal.

The terminal apparatus 100 can recognize the presence or absence of transmission of the multicast signal in the frequency band based on the system information.

SPECIFIC EXAMPLES

As a first example, referring back to FIG. 11, the first control unit 143 selects the cell of the frequency band F3 (the shared band). In other words, the first control unit 143 selects the frequency band F3 (the shared band) through the cell selection/cell reselection.

As a second example, referring back to FIG. 11, the first control unit 143 selects the cell of the frequency band F2 (the frequency band for the second cellular system). In other words, the first control unit 143 selects the frequency band F2 (that is, the frequency band for the second cellular system) through the cell selection/cell reselection.

Operation Up to Measurement

For example, the terminal apparatus 100 performs frame synchronization using the synchronization signal transmitted in the frequency band (for example, the shared band or the frequency band for another cellular system) which is not the frequency band for the first cellular system. Then, the terminal apparatus 100 determines the presence or absence of transmission of the multicast signal based on the system information transmitted in the frequency band. Further, the terminal apparatus 100 performs measurement for the frequency band (for example, measurement of RSRP and/or RSRQ).

Further, for example, the base station 200 transmits system information (for example, an SIB 5) indicating a frequency list including not only the frequency band of the first cellular system but also other frequency bands (for example, the shared band or the frequency band for another cellular system). Thus, for example, the terminal apparatus 100 can recognize not only the frequency band of the first cellular system but also another frequency band (for example, the shared band or the frequency band for another cellular system).

(c) Reception of Multicast Signal

As described above, when the terminal apparatus 100 is in the idle mode, the terminal apparatus 100 receives the multicast signal transmitted in the second frequency band (that is, the frequency band that is not the frequency band for the first cellular system). The second control unit 145 controls the terminal apparatus 100 so that the terminal apparatus 100 receives the multicast signal transmitted in the second frequency band when the terminal apparatus 100 is in the idle mode.

(c-1) Multicast Signal

For example, the multicast signal is an MBSFN signal transmitted in the MBSFN subframe. In other words, when the terminal apparatus 100 is in the idle mode, the terminal apparatus 100 receives the MBSFN signal transmitted in the MBSFN subframe in the second frequency band.

(c-2) Case of Shared Band

As described above, as a first example, the second frequency band is the shared band (that is, the frequency band shared by a plurality of radio communication systems). In this case, the multicast signal is a signal transmitted from the base station 200 of the first cellular system or a base station of another cellular system different from the first cellular system. In other words, when the terminal apparatus 100 is in the idle mode, the terminal apparatus 100 receives the multicast signal transmitted from the base station 200 of the first cellular system or the base station of another cellular system (for example, the base station 30 of the second cellular system) in the shared band. Specific examples will be described below with reference to FIGS. 14 to 16.

First Example

Figure 14:
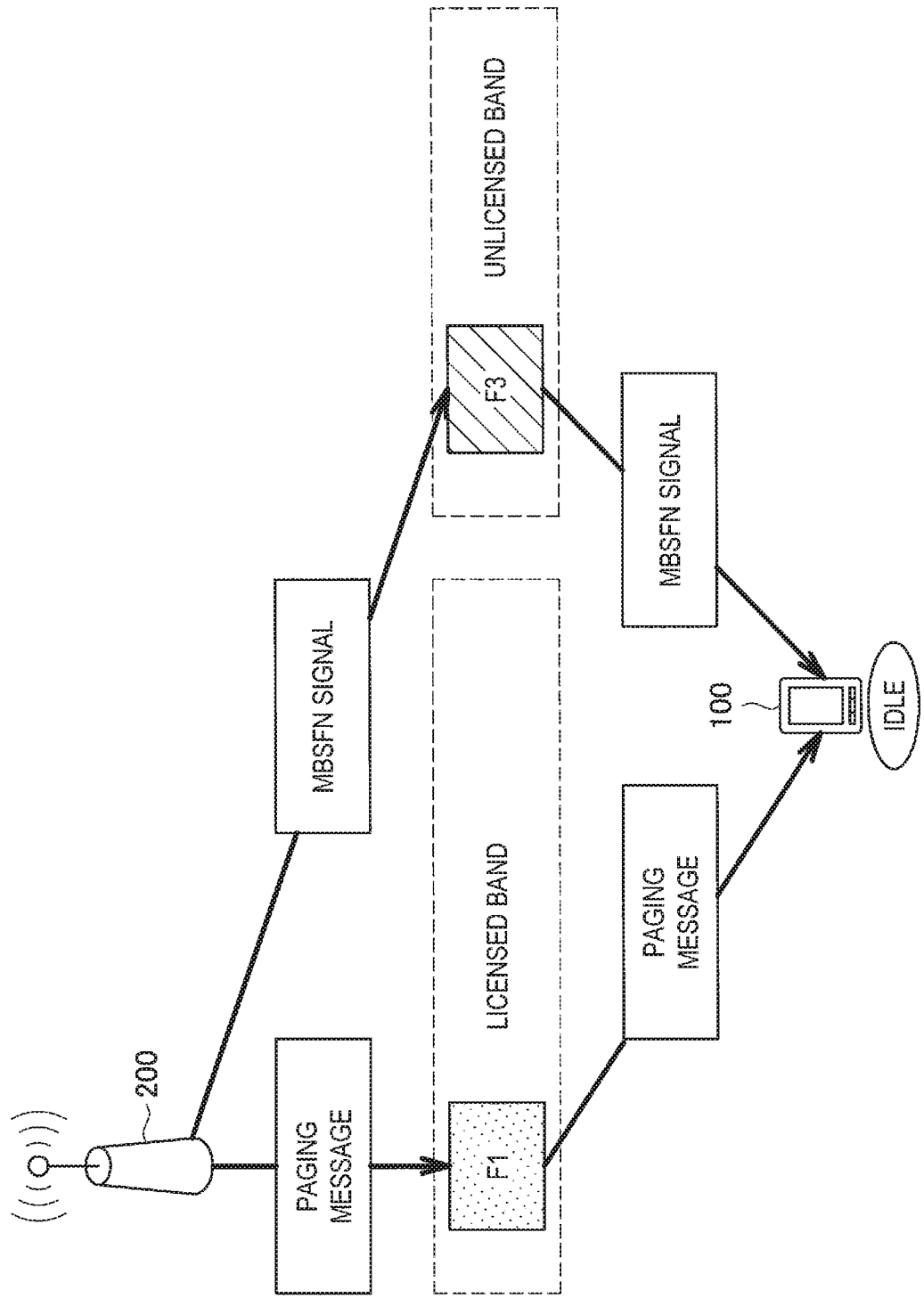
FIG. 14 is an explanatory diagram for describing a first example of reception of a multicast signal in a second frequency band.

FIG. 14 is an explanatory diagram for describing a first example of reception of the multicast signal in the second frequency band. Referring to FIG. 14, the terminal apparatus 100 and the base station 200 (the base station of the first cellular system) are illustrated. As described above with reference to FIG. 11, the frequency band F1 is the frequency band for the first cellular system included in the licensed band, and the frequency band F3 is the frequency band included in the unlicensed band (the shared band). In this example, the terminal apparatus 100 in the idle mode receives the paging message transmitted from the base station 200 in the frequency band F1, and receives the MBSFN signal transmitted from the base station 200 in the frequency band F3.

Further, a plurality of base stations 200 may transmit the MBSFN signal in the frequency band F3.

The base station 200 that transmits the MBSFN signal in the frequency band F3 may be a base station different from the base station 200 that transmits the paging message in the frequency band F1. Further, the base station 200 that transmits the paging message in the frequency band F1 may be a base station of a macro cell, and the base station 200 that transmits the MBSFN signal in the frequency band F3 may be a base station of a small cell overlapping a macro cell.

Second Example

Figure 15:
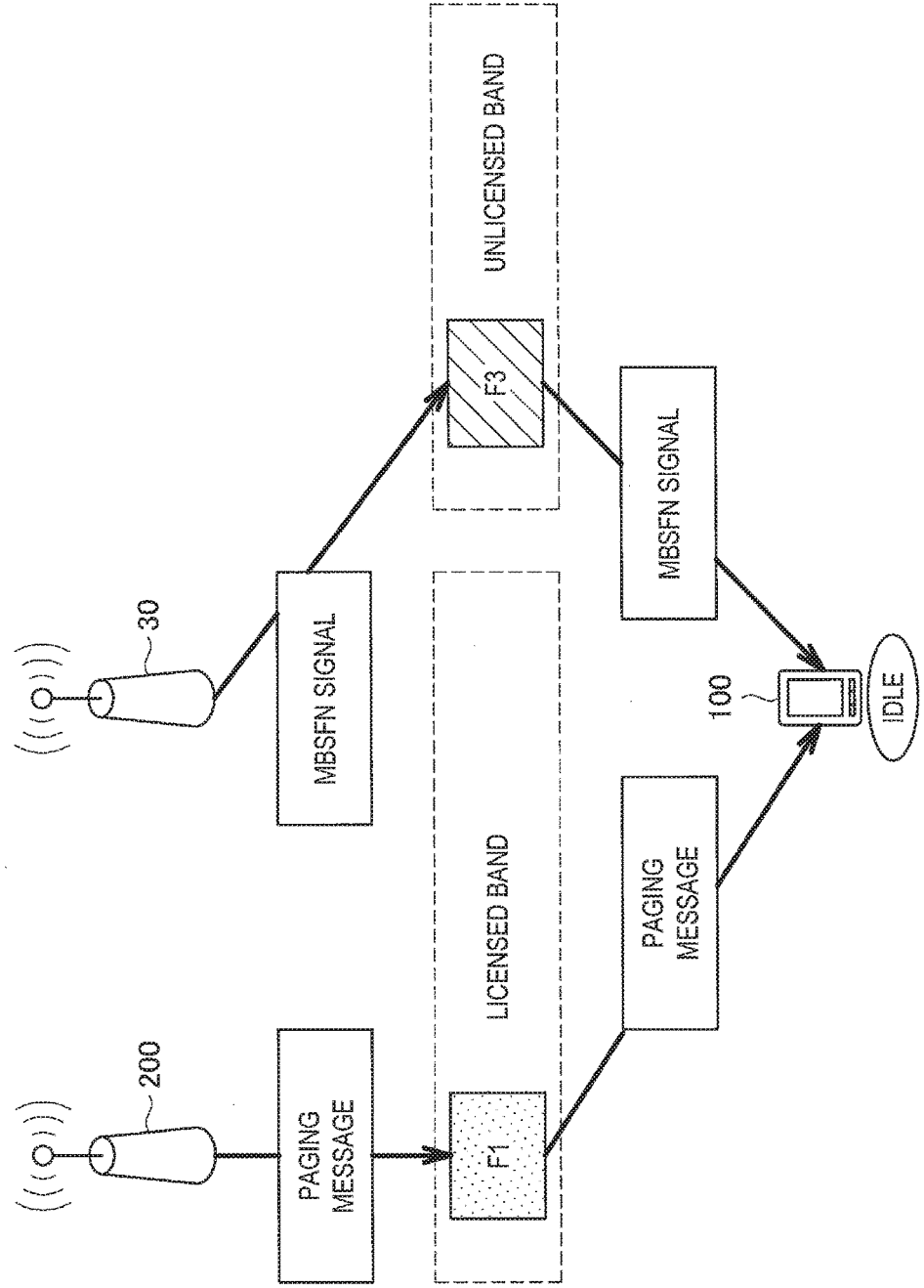
FIG. 15 is an explanatory diagram for describing a second example of reception of a multicast signal in a second frequency band.

FIG. 15 is an explanatory diagram for describing a second example of reception of the multicast signal in the second frequency band. Referring to FIG. 15, the terminal apparatus 100, the base station 200 (the base station of the first cellular system) and the base station 30 (the base station of the second cellular system) are illustrated. As described above with reference to FIG. 11, the frequency band F1 is the frequency band for the first cellular system included in the licensed band, and the frequency band F3 is the frequency band included in the unlicensed band (the shared band). In this example, the terminal apparatus 100 in the idle mode receives the paging message transmitted from the base station 200 in the frequency band F1 and receives the MBSFN signal transmitted from the base station 30 in the frequency band F3.

Further, a plurality of base stations 30 may transmit the MBSFN signal in the frequency band F3.

Third Example

Figure 16:
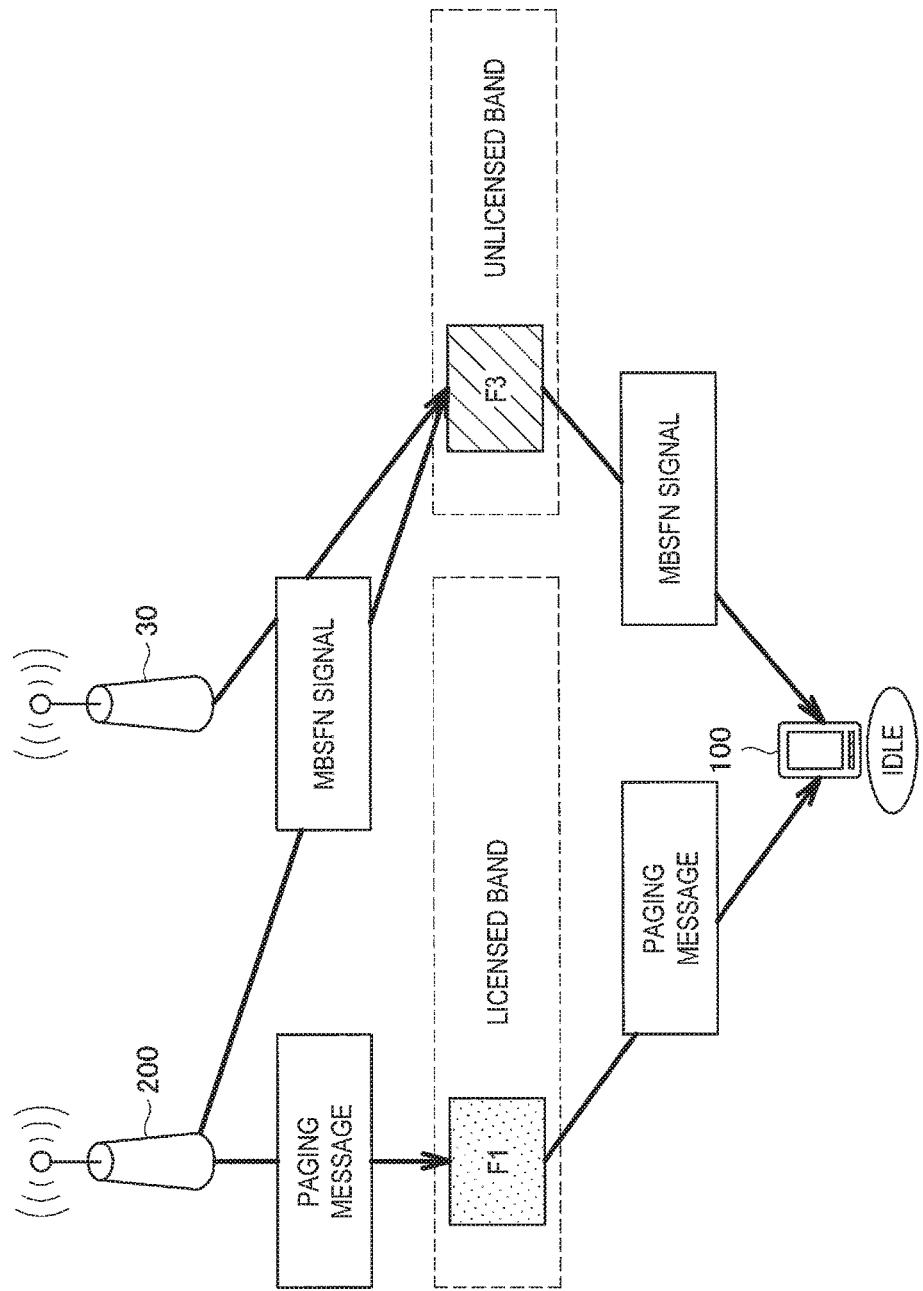
FIG. 16 is an explanatory diagram for describing a third example of reception of a multicast signal in a second frequency band.

FIG. 16 is an explanatory diagram for describing a third example of reception of the multicast signal in the second frequency band. Referring to FIG. 16, the terminal apparatus 100, the base station 200 (the base station of the first cellular system), and the base station 30 (the base station of the second cellular system) are illustrated. As described above with reference to FIG. 11, the frequency band F1 is the frequency band for the first cellular system included in the licensed band, and the frequency band F3 is the frequency band included in the unlicensed band (the shared band). In this example, the terminal apparatus 100 in the idle mode receives the paging message transmitted from the base station 200 in the frequency band F1, and receives the MBSFN signals transmitted from the base station 200 and the base station 30 in the frequency band F3. For example, the base station 200 and the base station 30 transmit the MBSFN signals through different subframes. Alternatively, the base station 200 and the base station 30 may belong to the same MBSFN area and transmit the MBSFN signal in the same subframe.

Further, a plurality of base stations 200 may transmit the MBSFN signal in the frequency band F3, and a plurality of base stations 30 may transmit the MBSFN signal in the frequency band F3.

The base station 200 that transmits the MBSFN signal in the frequency band F3 may be a base station different from the base station 200 that transmits the paging message in the frequency band F1. Further, the base station 200 that transmits the paging message in the frequency band F1 may be a base station of a macro cell, and the base station 200 that transmits the MBSFN signal in the frequency band F3 is a base station of a small cell overlapping a macro cell.

(c-3) Case of Frequency Band for Other Cellular System

As described above, as a second example, the second frequency band is a frequency band for another cellular system different from the first cellular system. In this case, the multicast signal is a signal transmitted from the base station 30 of another cellular system. In other words, when the terminal apparatus 100 is in the idle mode, the terminal apparatus 100 receives the multicast signal transmitted from a base station of another cellular system (for example, the base station 30 of the second cellular system) in the frequency for another cellular system (for example, the second cellular system). Specific examples will be described below with reference to FIG. 17.

Figure 17:
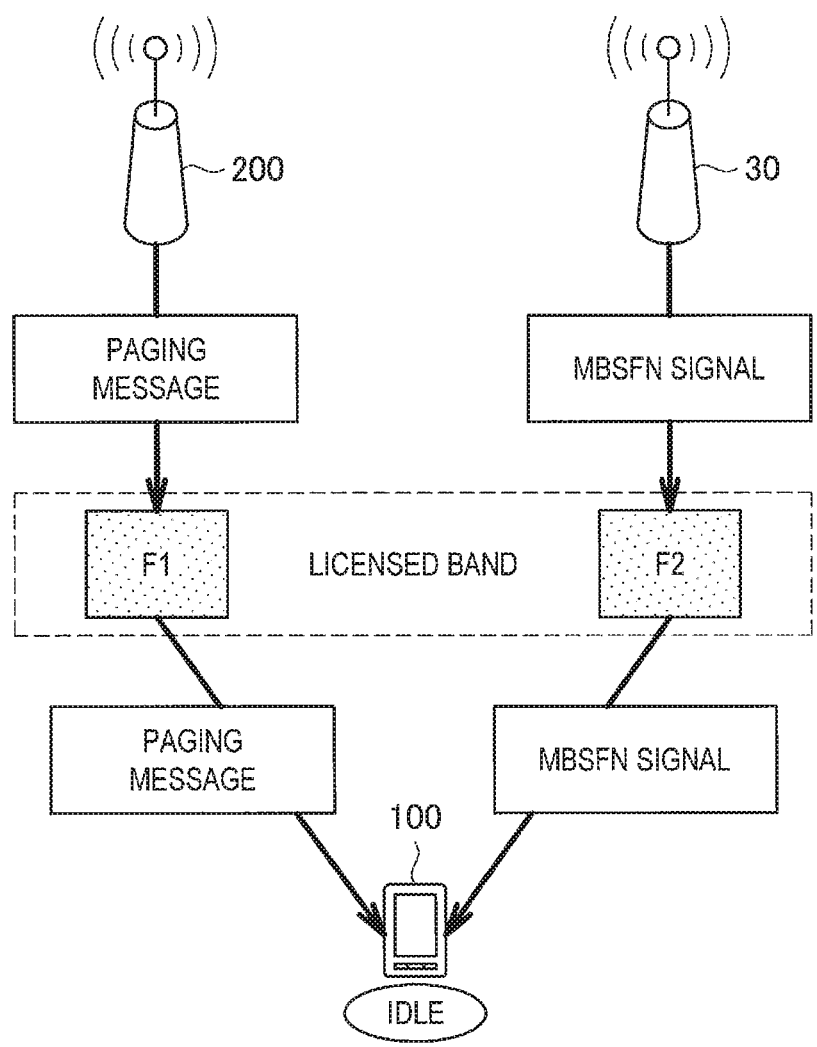
FIG. 17 is an explanatory diagram for describing a fourth example of reception of a multicast signal in a second frequency band.

FIG. 17 is an explanatory diagram for describing a fourth example of reception of the multicast signal in the second frequency band. Referring to FIG. 17, the terminal apparatus 100, the base station 200 (the base station of the first cellular system), and the base station 30 (the base station of the second cellular system) are illustrated. As described above with reference to FIG. 11, the frequency band F1 is the frequency band for the first cellular system included in the licensed band, and the frequency band F2 is the frequency band for the second cellular system included in the licensed band. In this example, the terminal apparatus 100 in the idle mode receives the paging message transmitted from the base station 200 in the frequency band F1 and receives the MBSFN signal transmitted from the base station 30 in the frequency band F2.

Further, a plurality of base stations 30 may transmit the MBSFN signal in the frequency band F2.

(c-4) Operation for Reception of Multicast Signal (Example of Control)

For example, the terminal apparatus 100 (the second control unit 145) acquires the information indicating the MBSFN subframe, the information indicating the configuration of the MCCH, and the like from the system information transmitted in the second frequency band. Further, the terminal apparatus 100 (the second control unit 145) acquires the information indicating the configuration of the PMCH from the MBSFN area configuration message transmitted on the MCCH. Then, the terminal apparatus 100 receives the MBSFN data transmitted on the PMCH based on the configuration of the PMCH or the like. For example, the second control unit 145 performs a reception process of receiving the MBSFN data based on the configuration of PMCH or the like. As described above, the terminal apparatus 100 receives the MBSFN signals transmitted in the MBSFN subframes (the signal of the MBSFN area configuration message, the signal of the MBSFN data, and the like).

(d) Others (d-1) Reception after Transition to Idle Mode

For example, the terminal apparatus 100 performs radio communication with the base station 200 in the frequency band for the first cellular system when the terminal apparatus 100 is in the connected mode in the first cellular system. When the terminal apparatus 100 that performs the radio communication in the connected mode gives priority to reception of the multicast signal (for example, when an application supporting multicasting is activated), the terminal apparatus 100 may stop the radio communication and enter the idle mode (for example, according to an operation of the user). Thereafter, the terminal apparatus 100 may select the first frequency band that is the frequency band of the first cellular system and receive the paging message transmitted in the first frequency band. Further, the terminal apparatus 100 may select the second frequency band that is not the frequency band of the first cellular system (for example, the shared band or the frequency band for another cellular system) and receive the multicast signal transmitted in the second frequency band (for example, the MBSFN signal transmitted in the MBSFN subframe).

For example, the connected mode is the RRC connected mode.

(d-2) Notification of Frequency Band

The base station 200 may notify the terminal apparatus 100 of one or more frequency bands that are not the frequency band of the first cellular system when the terminal apparatus 100 transitions from the connected mode to the idle mode in the first cellular system.

The information acquiring unit 251 may acquire information indicating one or more frequency bands. The control unit 253 may notify the terminal apparatus 100 of one or more frequency bands when the terminal apparatus 100 transitions from the connected mode to the idle mode in the first cellular system.

Specifically, the base station 200 may transmit an RRC connection release message including information indicating one or more frequency bands to the terminal apparatus 100.

As a first example, each of one or more frequency bands is the shared band (that is, the frequency band shared by a plurality of radio communication systems).

As a second example, each of one or more frequency bands is a frequency band for another cellular system which is not the first cellular system. Specifically, for example, each of one or more frequency bands is the frequency band for the second cellular system.

Through such a notification, for example, the terminal apparatus 100 in the idle mode can more easily select a cell of a frequency band different from the frequency band for the first cellular system (for example, the shared band or the frequency band for another cellular system).

(d-3) Two Modes

The terminal apparatus 100 may have two modes simultaneously. The two modes may be two idle modes, two connected modes, or one connected mode and one idle mode. When the terminal apparatus 100 is in the two idle modes, the terminal apparatus 100 may select the first frequency band and the second frequency band and receive the multicast signal transmitted in the second frequency band. The terminal apparatus 100 may perform the cell selection/cell reselection for each idle mode.

(d-4) Radio Frame Timing

In the terminal apparatus 100, the first frequency band and the second frequency band may differ in a radio frame timing.

As described above, when the terminal apparatus 100 is in the idle mode, the terminal apparatus 100 receives the paging message transmitted in the first frequency band which is the frequency band for the first cellular system, and receives the multicast signal transmitted in the second frequency band that is not the frequency band for the first cellular system.

Thus, for example, it is possible to increase opportunities for the terminal apparatus 100 in the idle mode to receive the multicast signal. More specifically, for example, when the terminal apparatus 100 is in the idle mode, the terminal apparatus 100 can receive the multicast signal transmitted in a frequency band that is not a frequency band for a corresponding cellular system (that is, the first cellular system). As a first example, when the terminal apparatus 100 is in the idle mode, the terminal apparatus 100 can receive the multicast signal transmitted in the shared band. As a second example, when the terminal apparatus 100 is in the idle mode, the terminal apparatus 100 can receive the multicast signal transmitted in a frequency band for another cellular system (for example, the second cellular system).

<4.3. Flow of Process>

Next, an example of a process according to the first embodiment will be described with reference to FIGS. 18 and 19.

(1) First Example

Figure 18:
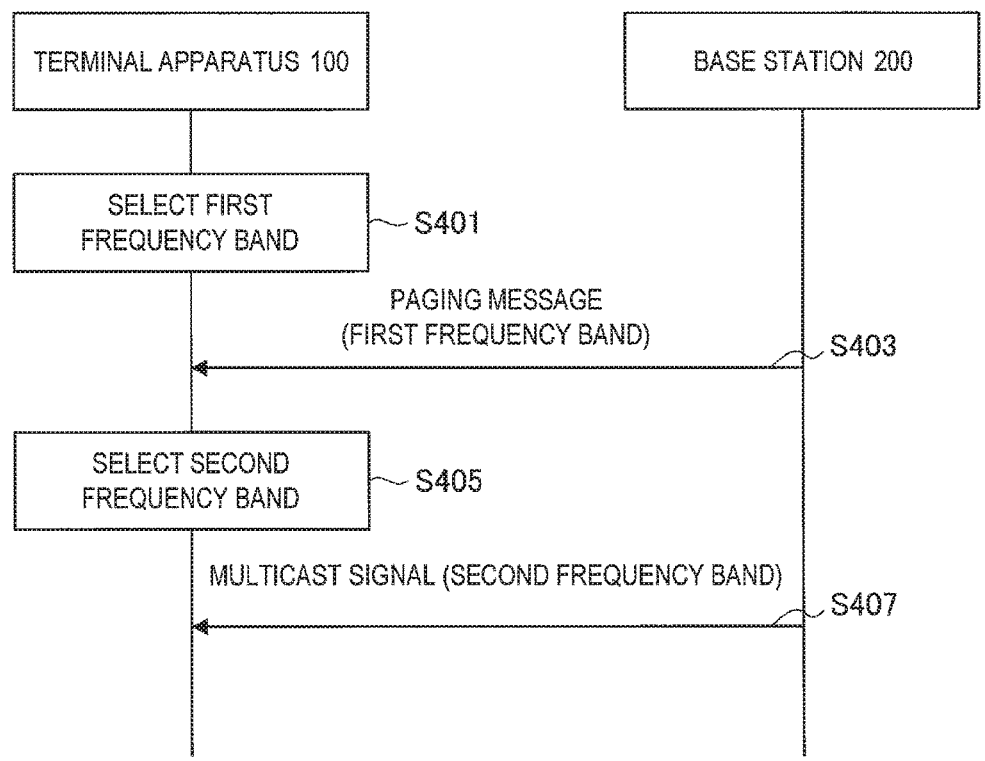
FIG. 18 is a sequence diagram illustrating a first example of a schematic flow of a process according to a first embodiment.

FIG. 18 is a sequence diagram illustrating a first example of a schematic flow of the process according to the first embodiment.

The terminal apparatus 100 is in an idle mode and selects the first frequency band which is the frequency band for the first cellular system (S401).

The terminal apparatus 100 receives the paging message transmitted from the base station 200 of the first cellular system in the first frequency band (S403).

Further, the terminal apparatus 100 selects the second frequency band that is not the frequency band for the first cellular system (S405). The second frequency band is the shared band (that is, the frequency band shared by a plurality of frequency bands).

The terminal apparatus 100 receives the multicast signal transmitted from the base station 200 of the first cellular system in the second frequency band (S407). For example, the terminal apparatus 100 receives the MBSFN signal transmitted from the base station 200 in the MBSFN subframe in the second frequency band.

Further, a plurality of base stations 200 may transmit the multicast signal in the second frequency band.

Further, the base station 200 that transmits the multicast signal in the second frequency band (the shared band) may be a base station different from the base station 200 that transmits the paging message in the first frequency band. Furthermore, the base station 200 that transmits the paging message in the first frequency band may be a base station of a macro cell, and the base station 200 that transmits the multicast signal in the second frequency band (the shared band) may be a base station of a small cell overlapping a macro cell.

(2) Second Example

Figure 19:
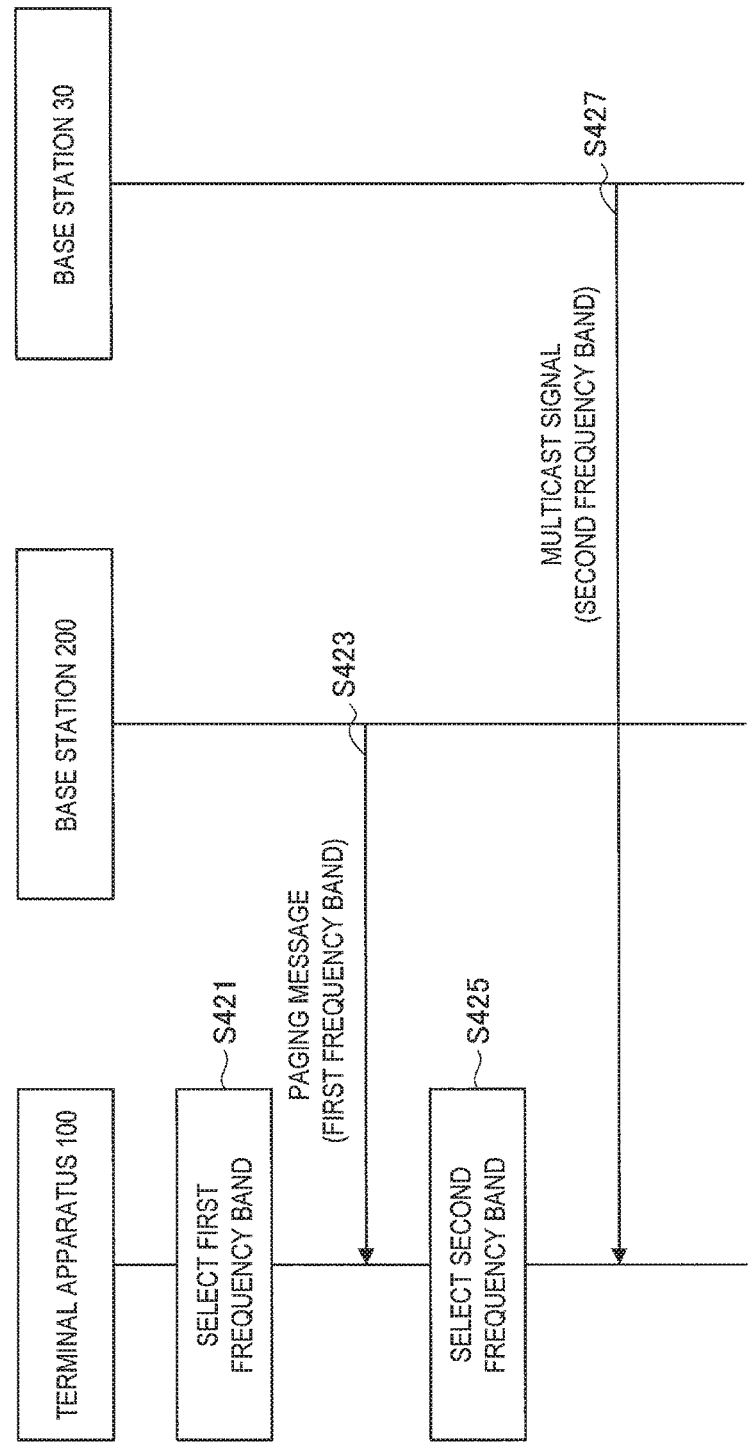
FIG. 19 is a sequence diagram illustrating a second example of a schematic flow of a process according to a first embodiment.

FIG. 19 is a sequence diagram illustrating a second example of the schematic flow of the process according to the first embodiment.

The terminal apparatus 100 is in the idle mode and selects the first frequency band which is the frequency band for the first cellular system (S421).

The terminal apparatus 100 receives the paging message transmitted from the base station 200 of the first cellular system in the first frequency band (S423).

Further, the terminal apparatus 100 selects the second frequency band that is not the frequency band for the first cellular system (S425). The second frequency band is the shared band (that is, the frequency band shared by a plurality of frequency bands), or the frequency band for the second cellular system different from the first cellular system.

The terminal apparatus 100 receives the multicast signal transmitted from the base station 30 of the second cellular system in the second frequency band (S427). For example, the terminal apparatus 100 receives the MBSFN signal transmitted from the base station 30 in the MBSFN subframe in the second frequency band.

Further, a plurality of base stations 30 may transmit the multicast signal in the second frequency band.

Further, when the second frequency band is the shared band, not only the base station 30 but also the base station 200 may transmit the multicast signal in the second frequency band (the shared band). In this case, a plurality of base stations 200 rather than one base station 200 may transmit the multicast signal in the second frequency band (the shared band). Further, the base station 200 that transmits the multicast signal in the second frequency band (the shared band) may be a base station different from the base station 200 that transmits the paging message in the first frequency band. Furthermore, the base station 200 that transmits the paging message in the first frequency band may be a base station of a macro cell, and the base station 200 that transmits the multicast signal in the second frequency band (the shared band) may be a base station of a small cell overlapping a macro cell.

5.2. SECOND EMBODIMENT

Next, a second embodiment of the present disclosure will be described with reference to FIGS. 20 to 22.

<5.1. Overview>

(1) Technical problem

Currently, opportunities for terminal apparatuses to receive multicast signals (for example, MBSFN signals transmitted through an MBSFN subframe) are limited. For example, terminal apparatuses usually receive only multicast signals transmitted in a frequency band for a corresponding cellular system.

Specifically, when a terminal apparatus is in a connected mode in a cellular system, the terminal apparatus can receive the multicast signal transmitted from the base station of the cellular system but does not receive the multicast signals transmitted from base stations of other cellular systems (for example, cellular systems of other operators). For example, this is because even when carrier aggregation is used, the frequency band for the cellular system and the frequency bands used by other cellular systems (for example, the shared band or the frequency band for another cellular system) are not tied.

In this regard, it is desirable to provide a mechanism which is capable of increasing opportunities for a terminal apparatus to receive a multicast signal. In particular, it is desirable to provide a mechanism which is capable of increasing opportunities for a terminal apparatus in the connected mode to receive a multicast signal.

(2) Technical Solution

In the second embodiment, when the terminal apparatus 100 is in the connected mode in the first cellular system, the terminal apparatus 100 transmits or receives a signal in the first frequency band which is the frequency band for the first cellular system and receives a multicast signal transmitted from a base station of another cellular system different from the one cellular system in the second frequency band that is not the frequency band for the first cellular system.

Thus, for example, it is possible to increase opportunities for the terminal apparatus 100 in the connected mode to receive the multicast signal.

<5.2. Technical Features>

Next, technical features according to the second embodiment will be described with reference to FIGS. 20 and 21.

In the second embodiment, as described above, when the terminal apparatus 100 is in the connected mode in the first cellular system, the terminal apparatus 100 transmits or receives a signal in the first frequency band which is the frequency band for the first cellular system and receives the multicast signal transmitted from a base station of another cellular system different from the first cellular system in the second frequency band that is not the frequency band for the first cellular system.

The first control unit 143 selects the second frequency band when the terminal apparatus 100 is in the connected mode in the first cellular system. When the terminal apparatus 100 is in the connected mode in the first cellular system, the second control unit 145 controls the terminal apparatus 100 such that the terminal apparatus 100 transmits or receives a signal in the first frequency band and receives the multicast signal transmitted from the base station of another cellular system in the second frequency band.

For example, the connected mode is the RRC connected mode.

(1) First Frequency Band (a) Example of First Frequency Band

As described above, the first frequency band is the frequency band for the first cellular system. For example, the first frequency band is a component carrier (CC) included in the licensed band.

Referring back to FIG. 11, for example, the first frequency band is the frequency band F1. As described above, the frequency band F1 is included in the licensed band and is the frequency band for the first cellular system.

In the case of FDD, for example, the first frequency band includes an uplink band and a downlink band. In FIG. 11, for the sake of simplifying the description, the frequency band F1 is illustrated as one frequency band, but in the case of FDD, for example, the frequency band F1 includes an uplink band and a downlink band regardless of the illustration of FIG. 11.

(b) Transmission/Reception of Signal

As described above, when the terminal apparatus 100 is in the connected mode in the first cellular system, the second control unit 145, the second control unit 145 controls the terminal apparatus 100 such that the terminal apparatus 100 transmits or receives a signal in the first frequency band.

For example, the second control unit 145 monitors the control information transmitted on the PDCCH. When the control information including the CRC bit scrambled by a cell radio network temporary identifier (C-RNTI) assigned to the terminal apparatus 100 is discovered, the second control unit 145 acquires scheduling information included in the control information. The second control unit 145 triggers a reception process or a transmission process according to the scheduling information. Alternatively, the second control unit 145 may perform the reception process or the transmission process according to the scheduling information.

Further, the control by the second control unit 145 is not limited to this example and may be other control.

(2) Second Frequency Band (a) Example of Second Frequency Band (a-1) Shared Band As a first example, the second frequency band is the shared band (that is, the frequency band shared by a plurality of radio communication systems). In other words, the second frequency band is a frequency band included in the unlicensed band.

As an example, the unlicensed band is the 5 GHz band. In this case, for example, the second frequency band (that is, the shared band) is a channel of the wireless LAN. In other words, the second frequency band is a frequency band shared among the first cellular system, the wireless LAN, and the like. Alternatively, the unlicensed band may be any other band such as the 3.5 GHz band or the 60 GHz band.

Referring back to FIG. 11, for example, the second frequency band is the frequency band F3. As described above, the frequency band F3 is included in the unlicensed band.

In the case of FDD, the second frequency band (that is, shared band) can be used as the downlink-dedicated frequency band in the cellular system.

(a-2) Frequency Band for Other Cellular System

As a second example, the second frequency band is a frequency band for another cellular system different from the first cellular system. As an example, another cellular system is the second cellular system. For example, the second frequency band is a component carrier (CC) included in the licensed band.

Referring back to FIG. 11, for example, the second frequency band is the frequency band F2. As described above, the frequency band F2 is included in the licensed band and is the frequency band for the second cellular system different from the first cellular system.

(b) Selection of Second Frequency Band

As described above, when the terminal apparatus 100 is in the connected mode in the first cellular system, the first control unit 143 selects the second frequency band.

(b-1) Trigger

For example, when the terminal apparatus 100 gives priority to reception of the multicast signal, the first control unit 143 selects the second frequency band. As an example, when an application supporting multicasting is activated in the terminal apparatus 100, the first control unit selects the second frequency band.

(b-2) Selection Techniques

Technique of Selecting Frequency Band for First Cellular System in Idle Mode

For example, when the terminal apparatus 100 is in the idle mode, the first control unit 143 selects the frequency band for the first cellular system. For example, the first control unit 143 selects the frequency band for the first cellular system through normal cell selection or cell reselection.

There is no difference between the first embodiment and the second embodiment in the technique of selecting the frequency band for the first cellular system (hereinafter, a "first selection technique"). Therefore, duplicated description is omitted here.

Technique of Selecting Frequency Band in Connected Mode

As described above, when the terminal apparatus 100 is in the connected mode in the first cellular system, the first control unit 143 selects the second frequency band. For example, even in the connected mode, the first control unit 143 performs the cell selection or the cell reselection and selects the second frequency band (that is, the frequency band which is not the frequency band for the first cellular system) through the cell selection or the cell reselection.

For example, when the terminal apparatus 100 is in the connected mode in the first cellular system, the first control unit 143 selects the second frequency band using a criterion different from that for selection of the first frequency band for the first cellular system. In other words, the first selection technique (that is, the method of selecting the frequency band for the first cellular system) is different from a technique of selecting another frequency band (for example, the shared band or a frequency band of another cellular system) which is not the frequency band for the first cellular system (hereinafter referred to as a "second selection technique").

Criterion for Cellular Systems

For example, the different criteria include a criterion for selecting the cellular system.

First Selection Technique

In the first selection technique, for example, the first control unit 143 specifies a PLMN based on the received system information (SIB1) and selects a PLMN (for example, the first cellular system) according to a predetermined PLMN selection priority. Then, the first control unit 143 selects an appropriate cell belonging to the selected PLMN. The appropriate cell to be selected is a cell on one frequency band (for example, the first frequency band), and the first control unit 143 selects one frequency band through the cell selection.

Second Selection Technique

On the other hand, in the second selection technique, for example, the first control unit 143 specifies a PLMN based on the received system information (SIB1) and selects a PLMN (for example, the second cellular system) according to another PLMN selection priority. As an example, the PLMN which is the first cellular system is not included as the selectable PLMN, and other PLMNs are not included as the selectable PLMN. Then, the first control unit 143 selects an appropriate cell of one frequency band belonging to the selected PLMN (for example, the shared band, or the frequency band for another cellular system). The first control unit 143 selects one frequency band through this cell selection.

Thus, for example, the frequency band which is not the frequency band for the first cellular system (for example, the shared band or the frequency band for another cellular system) is selected.

Criterion for Measured Reception Power/Reception Quality

For example, the different criteria include a criterion for measured reception power or reception quality.

In the first selection technique, for example, the first control unit 143 selects an appropriate cell belonging to the selected PLMN based on the measurement result by the terminal apparatus 100 according to the S criteria.

Similarly, in the second selection technique, for example, the first control unit 143 selects an appropriate cell based on the measurement result by the terminal apparatus 100 according to the S criteria. However, the first selection technique and the second selection technique differ in values of parameters of the S criteria. Specifically, for example, these techniques differ in $Q_{rxlevmin}$ and/or $Q_{qualmin}$. As an example, $Q_{rxlevmin}$ is smaller in the second selection technique than in the first selection technique.

Thus, for example, it is easy to select the second frequency band (for example, the shared band, or the frequency band for another cellular system). As a result, for example, a possibility of the terminal apparatus 100 receiving the multicast signal increases.

Criterion for Frequency Band

For example, the different criteria include a criterion for the frequency band.

In the first selection technique, the first control unit 143 performs the cell reselection according to a priority between frequency bands.

On the other hand, in the second selection technique, for example, the first control unit 143 performs the cell reselection according to another priority among frequency bands. For example, the frequency band in which the multicast signal is transmitted is included as the selectable frequency band, and the frequency band in which the multicast signal is not transmitted is not included as the selectable frequency band.

Thus, for example, the frequency band in which the multicast signal is transmitted is selected. As a result, for example, the terminal apparatus 100 receives the multicast signal.

The terminal apparatus 100 can recognize the presence or absence of transmission of the multicast signal in the frequency band based on the system information.

SPECIFIC EXAMPLES

As a first example, referring back to FIG. 11, the first control unit 143 selects the cell of the frequency band F3 (the shared band) when the terminal apparatus 100 is in the connected mode. In other words, the first control unit 143 selects the frequency band F3 (the shared band) through the cell selection/cell reselection.

As a second example, referring back to FIG. 11, the first control unit 143 selects the cell of the frequency band F2 (the frequency band for the second cellular system) when the terminal apparatus 100 is in the connected mode. In other words, the first control unit 143 selects the frequency band F2 (that is, the frequency band for the second cellular system) through the cell selection/cell reselection.

Operation Up to Measurement

For example, the terminal apparatus 100 performs frame synchronization using the synchronization signal transmitted in the frequency band (for example, the shared band or the frequency band for another cellular system) which is not the frequency band for the first cellular system. Then, the terminal apparatus 100 determines the presence or absence of transmission of the multicast signal based on the system information transmitted in the frequency band. Further, the terminal apparatus 100 performs measurement for the frequency band (for example, measurement of RSRP and/or RSRQ).

Further, for example, the base station 200 transmits system information (for example, an SIB 5) indicating a frequency list including not only the frequency band of the first cellular system but also other frequency bands (for example, the shared band or the frequency band for another cellular system). Thus, for example, the terminal apparatus 100 can recognize not only the frequency band of the first cellular system but also another frequency band (for example, the shared band or the frequency band for another cellular system).

(c) Reception of Multicast Signal

As described above, when the terminal apparatus 100 is in the connected mode, the terminal apparatus 100 receives the multicast signal transmitted from a base station of another cellular system different from the first cellular system in the second frequency band (that is, the frequency band which is not the frequency band for the first cellular system). When the terminal apparatus 100 is in the connected mode, the second control unit 145 controls the terminal apparatus 100 such that that the terminal apparatus 100 receives the multicast signal transmitted from the base station of another cellular system in the second frequency band.

(c-1) Multicast Signal

For example, the multicast signal is an MBSFN signal transmitted in the MBSFN subframe. In other words, when the terminal apparatus 100 is in the connected mode, the terminal apparatus 100 receives the MBSFN signal transmitted in the MBSFN subframe in the second frequency band.

(c-2) Case of Shared Band

As described above, as a first example, the second frequency band is the shared band (that is, the frequency band shared by a plurality of radio communication systems). In other words, when the terminal apparatus 100 is in the connected mode, the terminal apparatus 100 receives the multicast signal transmitted from the base station of another cellular system different from the first cellular system (for example, the base station 30 of the second cellular system) in the shared band. Specific examples will be described below with reference to FIG. 20.

Figure 20:
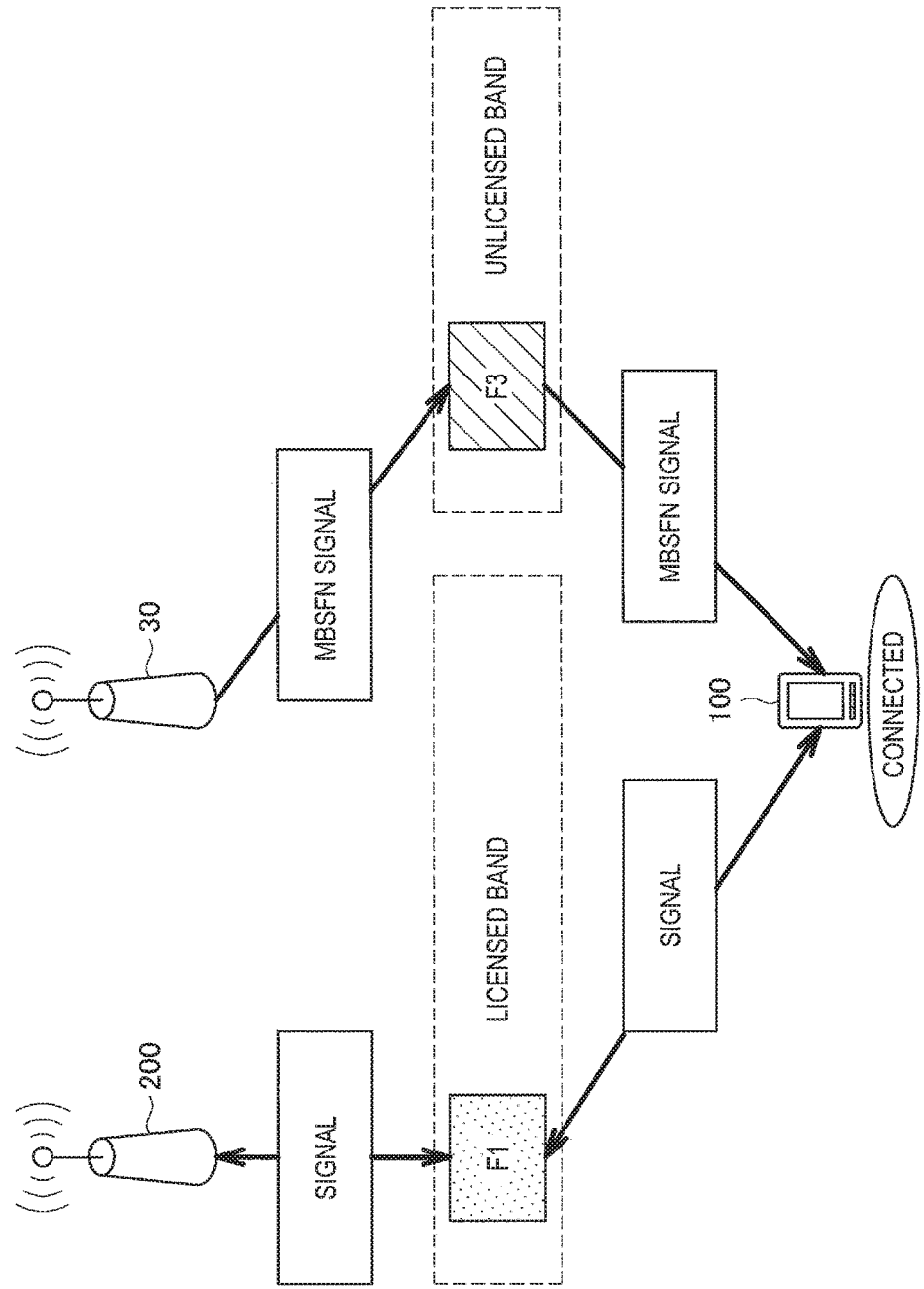
FIG. 20 is an explanatory diagram for describing a first example of reception of a multicast signal in a second frequency band.

FIG. 20 is an explanatory diagram for describing a first example of reception of the multicast signal in the second frequency band. Referring to FIG. 20, the terminal apparatus 100, the base station 200 (the base station of the first cellular system), and the base station 30 (the base station of the second cellular system) are illustrated. As described above with reference to FIG. 11, the frequency band F1 is the frequency band for the first cellular system included in the licensed band, and the frequency band F3 is the frequency band included in the unlicensed band (the shared band). In this example, the terminal apparatus 100 in the connected mode receives the signal transmitted from the base station 200 in the frequency band F1, transmits a signal to the base station 200 in the frequency band F1, and receives an MBSFN signal transmitted from the base station 30 in the frequency band F3.

Further, a plurality of base stations 30 may transmit the MBSFN signal in the frequency band F3.

(c-3) Case of Frequency Band for Other Cellular System

As described above, as a second example, the second frequency band is a frequency band for another cellular system different from the first cellular system. In other words, when the terminal apparatus 100 is in the connected mode, the terminal apparatus 100 receives the multicast signal transmitted from the base station of another cellular system (for example, the base station 30 of the second cellular system) in the frequency band for another cellular system (for example, the second cellular system) different from the first cellular system. Specific examples will be described below with reference to FIG. 21.

Figure 21:
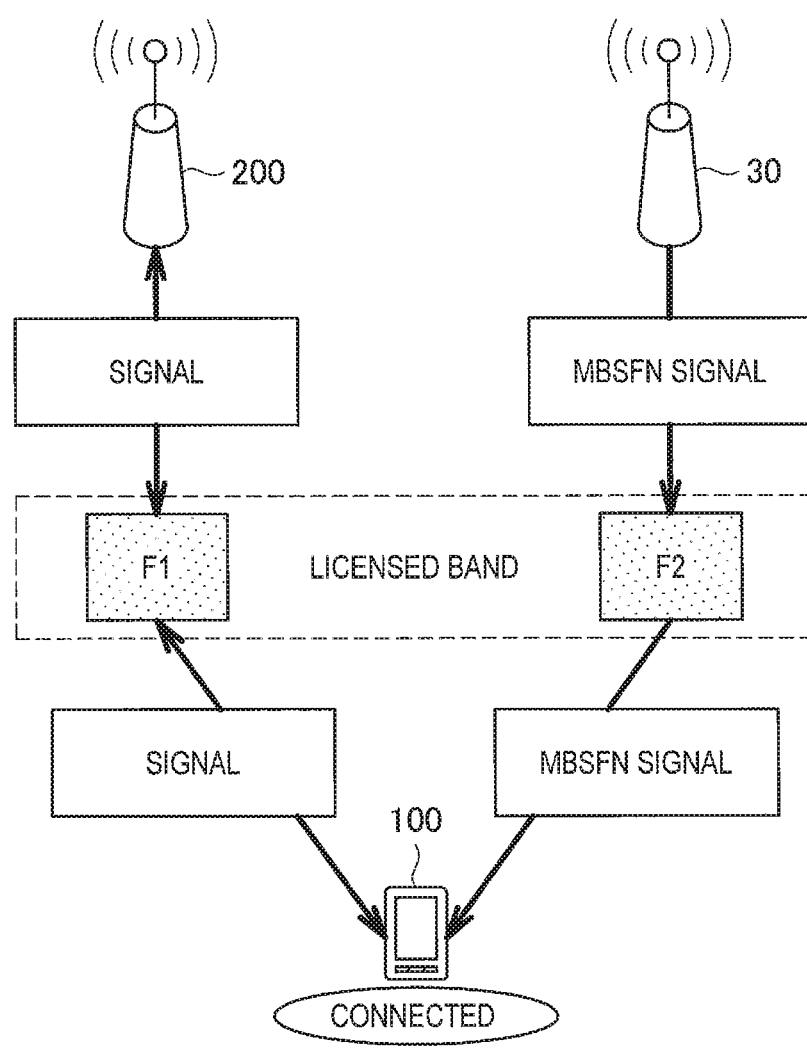
FIG. 21 is an explanatory diagram for describing a second example of reception of a multicast signal in a second frequency band.
Figure 22:
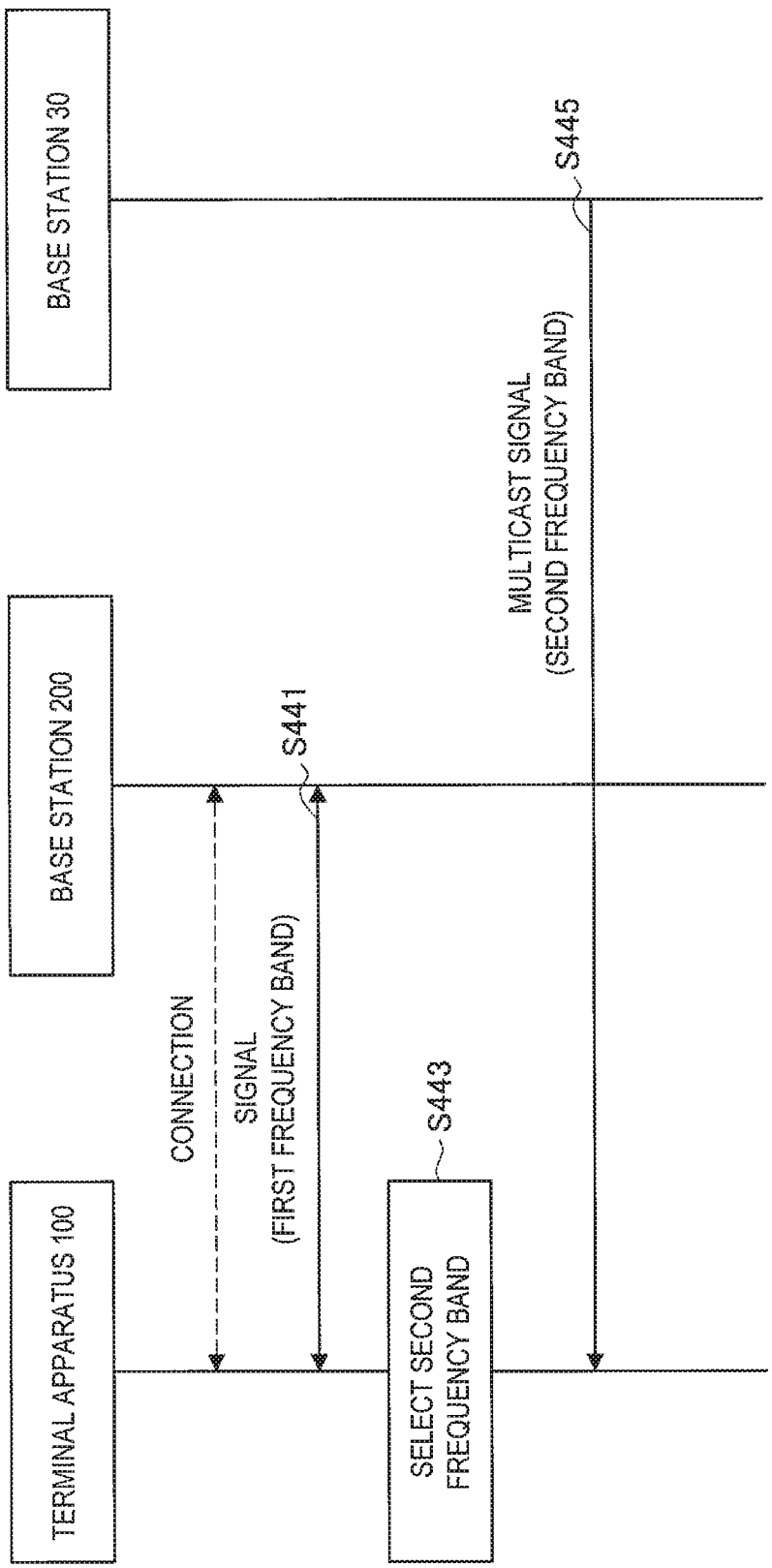
FIG. 22 is a sequence diagram illustrating an example of a schematic flow of a process according to the second embodiment.

FIG. 21 is an explanatory diagram for describing a second example of reception of the multicast signal in the second frequency band. Referring to FIG. 21, the terminal apparatus 100, the base station 200 (the base station of the first cellular system), and the base station 30 (the base station of the second cellular system) are illustrated. As described above with reference to FIG. 11, the frequency band F1 is the frequency band for the first cellular system included in the licensed band, and the frequency band F2 is the frequency band for the second cellular system included in the licensed band. In this example, the terminal apparatus 100 in the connected mode receives a signal transmitted from the base station 200 in the frequency band F1, transmits a signal to the base station 200 in the frequency band F1, and receives the MBSFN signal transmitted from the base station 30 in the frequency band F2.

Further, a plurality of base stations 30 may transmit the MBSFN signal in the frequency band F2.

(c-4) Operation for Reception of Multicast Signal (Example of Control)

For example, the terminal apparatus 100 (the second control unit 145) acquires the information indicating the MBSFN subframe, the information indicating the configuration of the MCCH, and the like from the system information transmitted in the second frequency band. Further, the terminal apparatus 100 (the second control unit 145) acquires the information indicating the configuration of the PMCH from the MBSFN area configuration message transmitted on the MCCH. Then, the terminal apparatus 100 receives the MBSFN data transmitted on the PMCH based on the configuration of the PMCH or the like. For example, the second control unit 145 performs a reception process of receiving the MBSFN data based on the configuration of PMCH or the like. As described above, the terminal apparatus 100 receives the MBSFN signals transmitted in the MBSFN subframes (the signal of the MBSFN area configuration message, the signal of the MBSFN data, and the like).

(d) Others (d-1) Two Modes

The terminal apparatus 100 may simultaneously have two modes. The two modes may be two idle modes, two connected modes, or one connected mode and one idle mode. When the terminal apparatus 100 is in one connected mode and one idle mode, the terminal apparatus 100 may select the second frequency band while performing transmission and reception of a signal in the first frequency band and receive the multicast signal transmitted from the base station 30 in the second frequency band.

(d-2) Radio Frame Timing

In the terminal apparatus 100, the first frequency band and the second frequency band may differ in a radio frame timing.

As described above, when the terminal apparatus 100 is in the connected mode in the first cellular system, the terminal apparatus 100 transmits or receives a signal in the first frequency band which is the frequency band for the first cellular system, and receives the multicast signal transmitted from the base station of another cellular system different from the first cellular system in the second frequency band that is not the frequency band for the first cellular system.

Thus, for example, it is possible to increase opportunities for the terminal apparatus 100 in the connected mode to receive the multicast signal. More specifically, for example, when the terminal apparatus 100 is in the connected mode, the terminal apparatus 100 can receive the multicast signal transmitted from the base station of another cellular system (for example, the base station 30 of the second cellular system) that is not a corresponding cellular system (that is, the first cellular system).

<5.3. Flow of Process>

Next, an example of a process according to the second embodiment will be described with reference to FIG. 22. FIG. 22 is a sequence diagram illustrating an example of a schematic flow of a process according to the second embodiment.

The terminal apparatus 100 is in the connected mode and receives a signal transmitted from the base station 200 in the first frequency band which is the frequency band for the first cellular system and/or transmits a signal to the base station 200 in the first frequency band (S441). In other words, the terminal apparatus 100 performs radio communication with the base station 200 in the first frequency band.

Further, the terminal apparatus 100 selects the second frequency band that is not the frequency band for the first cellular system (S443). The second frequency band is the shared band (that is, the frequency band shared by a plurality of frequency bands) or the frequency band for the second cellular system different from the first cellular system.

The terminal apparatus 100 receives the multicast signal transmitted from the base station 30 of the second cellular system in the second frequency band (S445). For example, the terminal apparatus 100 receives the MBSFN signal transmitted from the base station 30 in the MBSFN subframe in the second frequency band.

Further, a plurality of base stations 30 may transmit the multicast signal in the second frequency band.

The second embodiment of the present disclosure has been described above. The first embodiment and the second embodiment may be combined. In other words, the terminal apparatus 100 may perform the operation according to the first embodiment in the idle mode and perform the operation according to the second embodiment in the connected mode.

6. THIRD EMBODIMENT

Next, a third embodiment of the present disclosure will be described with reference to FIGS. 23 to 27.

<6.1. Overview>

(1) Technical Problem

Typically, the terminal apparatus performs measurements for the CRS (measurement of RSRP and RSRQ) for cell selection/cell reselection or measurement report. However, according to such measurement, for example, in the terminal apparatus, even when reception power of the MBSNF signal in the MBSFN area is sufficiently large, if reception power of a signal transmitted by an individual base station is small, a cell belonging to the MBSNF area is not selected in the cell selection/cell reselection and the handover. As a result, opportunities for the terminal apparatus to receive the MBSFN signal are likely to be limited.

In this regard, it is desirable to provide a mechanism which is capable of increasing opportunities for the terminal apparatus to receive the MBSFN signal.

(2) Technical Solution

In the third embodiment, the terminal apparatus 100 performs measurement for an MBSFN reference signal (MBSFN-RS), and performs the cell selection or the cell reselection, or the measurement report based on a measurement result.

Thus, for example, it is possible to increase opportunities for the terminal apparatus 100 to receive the MBSFN signal.

<6.2. Technical Features>

(1) Measurement for the MBSFN-RS

Next, technical features according to the third embodiment will be described with reference to FIGS. 23 to 25.

In the third embodiment, the terminal apparatus 100 (the measuring unit 141) performs measurement for the MBSFN reference signal (MBSFN-RS) as described above.

(a) Example of Measurement

For example, the above-described measurement is measurement of at least one of reception power and reception quality of the MBSFN-RS. More specifically, for example, the reception power is RSRP of the MBSFN-RS, and the reception quality is RSRQ of the MBSFN-RS.

(b) Measurement Technique

For example, the measuring unit 141 performs the above-described measurement for each MBSFN area indicated by the system information.

For example, the terminal apparatus 100 acquires system information transmitted in a cell belonging to an MBSFN area, and acquires information indicating a configuration of an MCCH for each MBSFN area from the system information (an SIB13). Further, the terminal apparatus 100 acquires information indicating an MBSNF subframe from the MBSFN area configuration message transmitted on the MCCH for each MBSFN area. Then, the measuring unit 141 performs measurement (measurement of RSRP and/or RSRQ of the MBSFN-RS) for the MBSFN-RS transmitted in the MBSFN subframe for each MBSFN area.

(c) Target Frequency Band (c-1) Frequency Band for First Cellular System

As a first example, the measurements include measurement for the frequency band for the first cellular system. In other words, the measurement includes measurement for the MBSFN-RS transmitted from the base station 200 of the first cellular system in the frequency band for the first cellular system.

(c-2) Shared Band

As a second example, the measurements include measurement for the shared band (that is, the frequency band shared by a plurality of radio communication systems). In other words, the measurement includes measurement for the MBSFN-RS transmitted in the shared band.

(c-3) Specific Examples

Referring back to FIG. 11, for example, the terminal apparatus 100 performs measurement (measurement of reception power/reception quality of the MBSFN-RS) for the frequency band F1 which is the frequency band for the first cellular system. Further, for example, the terminal apparatus 100 performs measurement (measurement of reception power/reception quality of the MBSFN-RS) for the frequency band F3 which is the shared band.

(d) Trigger

As a first example, when the terminal apparatus 100 gives priority to reception of the MBSFN signal, the measuring unit 141 performs measurement for the MBSFN-RS. As an example, when an application supporting multicasting is activated in the terminal apparatus 100, the measuring unit 141 performs measurement for the MBSFN-RS.

As a second example, the base station 200 notifies the terminal apparatus 100 of the measurement to be performed by the terminal apparatus 100, and the measurement includes measurement for the MBSFN-RS. More specifically, for example, the base station 200 transmits a measurement configuration message to the terminal apparatus 100 in the connected mode, and the measurement indicated by the measurement configuration message includes measurement for the MBSFN-RS. As a result, the measuring unit 141 performs measurements for the MBSFN-RS.

In the base station 200, the information acquiring unit 251 acquires information indicating the measurement to be performed by the terminal apparatus 100, and the control unit 253 notifies the terminal apparatus 100 of the measurement. The measurements include measurement for the MBSFN-RS.

(e) Others

For example, the measuring unit 141 performs measurement for the MBSFN-RS in at least one of the case in which the terminal apparatus 100 is in the idle mode and the case in which the terminal apparatus 100 is in the connected mode.

For example, it will be appreciated that the measuring unit 141 performs measurement for the CRS (that is, RSRP of the CRS and/or RSRP of the CRS) in addition to measurement for the MBSFN-RS (for example, measurement of RSRP and/or RSRQ of the MBSFN-RS).

(2) Idle Mode (a) Cell Selection/Cell Reselection

For example, the terminal apparatus 100 is in an idle mode (for example, the RRC idle mode). In this case, the terminal apparatus 100 (the first control unit 143) performs the cell selection or the cell reselection based on the result of measurement for the MBSFN-RS. For example, the terminal apparatus 100 (the first control unit 143) selects the cell of the frequency band for the first cellular system.

Specifically, for example, when the result of measurement for the MBSFN-RS in the MBSFN area (for example, RSRP and/or RSRQ of MBSFN-RS) satisfies a predetermined criterion, the first control unit 143 selects one of the cells belonging to the MBSFN area. The cell belonging to the MBSFN area is a cell in which the system information (for example, the SIB13) indicating the MBSFN area is transmitted. The predetermined criterion may be the S criteria.

Thus, for example, the terminal apparatus 100 can easily select the cell belonging to the MBSFN area in the cell selection/cell reselection. For example, in the terminal apparatus 100, even when reception power of a signal transmitted from an individual base station is small, if reception power of the MBSNF signal in the MBSFN area is sufficiently large, the cell belonging to the MBSNF area is selected in the cell selection/cell reselection. As a result, opportunities for the terminal apparatus 100 to receive the MBSFN signal can be increased.

(b) Reception of MBSFN Signal

For example, the terminal apparatus 100 receives the MBSFN signal transmitted in the MBSFN subframe in the frequency band selected through the cell selection or the cell reselection. The second control unit 145 controls the terminal apparatus 100 such that the terminal apparatus 100 receives the MBSFN signal transmitted in the frequency band.

For example, the terminal apparatus 100 (the second control unit 145) acquires the information indicating the MBSFN subframe, the information indicating the configuration of the MCCH, and the like from the system information transmitted in the frequency band. Furthermore, the terminal apparatus 100 (the second control unit 145) acquires the information indicating the configuration of the PMCH from the MBSFN area configuration message transmitted on the MCCH. Then, the terminal apparatus 100 receives the MBSFN data transmitted on the PMCH based on the configuration of the PMCH or the like. For example, the second control unit 145 performs the reception process of receiving the MBSFN data based on the configuration of the PMCH or the like. As described above, the terminal apparatus 100 receives the MBSFN signals transmitted in the MBSFN subframes (the signal of the MBSFN area configuration message, the signal of the MBSFN data, and the like).

(c) Example of Reception of MBSFN Signal

Figure 23:
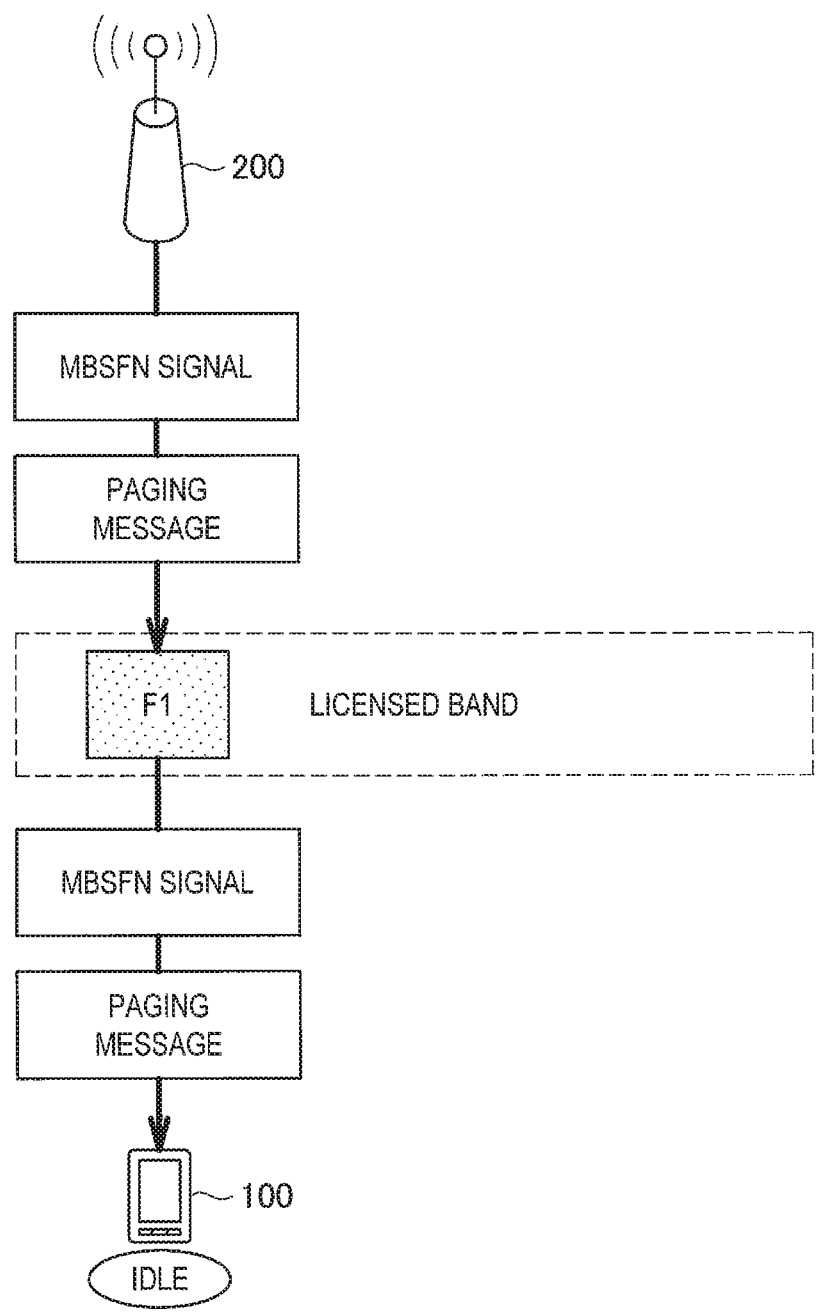
FIG. 23 is an explanatory diagram for describing an example of reception of an MBSFN signal after cell selection/cell reselection.

FIG. 23 is an explanatory diagram for describing an example of reception of an MBSFN signal after the cell selection/cell reselection. Referring to FIG. 23, the terminal apparatus 100 and the base station 200 are illustrated. As described above with reference to FIG. 11, the frequency band F1 is the frequency band for the first cellular system included in the licensed band. In this example, the terminal apparatus 100 in the idle mode selects the cell of the frequency band F1 in the cell selection/cell reselection and selects the frequency band F1 through the cell selection/the cell reselection. Then, the terminal apparatus 100 receives the MBSFN signal transmitted from the base station 200 in the frequency band F1. The terminal apparatus 100 also receives the paging message transmitted from the base station 200 in the frequency band F1.

Further, a plurality of base stations 200 may transmit the MBSFN signal in the frequency band F1.

(3) Connected Mode (a) Measurement Report

For example, the terminal apparatus 100 (the first control unit 143) performs a measurement report based on the result of the measurement for the MBSFN-RS. When the terminal apparatus 100 is in the connected mode (for example, the RRC connected mode), the terminal apparatus 100 performs the measurement report.

Specifically, for example, when the result of the measurement for the MBSFN-RS in the MBSFN area (for example, RSRP and/or RSRQ of the MBSFN-RS) satisfies a predetermined criterion, first control unit 143 transmits the measurement report to the base station 200. As an example, when the RSRP and/or the RSRQ exceeds a predetermined threshold value, the first control unit 143 transmits the measurement report to the base station 200. The first control unit 143 transmits a report indicating the measurement result of the MBSFN-RS (RSRP and/or RSRQ) to the base station 200 as the measurement report.

Thus, for example, the base station 200 can easily add the frequency band in which the MBSFN signal is transmitted as the SCC. Specifically, for example, in the terminal apparatus 100, even when the reception power of the signal transmitted by an individual base station is small, if reception power of the MBSNF signal in the MBSFN area is sufficiently large, the frequency band in which the MBSFN signal is transmitted is added as the SCC of the terminal apparatus 100. As a result, opportunities for the terminal apparatus 100 to receive the MBSFN signal can be increased.

(b) Addition of SCC

For example, the terminal apparatus 100 supports the carrier aggregation, and the base station 200 (the control unit 253) adds the secondary component carrier (SCC) of the terminal apparatus 100 based on the result of measurement for the MBSFN-RS performed by the terminal apparatus 100. For example, the base station 200 (the control unit 253) adds the frequency band for the first cellular system or the shared band as the SCC of the terminal apparatus 100.

Specifically, for example, when the result of the measurement for the MBSFN-RS in the MBSFN area (for example, RSRP and/or RSRQ of the MBSFN-RS) satisfies a predetermined criterion, the control unit 253 decides addition of the SCC of the terminal apparatus 100. Then, the control unit 253 transmits a MAC control element or an RRC connection reconfiguration message for addition of the SCC to the terminal apparatus 100 through the antenna unit 210 and the radio communication unit 220. As a result, the SCC of the terminal apparatus 100 is added.

(c) Reception of MBSFN Signal

For example, the terminal apparatus 100 receives the MBSFN signal transmitted in the MBSFN subframe in the frequency band added as the SCC. The second control unit 145 controls the terminal apparatus 100 such that the terminal apparatus 100 receives the MBSFN signal transmitted in the frequency band.

For example, the terminal apparatus 100 (the second control unit 145) acquires the information indicating the MBSFN subframe, the information indicating the configuration of the MCCH, and the like from the system information transmitted in the frequency band. Further, the terminal apparatus 100 (the second control unit 145) acquires the information indicating the configuration of the PMCH from the MBSFN area configuration message transmitted on the MCCH. Then, the terminal apparatus 100 receives the MBSFN data transmitted on the PMCH based on the configuration of the PMCH or the like. For example, the second control unit 145 performs reception processing of MBSFN data based on the configuration of PMCH or the like. As described above, the terminal apparatus 100 receives the MBSFN signals transmitted in the MBSFN subframes (the signal of the MBSFN area configuration message, the signal of the MBSFN data, and the like).

(d) Example of Reception of MBSFN Signal (d-1) First Example

Figure 24:
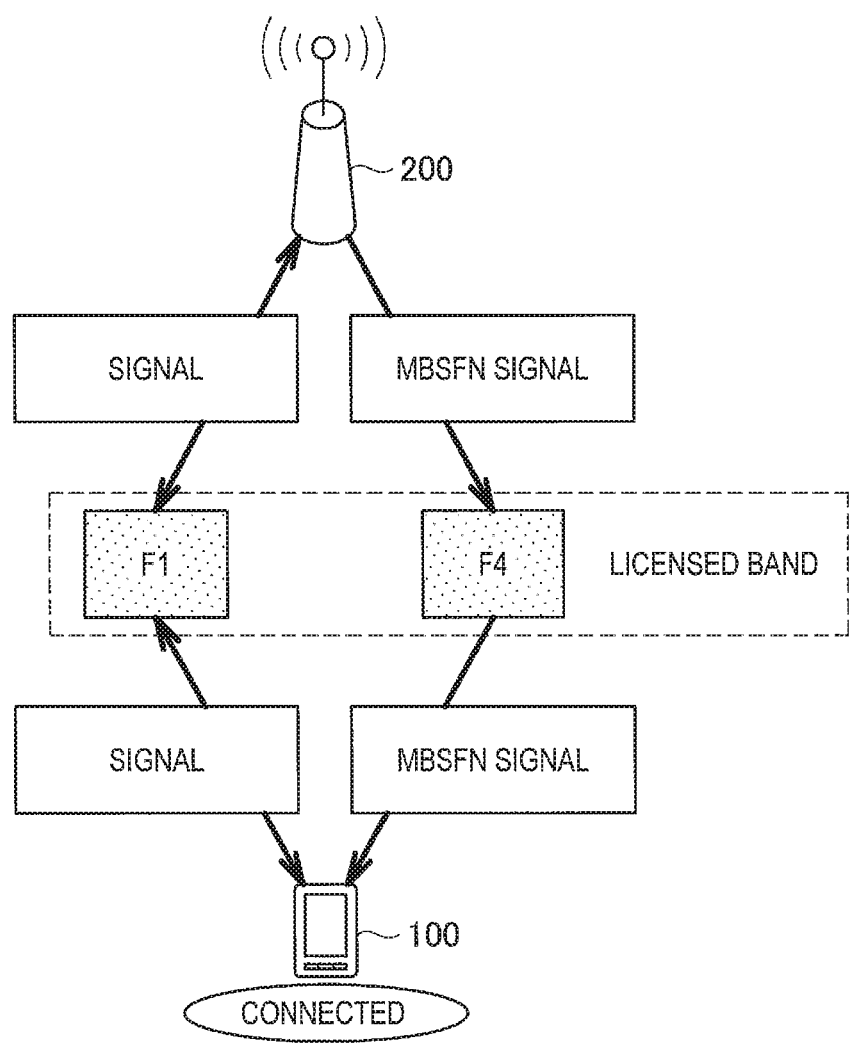
FIG. 24 is an explanatory diagram for describing a first example of reception of an MBSFN signal after an SCC is added.

FIG. 24 is an explanatory diagram for describing a first example of reception of the MBSFN signal after the SCC is added. Referring to FIG. 24, the terminal apparatus 100 and the base station 200 are illustrated. As described above with reference to FIG. 11, the frequency band F1 is the frequency band for the first cellular system included in the licensed band. The frequency band F4 is also the frequency band for the first cellular system included in the licensed band. In this example, the frequency band F1 is the PCC of the terminal apparatus 100 in the connected mode, and the frequency band F4 is the SCC added by the terminal apparatus 100 in the connected mode. The terminal apparatus 100 receives the MBSFN signal transmitted from the base station 200 in the frequency band F4. Further, the terminal apparatus 100 receives a signal transmitted from the base station 200 in the frequency band F1 and/or transmits a signal to the base station 200 in the frequency band F1.

Further, a plurality of base stations 200 may transmit the MBSFN signal in the frequency band F4.

The base station 200 that transmits the MBSFN signal in the frequency band F4 may be a base station different from the base station 200 that transmits the paging message in the frequency band F1. Further, the base station 200 that transmits the paging message in the frequency band F1 may be a base station of a macro cell, and the base station 200 that transmits the MBSFN signal in the frequency band F4 may be a base station of a small cell overlapping a macro cell.

(d-2) Second Example

Figure 25:
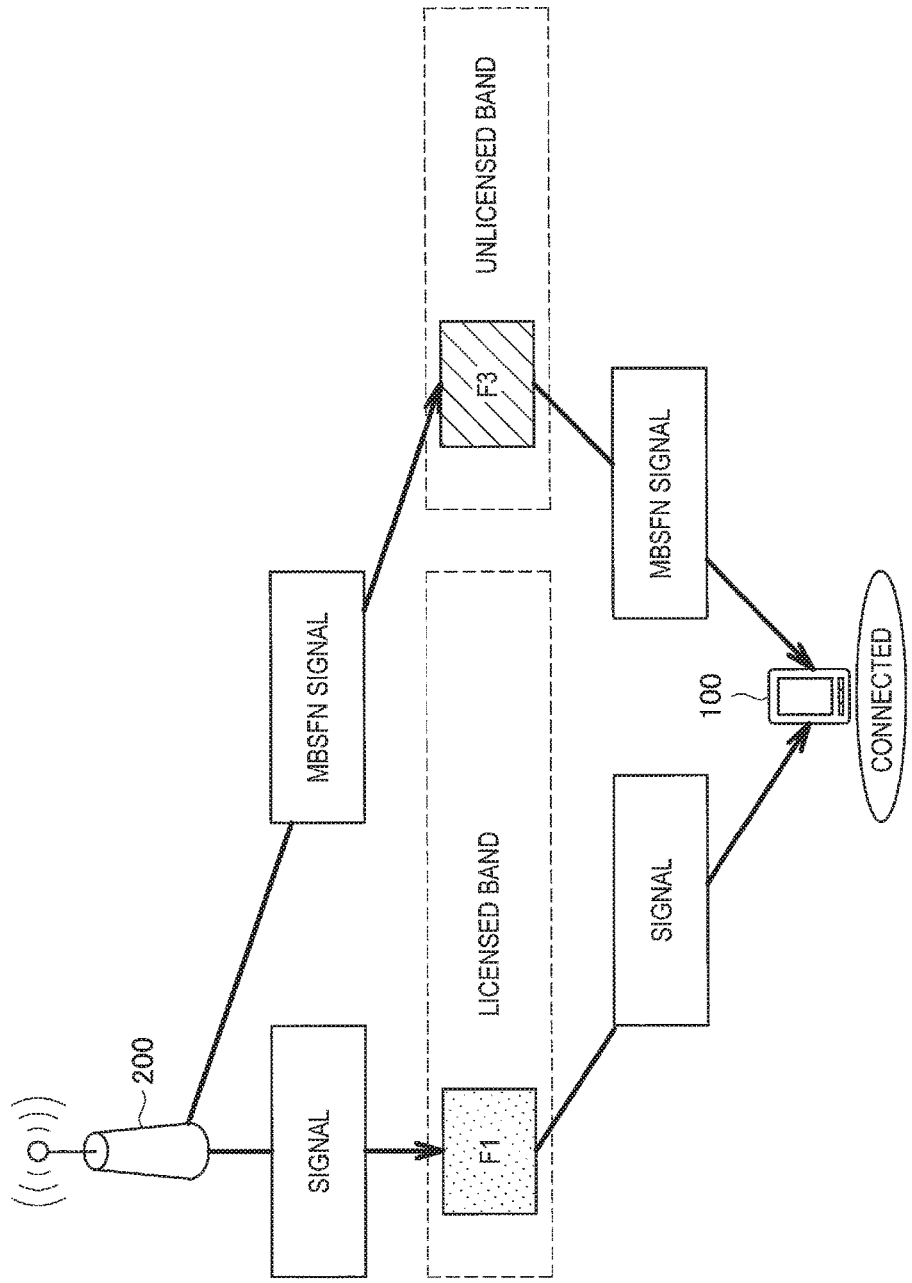
FIG. 25 is an explanatory diagram for describing a second example of reception of an MBSFN signal after an SCC is added.

FIG. 25 is an explanatory diagram for describing a second example of reception of the MBSFN signal after the SCC is added. Referring to FIG. 25, the terminal apparatus 100 and the base station 200 are illustrated. As described above with reference to FIG. 11, the frequency band F1 is the frequency band for the first cellular system included in the licensed band. The frequency band F3 is the frequency band included in the unlicensed band (the shared band). In this example, the frequency band F1 is the PCC of the terminal apparatus 100 in the connected mode, and the frequency band F3 is the SCC added by the terminal apparatus 100 in the connected mode. The terminal apparatus 100 receives the MBSFN signal transmitted from the base station 200 in the frequency band F3. The terminal apparatus 100 receives a signal transmitted from the base station 200 in the frequency band F1 and/or transmits a signal to the base station 200 in the frequency band F1.

Further, a plurality of base stations 200 may transmit the MBSFN signal in the frequency band F3.

The base station 200 that transmits the MBSFN signal in the frequency band F3 may be a base station different from the base station 200 that performs radio communication with the terminal apparatus 100 in the frequency band F1. Further, the base station 200 that performs radio communication with the terminal apparatus 100 in the frequency band F1 may be a base station of a macro cell, and the base station 200 that transmits the MBSFN signal in the frequency band F3 may be a base station of a small cell overlapping a macro cell.

(4) Reception of MBSFN Signal of Other Cellular System

In the above example, it is a premise that the MBSFN signal received by the terminal apparatus 100 is the MBSFN signal transmitted from the base station 200 of the first cellular system, but the third embodiment is not limited to this example.

For example, the terminal apparatus 100 (the first control unit 143) may select a frequency band in which the MBSFN signal is transmitted by another cellular system which is not the first cellular system (for example, the shared band or the frequency band for another cellular system) through the cell selection/cell reselection. The terminal apparatus 100 may be in the idle mode or in the connected mode. The terminal apparatus 100 may receive the MBSFN signal transmitted from the base station of another cellular system (for example, the base station 30 of the second cellular system) in the frequency band (for example, the shared band or the frequency band for another cellular system).

The description of this point is similar to the description of the first embodiment and the second embodiment described above. Therefore, duplicated description is omitted here.

Further, the measurement for the MBSFN-RS (by the measuring unit 141) may include measurement for the frequency band for another cellular system.

<6.3. Flow of Process>

Next, an example of a process according to the third embodiment will be described with reference to FIGS. 26 and 27.

(1) First Example

Figure 26:
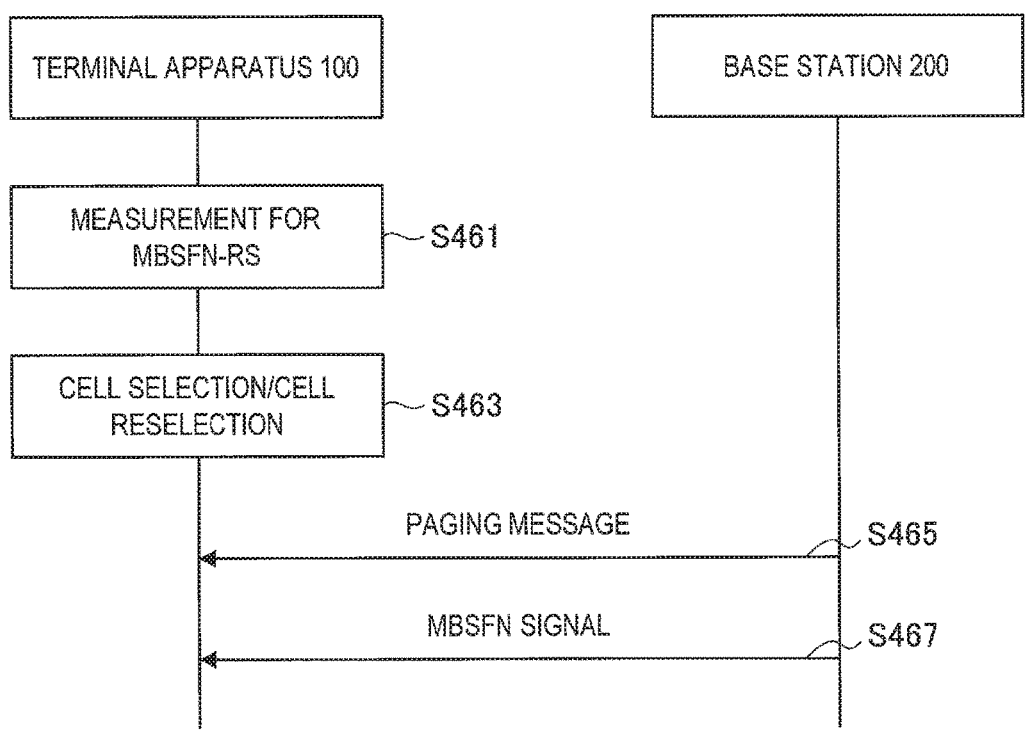
FIG. 26 is a sequence diagram illustrating a first example of a schematic flow of a process according to a third embodiment.

FIG. 26 is a sequence diagram illustrating a first example of a schematic flow of the process according to the third embodiment.

The terminal apparatus 100 in the idle mode performs measurement for the MBSFN-RS (S461). The terminal apparatus 100 performs the cell selection or the cell reselection based on the measurement result (S463). As a result, the cell of the frequency band is selected.

The terminal apparatus 100 receives the paging message transmitted from the base station 200 in the frequency band (S465), and receives the MBSFN signal transmitted from the base station 200 in the frequency band (S467).

Further, a plurality of base stations 200 may transmit the MBSFN signal in the frequency band.

(2) Second Example

Figure 27:
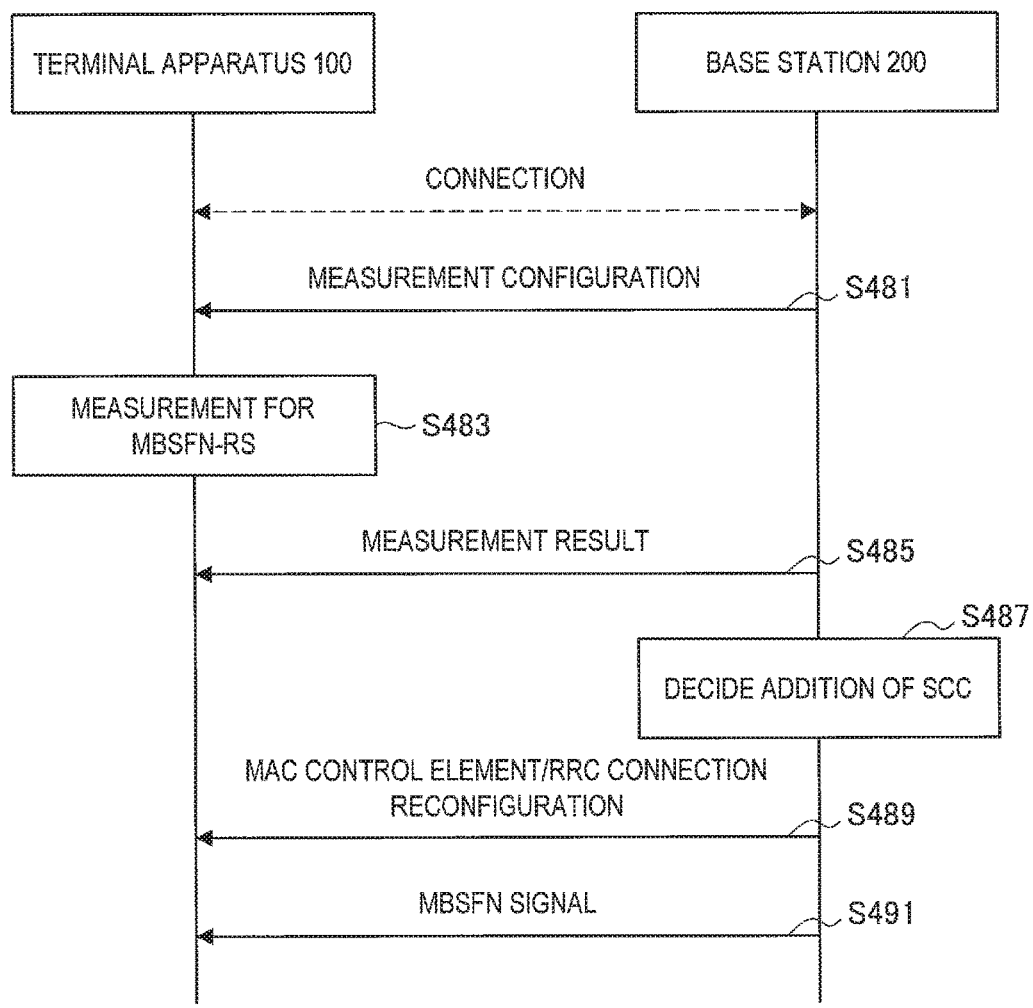
FIG. 27 is a sequence diagram illustrating a second example of a schematic flow of a process according to a third embodiment.

FIG. 27 is a sequence diagram illustrating a second example of the schematic flow of the process according to the third embodiment.

The base station 200 transmits the measurement configuration message to the terminal apparatus 100 in the connected mode (S481). The measurement indicated by the measurement configuration message includes measurement for the MBSFN-RS.

The terminal apparatus 100 performs measurement for the MBSFN-RS (S483), and performs a measurement report based on the measurement result (S485). The terminal apparatus 100 transmits a report indicating the result of the measurement for the MBSFN-RS as the measurement report.

Thereafter, for example, the base station 200 decides to add the SCC of the terminal apparatus 100 (S487), and transmits a MAC control element or an RRC connection reconfiguration message for SCC addition to the terminal apparatus 100 (S489). As a result, the SCC of the terminal apparatus 100 is added.

Thereafter, the terminal apparatus 100 receives the MBSFN signal transmitted from the base station 200 in the added SCC (S491).

Further, a plurality of base stations 200 may transmit the MBSFN signal in the frequency band.

For example, the base station 200 that transmits the MBSFN signal in the SCC may be a base station different from the base station 200 that transmits the measurement configuration, the MAC control element, the RRC connection reconfiguration message, and the like. Further, the base station 200 that transmits the measurement configuration, the MAC control element, the RRC connection reconfiguration message, and the like may be a base station of a macro cell. The base station 200 that transmits the MBSFN signal in the SCC may be a base station of a small cell overlapping a macro cell.

7. APPLICATION EXAMPLES

The technology of the present disclosure is applicable to various products. Also, for example, the base station 200 may be implemented as any one type of evolved Node B (eNB) such as a macro eNB or a small eNB. The small eNB may be an eNB that covers a cell smaller than the macro cell such as a pico eNB, a micro eNB or a home (femto). Instead, the base station 200 may be realized as any other types of base stations such as a NodeB and a base transceiver station (BTS). The base station 200 may include a main body (that is also referred to as a base station apparatus) configured to control radio communication, and one or more remote radio heads (RRH) disposed in a different place from the main body. Additionally, various types of terminals to be discussed later may also operate as the base station 200 by temporarily or semi-permanently executing a base station function. Further, at least some components of the base station 200 may be implemented in a base station apparatus or a module for a base station apparatus.

For example, the terminal apparatus 100 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. At least a part of constituent elements of the terminal apparatus 100 may also be realized as a terminal (that is also referred to as a machine type communication (MTC) terminal) that performs machine-to-machine (M2M) communication. Furthermore, at least a part of constituent elements of the terminal apparatus 100 may be in a module (such as an integrated circuit module including a single die) mounted on each of the terminals.

<7.1. Application Examples Regarding Base Station>
(First Application Example)

Figure 28:
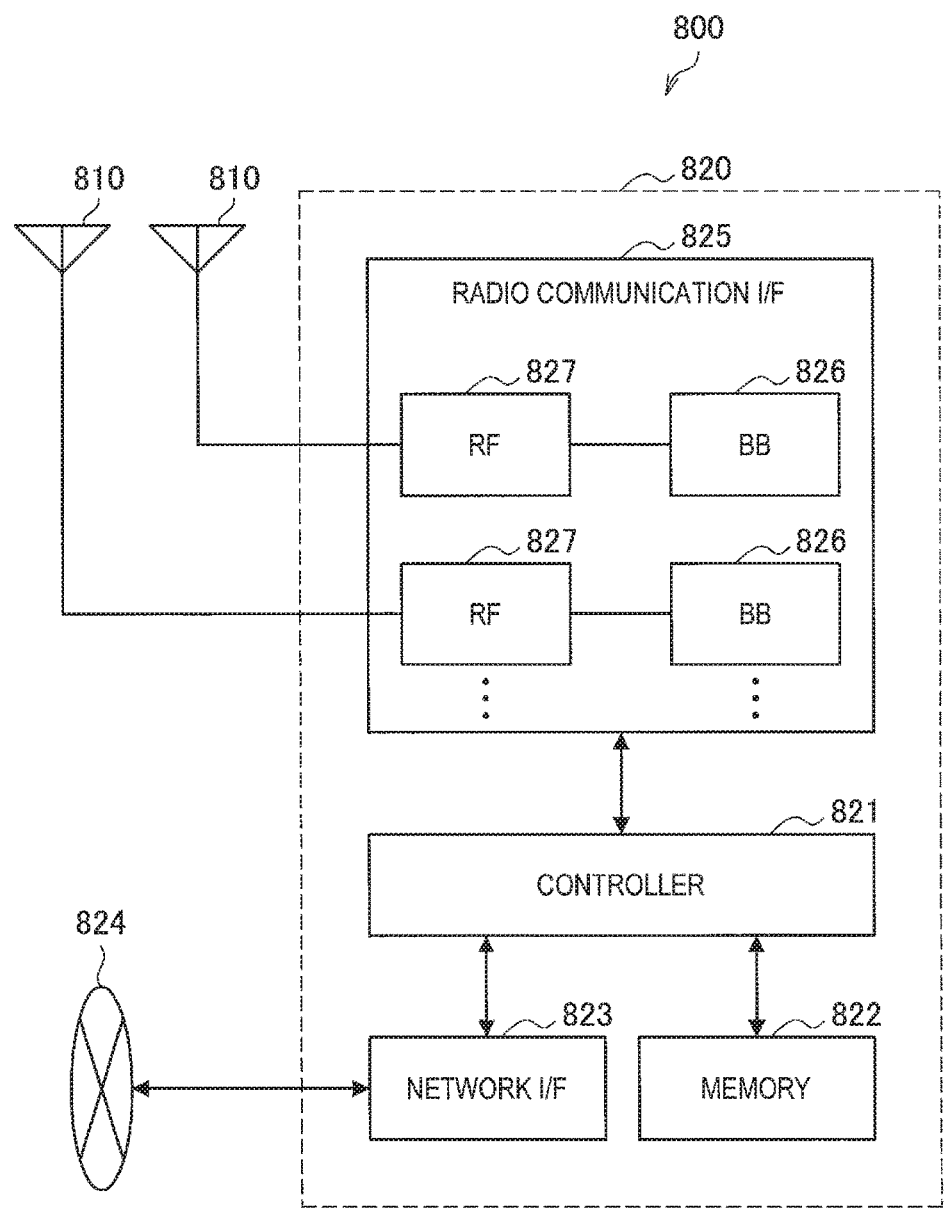
FIG. 28 is a block diagram illustrating a first example of a schematic configuration of an eNB.

FIG. 28 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 28. For example, the multiple antennas 810 may be compatible with multiple frequency bands used by the eNB 800. Although FIG. 28 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 28. For example, the multiple BB processors 826 may be compatible with multiple frequency bands used by the eNB 800. The radio communication interface 825 may include the multiple RF circuits 827, as illustrated in FIG. 28. For example, the multiple RF circuits 827 may be compatible with multiple antenna elements. Although FIG. 28 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 28, the information acquiring unit 251 and/or the control unit 253 described with reference to FIG. 13 may be implemented in the radio communication interface 825. Alternatively, at least the part of constituent elements may be implemented in the controller 821. As one example, in the eNB 800, a part (for example, the BB processor 826) or all of the radio communication interface 825 and/or a module including the controller 821 may be mounted, and the information acquiring unit 251 and/or the control unit 253 may be implemented in the module. In this case, the module may store a program causing the processor to function as the information acquiring unit 251 and/or the control unit 253 (in other words, a program causing the processor to perform the operations of the information acquiring unit 251 and/or the control unit 253) and may execute the program. As another example, a program causing the processor to function as the information acquiring unit 251 and/or the control unit 253 may be installed in the eNB 800, and the radio communication interface 825 (for example, the BB processor 826) and/or the controller 821 may execute the program. As described above, the eNB 800, the base station apparatus 820, or the module may be provided as an apparatus including the information acquiring unit 251 and/or the control unit 253, or a program causing the processor to function as the information acquiring unit 251 and/or the control unit 253 may be provided. A readable recording medium recorded the program may be provided.

Also, in the eNB 800 shown in FIG. 28, the radio communication unit 220 described above with reference to FIG. 13 may be implemented in the radio communication interface 825 (for example, the RF circuit 827). Further, the antenna unit 210 may be implemented in the antenna 810. Furthermore, the network communication unit 230 may be implemented in the controller 821 and/or the network interface 823.

(Second Application Example)

Figure 29:
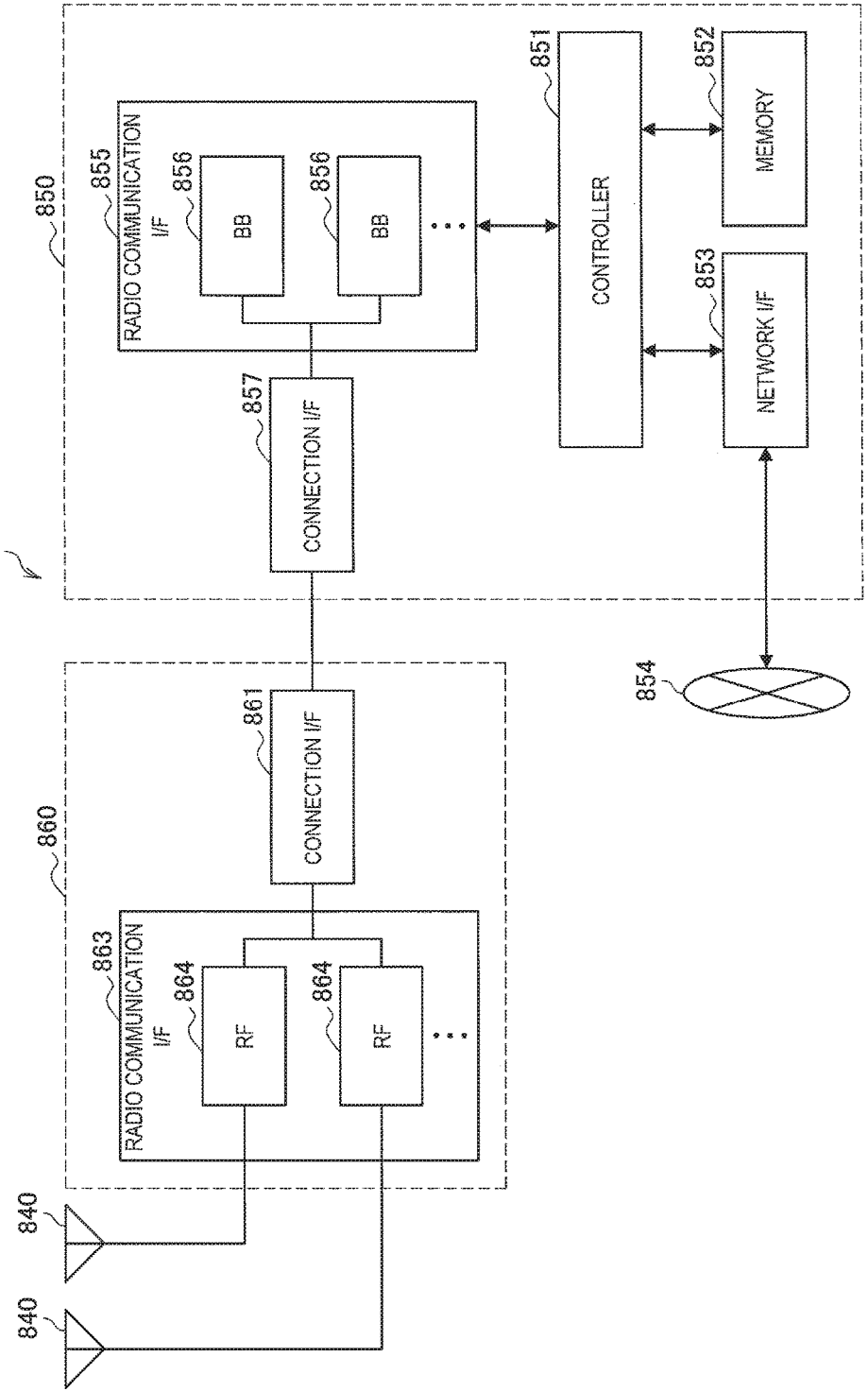
FIG. 29 is a block diagram illustrating a second example of a schematic configuration of an eNB.

FIG. 29 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 29. For example, the multiple antennas 840 may be compatible with multiple frequency bands used by the eNB 830. Although FIG. 25 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 28.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 28, except the BB processor 856 is connected to the RF circuit 864 of the RRH 860 via the connection interface 857. The radio communication interface 855 may include the multiple BB processors 856, as illustrated in FIG. 29. For example, the multiple BB processors 856 may be compatible with multiple frequency bands used by the eNB 830. Although FIG. 29 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 29. For example, the multiple RF circuits 864 may support multiple antenna elements. Although FIG. 29 illustrates the example in which the radio communication interface 863 includes the multiple RF circuits 864, the radio communication interface 863 may also include a single RF circuit 864.

In the eNB 830 illustrated in FIG. 29, the information acquiring unit 251 and/or the control unit 253 described with reference to FIG. 13 may be implemented in the radio communication interface 855 and/or the radio communication interface 863. Alternatively, at least the part of constituent elements may be implemented in the controller 851. As one example, in the eNB 830, a module including a part (for example, the BB processor 856) or all of the radio communication interface 855 and/or the controller 851 may be mounted, and the information acquiring unit 251 and/or the control unit 253 may be implemented in the module. In this case, the module may store a program causing the processor to function as the information acquiring unit 251 and/or the control unit 253 (in other words, a program causing the processor to perform the operations of the information acquiring unit 251 and/or the control unit 253) and may execute the program. As another example, a program causing the processor to function as the information acquiring unit 251 and/or the control unit 253 may be installed in the eNB 830, and the radio communication interface 855 (for example, the BB processor 856) and/or the controller 851 may execute the program. As described above, the eNB 830, the base station apparatus 850, or the module may be provided as an apparatus including the information acquiring unit 251 and/or the control unit 253, or a program causing the processor to function as the information acquiring unit 251 and/or the control unit 253 may be provided. A readable recording medium recorded the program may be provided.

Also, in the eNB 830 shown in FIG. 29, for example, the radio communication unit 220 described with reference to FIG. 13 may be implemented in the radio communication interface 863 (for example, the RF circuit 864). Further, the antenna unit 210 may be implemented in the antenna 840. Furthermore, the network communication unit 230 may be implemented in the controller 851 and/or the network interface 853.

<7.2. Application Examples Regarding Terminal Apparatus>

(First Application Example)

Figure 30:
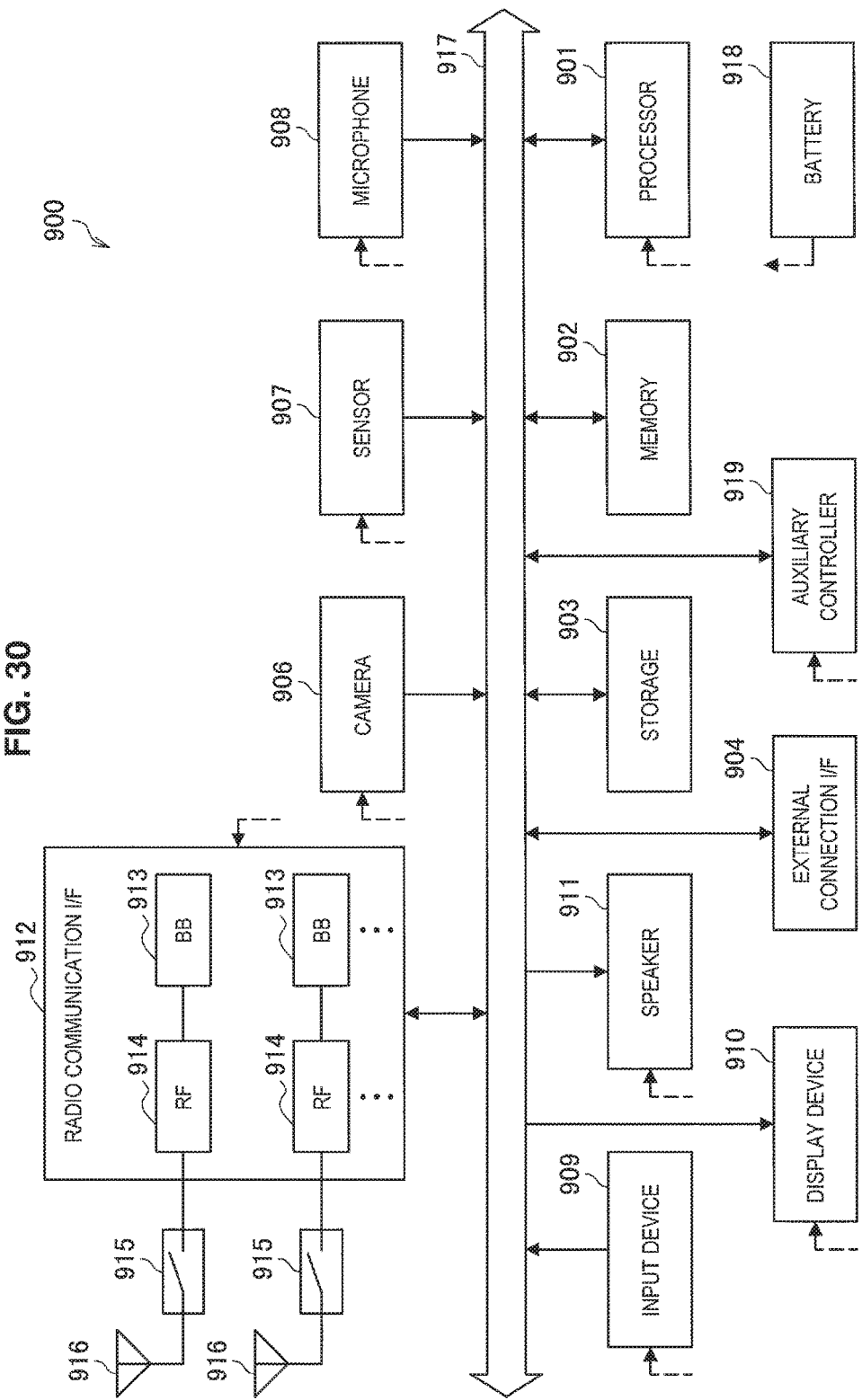
FIG. 30 is a block diagram illustrating an example of a schematic configuration of a smartphone.

FIG. 30 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 30. Although FIG. 30 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 30. Although FIG. 30 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 30 via feeder lines, which are partially shown as dashed lines in the figure. The auxiliary controller 919 operates a minimum necessary function of the smartphone 900, for example, in a sleep mode.

In the smartphone 900 illustrated in FIG. 30, one or more constituent elements (for example, the measurement unit 141, the first control unit 143 and the second control unit 145) of the control unit 140 described with reference to FIG. 12 may be implemented in the radio communication interface 912. Alternatively, at least a part of such constituent elements may be implemented in the processor 901 or the auxiliary controller 919. As one example, in the smartphone 900, a module including a part (for example, the BB processor 913) or all of the radio communication interface 912, the processor 901, and/or the auxiliary controller 919 may be mounted, and the described-above one or more constituent elements may be implemented in the module. In this case, the module may store a program causing the processor to function as the described-above one or more constituent elements (in other words, a program causing the processor to perform the operations of the described-above one or more constituent elements) and may execute the program. As another example, a program causing the processor to function as the described-above one or more constituent elements may be installed in the smartphone 900, and the radio communication interface 912 (for example, the BB processor 913), the processor 901, and/or the auxiliary controller 919 may execute the program. As described above, the smartphone 900 or the module may be provided as an apparatus including the described-above one or more constituent elements, or a program causing the processor to function as the described-above one or more constituent elements may be provided. A readable recording medium recorded the program may be provided.

Also, in the smartphone 900 shown in FIG. 30, for example, the radio communication unit 120 described with reference to FIG. 12 may be implemented in the radio communication interface 912 (for example, the RF circuit 914). Further, the antenna unit 110 may be implemented in the antenna 916.

(Second Application Example)

Figure 31:
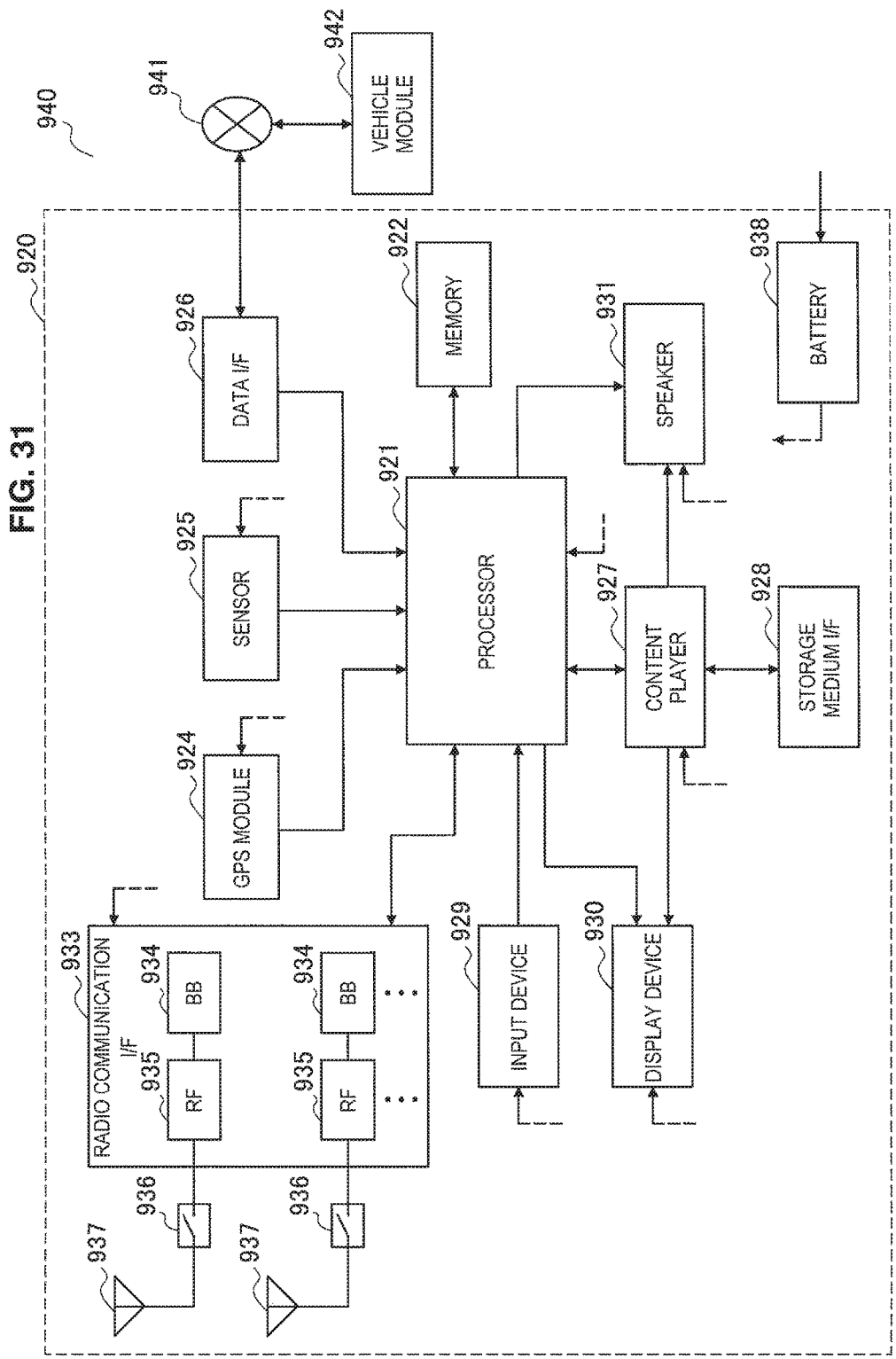
FIG. 31 is a block diagram illustrating an example of a schematic configuration of a car navigation apparatus.

FIG. 31 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 30. Although FIG. 30 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 31. Although FIG. 31 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 31 via feeder lines that are partially shown as dashed lines in the figure. The battery 938 accumulates power supplied form the vehicle.

In the car navigation apparatus 920 illustrated in FIG. 31, one or more constituent elements (for example, the measurement unit 141, the first control unit 143 and the second control unit 145) of the control unit 140 described with reference to FIG. 12 may be implemented in the radio communication interface 933. Alternatively, at least a part of such constituent elements may be implemented in the processor 921. As one example, in the car navigation apparatus 920, a module including a part (for example, the BB processor 934) or all of the radio communication interface 933 and/or the processor 921 may be mounted, and the described-above one or more constituent elements may be implemented in the module. In this case, the module may store a program causing the processor to function as the described-above one or more constituent elements (in other words, a program causing the processor to perform the operations of the described-above one or more constituent elements) and may execute the program. As another example, a program causing the processor to function as the described-above one or more constituent elements may be installed in the car navigation apparatus 920, and the radio communication interface 933 (for example, the BB processor 934) and/or the processor 921 may execute the program. As described above, the car navigation apparatus 920 or the module may be provided as an apparatus including the described-above one or more constituent elements, or a program causing the processor to function as the described-above one or more constituent elements may be provided. A readable recording medium recorded the program may be provided.

Also, in the car navigation apparatus 920 shown in FIG. 31, for example, the radio communication unit 120 described with reference to FIG. 14 may be implemented in the radio communication interface 933 (for example, the RF circuit 935). Further, the antenna unit 110 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. That is, the in-vehicle system (or a vehicle) 940 may be provided as an apparatus including the described-above one or more constituent elements (for example, the measurement unit 141, the first control unit 143 and/or the second control unit 145). The vehicle module 942 generates vehicle data such as vehicle speed, engine speed, and trouble information, and outputs the generated data to the in-vehicle network 941.

8. CONCLUSION

The apparatuses and the processes according to the embodiments of the present disclosure have been described above with reference to FIGS. 10 to 31.

First Embodiment

According to the first embodiment of the present disclosure, the terminal apparatus 100 includes the first control unit that selects the first frequency band that is the frequency band for the first cellular system and the second frequency band that is not the frequency band for the first cellular system when the terminal apparatus 100 is in the idle mode and the second control unit that controls the terminal apparatus 100 such that the terminal apparatus 100 receives the paging message transmitted in the first frequency band and receives the multicast signal transmitted in the second frequency band when the terminal apparatus 100 is in the idle mode.

Thus, for example, it is possible to increase opportunities for the terminal apparatus 100 in the idle mode to receive the multicast signal.

Second Embodiment

According to the second embodiment of the present disclosure, the terminal apparatus 100 includes the first control unit that selects the second frequency band that is not the frequency band for the first cellular system when the terminal apparatus 100 is in the connected mode in the first cellular system and the second control unit that controls the terminal apparatus 100 such that the terminal apparatus 100 transmits or receives a signal in the first frequency band which is the frequency band for the first cellular system and receives the multicast signal transmitted from the base station of another cellular system different from the first cellular system in the second frequency band when the terminal apparatus 100 is in the connected mode in the first cellular system.

Thus, for example, it is possible to increase opportunities for the terminal apparatus 100 in the connected mode to receive the multicast signal.

Third Embodiment

According to the third embodiment of the present disclosure, the terminal apparatus 100 includes the measuring unit that performs measurement for the MBSFN reference signal and the first control unit that performs the cell selection or the cell reselection or performs a measurement report based on the measurement result.

Thus, for example, it is possible to increase opportunities for the terminal apparatus 100 to receive the MBSFN signal.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the example in which the cellular system is a system that conforms to LTE, LTE-Advanced, or a communication standard equivalent thereto has been described, but an embodiment of the present disclosure is not limited thereto. For example, the communication system may be a system that conforms to another communication standard.

The processing steps in the processes of the present specification may not necessarily be performed chronologically in the orders described in the flowcharts or the sequence diagrams. For example, the processing steps in the processes may be performed in different orders from the orders described in the flowcharts or the sequence diagrams or may be performed in parallel.

It is also possible to create a computer program causing a processor (for example, a CPU, a DSP, or the like) installed in the apparatus of this specification (for example, the base station, the base station apparatus, or a module for the base station apparatus, the terminal apparatus, or a module for the terminal apparatus) to function as the components of the apparatus (for example, the information acquiring unit and/or the control unit, or measuring unit, the first control unit and/or the second control unit, etc.) (that is, a computer program causing the processor to execute the operations of the components of the apparatus). A recording medium having the computer program recorded therein may also be provided. Further, an apparatus including a memory that stores the computer program and one or more processors capable of executing the computer program (for example, the base station, the base station apparatus, or the module for the base station apparatus, or the terminal apparatus, or the module for the terminal apparatus) may be provided. Further, a method including the operations of the components of the apparatus (for example, the information acquiring unit and/or the control unit, or the measuring unit, the first control unit and/or the second control unit, etc.) is also included in technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An apparatus, including:

a first control unit configured to select a first frequency band which is a frequency band for a cellular system and a second frequency band which is not the frequency band for the cellular system when a terminal apparatus is in an idle mode; and a second control unit configured to control the terminal apparatus such that, when the terminal apparatus is in the idle mode, the terminal apparatus receives a paging message transmitted in the first frequency band and receives a multicast signal transmitted in the second frequency band.

(2)

The apparatus according to (1), wherein the second frequency band is a frequency band shared by a plurality of radio communication systems, and the multicast signal is a signal transmitted from a base station of the cellular system or a base station of another cellular system different from the cellular system.

(3)

The apparatus according to (1), wherein the second frequency band is a frequency band for another cellular system different from the cellular system, and the multicast signal is a signal transmitted from a base station of the other cellular system.

(4)

The apparatus according to any one of (1) to (3), wherein the first control unit selects the second frequency band using a criterion different from a criterion for selecting the first frequency band.

(5)

The apparatus according to (4), wherein the different criterion includes a criterion for selecting the cellular system.

(6)

The apparatus according to (4) or (5), wherein the different criterion includes a criterion for reception power or reception quality which is measured.

(7)

The apparatus according to any one of (1) to (6), wherein the multicast signal is a multimedia broadcast multicast service (MBMS) over single frequency network (MBSFN) signal transmitted in an MBSFN subframe.

(8)

An apparatus, including:

a first control unit configured to select a second frequency band which is not a frequency band for a cellular system when a terminal apparatus is in a connected mode in the cellular system; and a second control unit configured to control the terminal apparatus such that when the terminal apparatus is in the connected mode in the cellular system, the terminal apparatus transmits or receives a signal in a first frequency band which is the frequency band for the cellular system and receives a multicast signal transmitted from a base station of another cellular system different from the cellular system in the second frequency band.

(9) The apparatus according to (8), wherein the second frequency band is a frequency band shared by a plurality of radio communication systems.

(10) The apparatus according to (8), wherein the second frequency band is a frequency band for the other cellular system.

(11) The apparatus according to any one of (8) to (10), wherein the first control unit selects the frequency band for the cellular system when the terminal apparatus is in an idle mode, and selects the second frequency band using a criterion different from a criterion for selecting the frequency band for the cellular system when the terminal apparatus is in the connected mode in the cellular system.

(12) An apparatus, including:
a measuring unit configured to perform measurement for an MBSFN reference signal; and
a first control unit configured to perform cell selection or cell reselection, or a measurement report based on a result of the measurement.

(13) The apparatus according to (12), wherein the measurement is measurement of at least one of reception power and reception quality of the MBSFN reference signal.

(14) The apparatus according to (12) or (13), wherein the measuring unit performs the measurement for each MBSFN area indicated by system information.

(15) The apparatus according to any one of (12) to (14), wherein the first control unit performs cell selection or cell reselection based on the result of the measurement, and the apparatus further includes a second control unit configured to control the terminal apparatus such that the terminal apparatus receives an MBSFN signal transmitted in an MBSFN subframe in a frequency band selected through the cell selection or the cell selection.

(16) An apparatus, including:
an acquiring unit configured to acquire information indicating measurement to be performed by a terminal apparatus; and
a control unit configured to notify the terminal apparatus of the measurement,
wherein the measurement includes measurement for an MBSFN reference signal.

(17) The apparatus according to (16), wherein the terminal apparatus supports carrier aggregation, and
the control unit adds a secondary component carrier of the terminal apparatus based on a result of the measurement for the MBSFN reference signal performed by the terminal apparatus.

(18) An apparatus, including:
an acquisition unit configured to acquire information indicating one or more frequency bands which are not frequency bands for a cellular system; and a control unit configured to notify the terminal apparatus of the one or more frequency bands when the terminal apparatus transitions from a connected mode to an idle mode in the cellular system.

(19) The apparatus according to (18), wherein each of the one or more frequency bands is a frequency band shared by a plurality of radio communication systems.

(20) The apparatus according to (18), wherein each of the one or more frequency bands is a frequency band for another cellular system different from the cellular system.

(21) The apparatus according any one of (1) to (11), wherein the apparatus is the terminal apparatus or a module for the terminal apparatus.

(22) The apparatus according any one of (12) to (15), wherein the apparatus is a terminal apparatus or a module for a terminal apparatus.

(23) The apparatus according any one of (16) to (20), wherein the apparatus is a base station, a base station apparatus for the base station, or a module for the base station apparatus.

(24) A method, including:
selecting, by a processor, a first frequency band which is a frequency band for a cellular system and a second frequency band which is not the frequency band for the cellular system when a terminal apparatus is in an idle mode; and
controlling, by the processor, the terminal apparatus such that, when the terminal apparatus is in the idle mode, the terminal apparatus receives a paging message transmitted in the first frequency band and receives a multicast signal transmitted in the second frequency band.

(25) A program causing a processor to execute:
selecting a first frequency band which is a frequency band for a cellular system and a second frequency band which is not the frequency band for the cellular system when a terminal apparatus is in an idle mode; and
controlling the terminal apparatus such that, when the terminal apparatus is in the idle mode, the terminal apparatus receives a paging message transmitted in the first frequency band and receives a multicast signal transmitted in the second frequency band.

(26) A readable recording medium having a program recorded thereon, the program causing a processor to execute:
selecting a first frequency band which is a frequency band for a cellular system and a second frequency band which is not the frequency band for the cellular system when a terminal apparatus is in an idle mode; and
controlling the terminal apparatus such that, when the terminal apparatus is in the idle mode, the terminal apparatus receives a paging message transmitted in the first frequency band and receives a multicast signal transmitted in the second frequency band.

(27) A method, including:
selecting, by a processor, a second frequency band which is not a frequency band for a cellular system when a terminal apparatus is in a connected mode in the cellular system; and controlling, by the processor, the terminal apparatus such that when the terminal apparatus is in the connected mode in the cellular system, the terminal apparatus transmits or receives a signal in a first frequency band which is the frequency band for the cellular system and receives a multicast signal transmitted from a base station of another cellular system different from the cellular system in the second frequency band.

(28)

A program causing a processor to execute:

selecting a second frequency band which is not a frequency band for a cellular system when a terminal apparatus is in a connected mode in the cellular system; and controlling the terminal apparatus such that when the terminal apparatus is in the connected mode in the cellular system, the terminal apparatus transmits or receives a signal in a first frequency band which is the frequency band for the cellular system and receives a multicast signal transmitted from a base station of another cellular system different from the cellular system in the second frequency band.

(29)

A readable recording medium having a program recorded thereon, the program causing a processor to execute:

selecting a second frequency band which is not a frequency band for a cellular system when a terminal apparatus is in a connected mode in the cellular system; and controlling the terminal apparatus such that when the terminal apparatus is in the connected mode in the cellular system, the terminal apparatus transmits or receives a signal in a first frequency band which is the frequency band for the cellular system and receives a multicast signal transmitted from a base station of another cellular system different from the cellular system in the second frequency band.

(30)

A method, including:

performing, by a processor, measurement for an MBSFN reference signal; and performing, by the processor, cell selection or cell reselection, or a measurement report based on a result of the measurement.

(31)

A program causing a processor to execute:

performing measurement for an MBSFN reference signal; and performing cell selection or cell reselection, or a measurement report based on a result of the measurement.

(32)

A readable recording medium having a program recorded thereon, the program causing a processor to execute:

performing measurement for an MBSFN reference signal; and performing cell selection or cell reselection, or a measurement report based on a result of the measurement.

(33)

A method, including:

acquiring, by a processor, information indicating measurement to be performed by a terminal apparatus; and notifying, by the processor, the terminal apparatus of the measurement, wherein the measurement includes measurement for an MBSFN reference signal.

(34)

A program causing a processor to execute:

acquiring information indicating measurement to be performed by a terminal apparatus; and notifying the terminal apparatus of the measurement, wherein the measurement includes measurement for an MBSFN reference signal.

(35)

A readable recording medium having a program recorded thereon, the program causing a processor to execute:

acquiring information indicating measurement to be performed by a terminal apparatus; and notifying the terminal apparatus of the measurement, wherein the measurement includes measurement for an MBSFN reference signal.

(36)

A method, including:

acquiring, by a processor, information indicating one or more frequency bands which are not frequency bands for a cellular system; and notifying, by the processor, the terminal apparatus of the one or more frequency bands when the terminal apparatus transitions from a connected mode to an idle mode in the cellular system.

(37)

A program causing a processor to execute:

acquiring information indicating one or more frequency bands which are not frequency bands for a cellular system; and notifying the terminal apparatus of the one or more frequency bands when the terminal apparatus transitions from a connected mode to an idle mode in the cellular system.

(38)

A readable recording medium having a program recorded thereon, the program causing a processor to execute:

acquiring information indicating one or more frequency bands which are not frequency bands for a cellular system; and notifying the terminal apparatus of the one or more frequency bands when the terminal apparatus transitions from a connected mode to an idle mode in the cellular system.

REFERENCE SIGNS LIST 1 system
100 terminal apparatus
141 measuring unit
143 first control unit
145 second control unit
200 terminal apparatus
251 information acquiring unit
253 control unit

The invention claimed is:

1. An apparatus, comprising:
a first control unit configured to:
select, based on an idle mode of the apparatus and a priority associated with each of a plurality of first frequency bands, a first frequency band of the plurality of first frequency bands, wherein the first frequency band is a frequency band for a first cellular system; and
select, based on the idle mode of the apparatus and a priority associated with each of a plurality of second frequency bands, a second frequency band of the plurality of second frequency bands, wherein the second frequency band is not the frequency band for the first cellular system; and
a second control unit configured to control, based on the idle mode of the apparatus, the apparatus to receive a paging message transmitted in the first frequency band and to receive a multicast signal transmitted in the second frequency band.

2. The apparatus according to claim 1, wherein the second frequency band is a frequency band shared by a plurality of radio communication systems, and the multicast signal is a signal transmitted from a base station of the first cellular system or a base station of a second cellular system different from the first cellular system.

3. The apparatus according to claim 1, wherein the second frequency band is a frequency band for a second cellular system different from the first cellular system, and the multicast signal is a signal transmitted from a base station of the second cellular system.

4. The apparatus according to claim 1, wherein the multicast signal is a multimedia broadcast multicast service (MBMS) over single frequency network (MBSFN) signal transmitted in an MBSFN subframe.

5. An apparatus, comprising:

a first control unit configured to:

select a first frequency band of a plurality of first frequency bands based on an idle mode of a terminal apparatus in a first cellular system and a priority associated with each of the plurality of first frequency bands, wherein the first frequency band is a frequency band for the first cellular system; and select a second frequency band of a plurality of second frequency bands based on a connected mode of the terminal apparatus and a priority associated with each of the plurality of second frequency bands, wherein the second frequency band is not the frequency band for the first cellular system; and a second control unit configured to control, based on the connected mode of the terminal apparatus, the terminal apparatus to receive a signal in the first frequency band and to receive a multicast signal transmitted from a base station of a second cellular system different from the first cellular system in the second frequency band.

6. The apparatus according to claim 5, wherein the second frequency band is a frequency band shared by a plurality of radio communication systems.

7. The apparatus according to claim 5, wherein the second frequency band is a frequency band for the second cellular system.

8. An apparatus, comprising:

an acquiring unit configured to acquire information, wherein the information indicates measurement to be executed by a terminal apparatus; and a control unit configured to notify the terminal apparatus of the measurement, wherein the measurement includes measurement for a multimedia broadcast multicast service (MBMS) over single frequency network (MBSFN) reference signal, the terminal apparatus executes one of cell selection or cell reselection based on a result of the measurement, the terminal apparatus supports carrier aggregation, and the control unit is further configured to add a secondary component carrier of the terminal apparatus based on the result of the measurement for the MBSFN reference signal.

9. An apparatus, comprising:

an acquisition unit configured to acquire information indicating at least one frequency band which is not a frequency band for a first cellular system; and a control unit configured to notify, based on a transition of a terminal apparatus from a connected mode to an idle mode in the first cellular system, the terminal apparatus of the at least one frequency band, wherein the terminal apparatus selects a frequency band from the at least one frequency band based on the idle mode of the terminal apparatus.

10. The apparatus according to claim 9, wherein each frequency band of the at least one frequency band is a frequency band shared by a plurality of radio communication systems.

11. The apparatus according to claim 9, wherein each frequency band of the at least one frequency band is a frequency band for a second cellular system different from the first cellular system.

* * * * *